US012609541B2

(12) United States Patent
Ekström

(10) Patent No.: US 12,609,541 B2
(45) Date of Patent: Apr. 21, 2026

(54) INTELLIGENT BATTERY CELL

(71) Applicant: Volvo Car Corporation, Gothenburg (SE)

(72) Inventor: Markus Ekström, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 838 days.

(21) Appl. No.: 17/932,973

(22) Filed: Sep. 16, 2022

(65) Prior Publication Data

US 2023/0121595 A1 Apr. 20, 2023

Related U.S. Application Data

(60) Provisional application No. 63/246,483, filed on Sep. 21, 2021.

(51) Int. Cl.
*H02J 7/54* (2026.01)
*H01M 10/42* (2006.01)
(52) U.S. Cl.
CPC ............. *H02J 7/54* (2026.01); *H01M 10/425* (2013.01); *H01M 2010/4271* (2013.01)
(58) Field of Classification Search
CPC ............................ H02J 7/0016; H01M 10/425
See application file for complete search history.

(56) References Cited

U.S. PATENT DOCUMENTS 5,569,995 A 10/1996 Kusaka et al.
6,862,511 B1 3/2005 Phillips et al.
6,907,337 B2 6/2005 Phillips et al.
6,915,198 B2 7/2005 Phillips et al.
10,074,981 B2 9/2018 Faley et al.
(Continued)

FOREIGN PATENT DOCUMENTS

CN 110137984 A 8/2019
DE 10 2010 04100 A1 12/2009
(Continued)

OTHER PUBLICATIONS

Non-Final Office Action received for U.S. Appl. No. 17/932,965, dated Sep. 12, 2024, 29 pages.
(Continued)

*Primary Examiner* — Robert Grant
(74) *Attorney, Agent, or Firm* — Amin, Turocy & Watson, LLP

(57) ABSTRACT

Systems, devices, computer-implemented methods, and/or computer program products that can facilitate an intelligent battery cell are addressed. In one example, a device can comprise: active battery cell material; and an internal circuit coupled to the active battery cell material and comprising: a circuit board; two alternating current (AC) power points; two isolated direct current (DC) power points; and a controller that can operate one or more switches on an H-bridge circuit to disconnect the device from a main battery in a bypass mode. In another example, a smart cell modulator can comprise: a set of smart battery cells; and a controller that can operate to selectively engage a subset of the smart battery cells to enable load sharing, distributed feedback control, circulate load across one or more smart battery cells of the set of smart battery cells to increase torque, and to enable speed requests.

20 Claims, 44 Drawing Sheets

(56) References Cited

U.S. PATENT DOCUMENTS

| | | | |
|---|---|---|---|
| 10,483,791 B2 * | 11/2019 | Mergener | H02J 9/06 |
| 10,720,868 B2 | 7/2020 | Tanaka et al. | |
| 10,910,859 B2 | 2/2021 | Frost et al. | |
| 10,992,144 B2 | 4/2021 | Li et al. | |
| 2002/0024828 A1 | 2/2002 | Hayashi et al. | |
| 2004/0085039 A1 | 5/2004 | Games et al. | |
| 2005/0049770 A1 | 3/2005 | Liu et al. | |
| 2009/0296442 A1 | 12/2009 | Chang et al. | |
| 2011/0198936 A1 | 8/2011 | Graovac et al. | |
| 2014/0001986 A1 | 1/2014 | Fink | |
| 2015/0042263 A1 | 2/2015 | Schmidt et al. | |
| 2015/0044515 A1 | 2/2015 | Camp et al. | |
| 2015/0280604 A1 | 10/2015 | Hassanpoor | |
| 2015/0288197 A1 | 10/2015 | Choi | |
| 2015/0295430 A1 | 10/2015 | Wright et al. | |
| 2018/0043789 A1 | 2/2018 | Goetz | |
| 2019/0229540 A1 | 7/2019 | Lee et al. | |
| 2019/0288535 A1 | 9/2019 | Jaensch et al. | |
| 2021/0036643 A1 * | 2/2021 | Wang | B60K 6/48 |
| 2021/0126471 A1 | 4/2021 | Srivastava et al. | |
| 2021/0197676 A1 | 7/2021 | Goetz et al. | |
| 2021/0316637 A1 | 10/2021 | Slepchenkov et al. | |
| 2022/0200492 A1 | 6/2022 | Kuder et al. | |
| 2022/0234451 A1 | 7/2022 | Srinivasan | |
| 2022/0368259 A1 | 11/2022 | Hustedt | |

FOREIGN PATENT DOCUMENTS

| | | | |
|---|---|---|---|
| DE | 10 2010 041 001 A1 | 3/2012 | |
| DE | 10 2020 121 959 A1 | 2/2022 | |
| DE | 10 2020 132 718 A1 | 6/2022 | |
| EP | 0 638 457 A2 | 2/1995 | |
| WO | 95/15612 A1 | 6/1995 | |
| WO | 2012/097899 A1 | 7/2012 | |
| WO | 2013/075863 A2 | 5/2013 | |

OTHER PUBLICATIONS

Communication pursuant to Article 94(3) EPC received for European Patent Application Serial No. 22196608.8 dated Jun. 16, 2023, 8 pages.

European Search Report received for European Patent Application Serial No. 22196608.8 dated May 23, 2023, 6 pages.

Non-Final Office Action received for U.S. Appl. No. 17/932,963 dated Jun. 26, 2025, 8 pages.

Non-Final Office Action received for U.S. Appl. No. 17/932,969 dated Jun. 5, 2025, 21 pages.

Non-Final Office Action received for U.S. Appl. No. 17/932,971 dated Jun. 11, 2025, 24 pages.

Notice of Allowance received for U.S. Appl. No. 17/932,965 dated Jan. 13, 2025, 23 pages.

International Search Report and Written Opinion received for PCT Application Serial No. PCT/EP2022/076212 dated Feb. 24, 2023, 14 pages.

Final Office Action received for U.S. Appl. No. 17/932,969 dated Dec. 9, 2025, 33 pages.

Final Office Action received for U.S. Appl. No. 17/932,971 dated Dec. 16, 2025, 38 pages.

Notice of Allowance for U.S. Appl. No. 17/932,963 dated Feb. 20, 2026, 59 pages.

* cited by examiner

SMART CELL 101

SMART CELLS 101

SMART CELLS 101

DC-DC CONVERTER 108

CIRCUIT BOARD 110

106

302

V 2.3 PCB

BATTERY MODULE 702

BATTERY MODULE 702

Figure 9A:
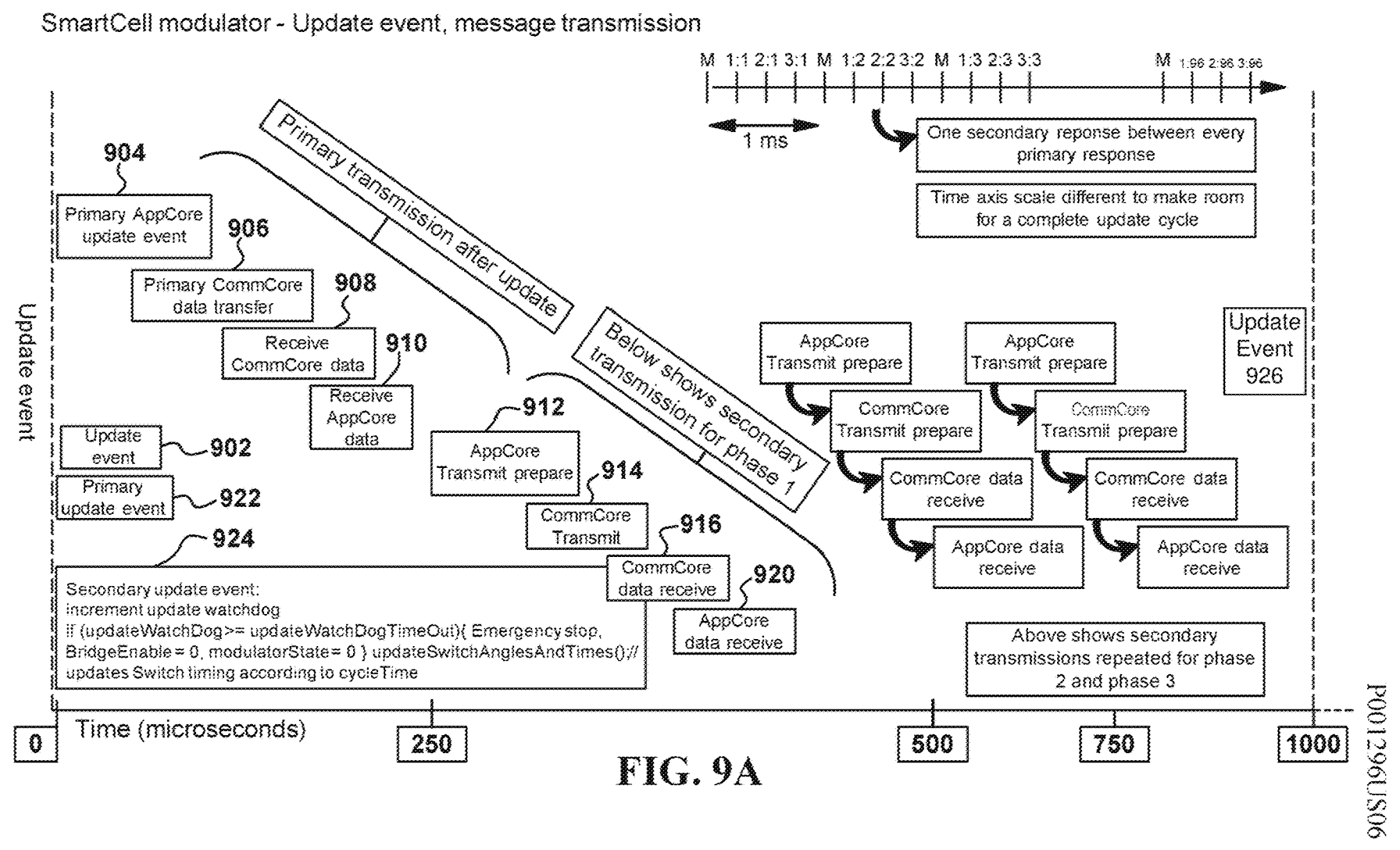

P001296US06

SmartCell modulator – Update event, message transmission

M 1:1 2:1 3:1 M 1:2 2:2 3:2 M 1:3 2:3 3:3    M 1:96 2:96 3:96

1 ms

One secondary reponse between every primary response

Time axis scale different to make room for a complete update cycle

904 Primary AppCore update event

906 Primary CommCore data transfer

908 Receive CommCore data

910 Receive AppCore data

Primary transmission after update

Below shows secondary transmission for phase 1

912 AppCore Transmit prepare

914 CommCore Transmit

916 CommCore data receive

920 AppCore data receive

902 Update event

922 Primary update event

924 Secondary update event:
increment update watchdog
if (updateWatchDog >= updateWatchDogTimeOut){ Emergency stop,
BridgeEnable = 0, modulatorState = 0 } updateSwitchAnglesAndTimes()//
updates Switch timing according to cycleTime AppCore Transmit prepare CommCore Transmit prepare CommCore data receive AppCore data receive AppCore Transmit prepare CommCore Transmit prepare CommCore data receive AppCore data receive Update Event 926

Above shows secondary transmissions repeated for phase 2 and phase 3

Update event

Time (microseconds)

STEP WAVE FORM 1902

1900

2200

SOC UPDATE EVENT 2208

DATA FREEZE EVENT 2202

DATA VERIFICATION 2206

DATA TRANSMISSION 2204

ENGAGING, BY A SYSTEM OPERATIVELY COUPLED TO A PROCESSOR, ONE OR MORE SECONDARY NODES TO EXECUTE A SPEED REQUEST FOR GENERATING A DESIRED SPEED

INTELLIGENT BATTERY CELL

CROSS-REFERENCE TO RELATED APPLICATIONS

This application claims priority to and the benefit of U.S. Provisional Patent Application Ser. No. 63/246,483 filed on Sep. 21, 2021, entitled "INTELLIGENT BATTERY CELL." The entirety of the aforementioned application is incorporated by reference herein.

TECHNICAL FIELD

The subject disclosure relates to a battery cell, and more specifically, to a battery cell with integrated monitoring and switches.

BACKGROUND

Currently, an electric driveline (e.g., an electric driveline used in an electric vehicle) is based on a battery with a direct current (DC) voltage of approximately 370 volts (V). Many systems are designed around this battery to protect and control the battery. Auxiliary units are used to generate alternating current (AC) voltage to run motors and charge the battery. Such systems are often complex and expensive and can be a source of errors.

At present, there are a number of different types of battery packs comprising multiple batteries and/or cells. Some example problems with such battery packs include: a) they are always on, that is, they always have a live voltage (e.g., approximately 400V); and/or b) they provide a constant voltage and therefore they use the auxiliary units described above to provide fluctuating voltage (e.g., AC voltage) and/or lower voltage (e.g., 12V, 48V, etc.). In addition, there are a variety of existing battery management systems (BMS) that can be used in many different systems. Some example problems with existing BMS include: a) they involve a set of sensor cables and/or submodules that add complexity and/or cost; b) they only monitor cell parameters (e.g., temperature, pressure, etc.); c) they are not integrated inside the cell; and/or d) they do not provide integrated switch functionality.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that can facilitate an intelligent battery cell are addressed.

An embodiment can include a smart cell modulator comprising a set of smart battery cells; and a controller that operates to selectively engage one or more secondary nodes to execute a speed request for generating a desired speed.

Another embodiment can include a computer-implemented method. The computer-implemented method can comprise engaging, by a system operatively coupled to a processor, one or more secondary nodes to execute a speed request for generating a desired speed.

Another embodiment can include a computer program product. The computer program product can comprise a computer readable storage medium having program instructions embodied therewith, which can facilitate an intelligent battery cell. The program instructions can be executable by the processor, causing the processor to engage, by the processor, one or more secondary nodes to execute a speed request for generating a desired speed.

DESCRIPTION OF THE DRAWINGS

One or more exemplary embodiments are described below in the Detailed Description section with reference to the following drawings.

FIG. 9A illustrates an update event sequence in accordance with one or more embodiments described herein.

FIG. 22 illustrates an alternate timeline for sorting of cells during sine wave creation in accordance with one or more embodiments described herein.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details. It will be understood that when an element is referred to as being "coupled" to another element, it can describe one or more different types of coupling including, but not limited to, chemical coupling, communicative coupling, electrical coupling, electromagnetic coupling, operative coupling, optical coupling, physical coupling, thermal coupling, and/or another type of coupling.

Further, it is to be appreciated that the terms "cell(s)", "smart cell(s)", "battery cell(s)" and "smart battery cell(s)" have been used interchangeably throughout the scope of this specification. The terms "H-bridge(s)" and "H-bridge circuit(s)" have also been used interchangeably throughout the scope of the specification. Likewise, the terms "cell cluster(s)", "smart cell cluster(s)", and "smart cell node(s)" have been used interchangeably throughout the scope of this specification.

Figure 1A:
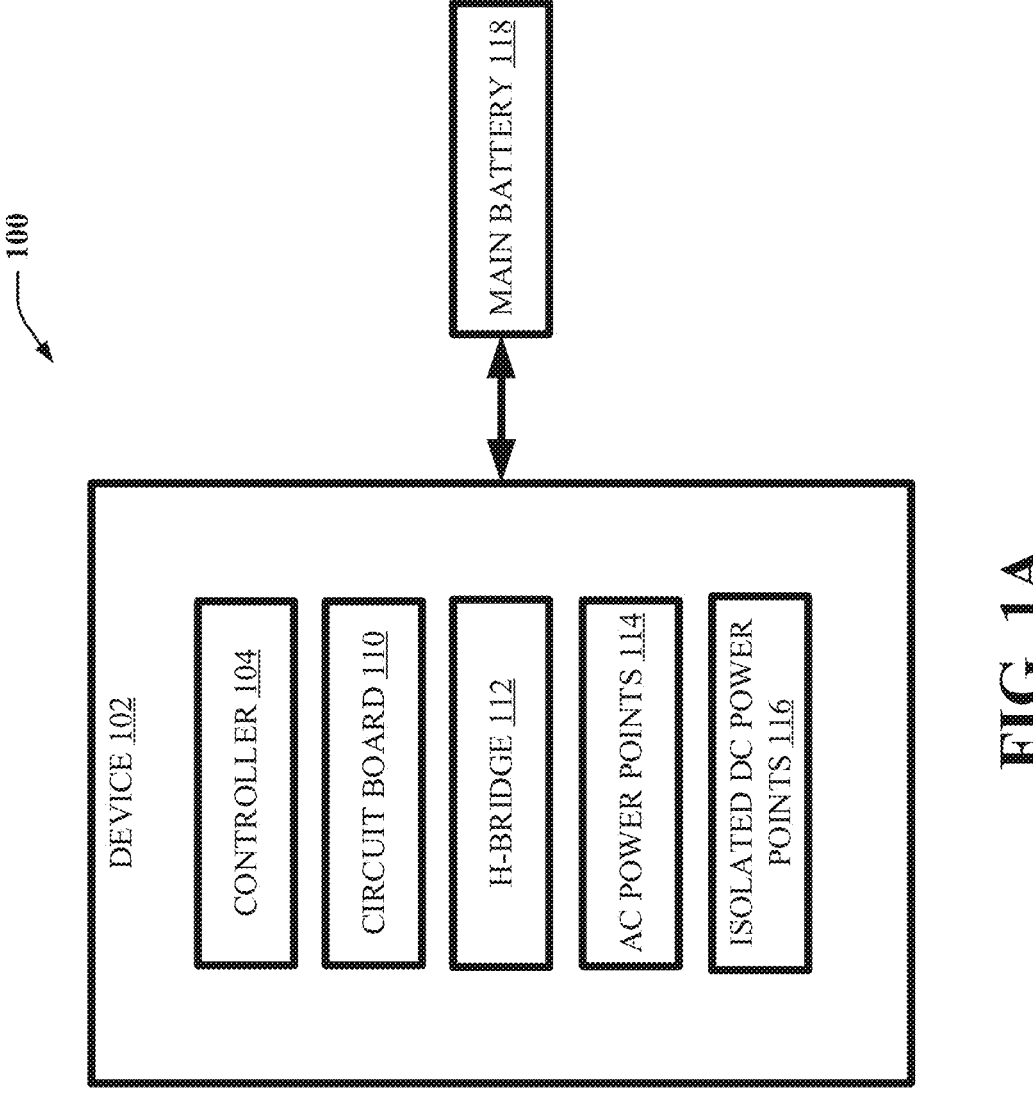
FIG. 1A illustrates a block diagram of an example, non-limiting system that facilitates an intelligent battery cell in accordance with one or more embodiments described herein.

FIG. 1A illustrates a block diagram of an example, non-limiting system that facilitates an intelligent battery cell in accordance with one or more embodiments described herein.

FIG. 1A illustrates, a system 100 that can comprise device 102, circuit board 110, controller 104, H-bridge 112, AC power points 114, isolated DC power points 116, and main battery 118. System 100 can be a SmartCell system or SmartCell modulator, and device 102 can be a smart cell cluster comprising one or more smart battery cells clustered via H-bridge 112. Circuit board 110 can provide intelligence to device 102 such that it can connect or disconnect from main battery 118 to enable multiple operational modes. These and other functionalities of device 102 can enable device 102 to run an electric motor of an electric vehicle by intelligently engaging one or more smart battery cells to produce a desired current to drive the electric motor. Additional functionalities will be discussed in subsequent figures and throughout the scope of this specification.

Figure 1B:
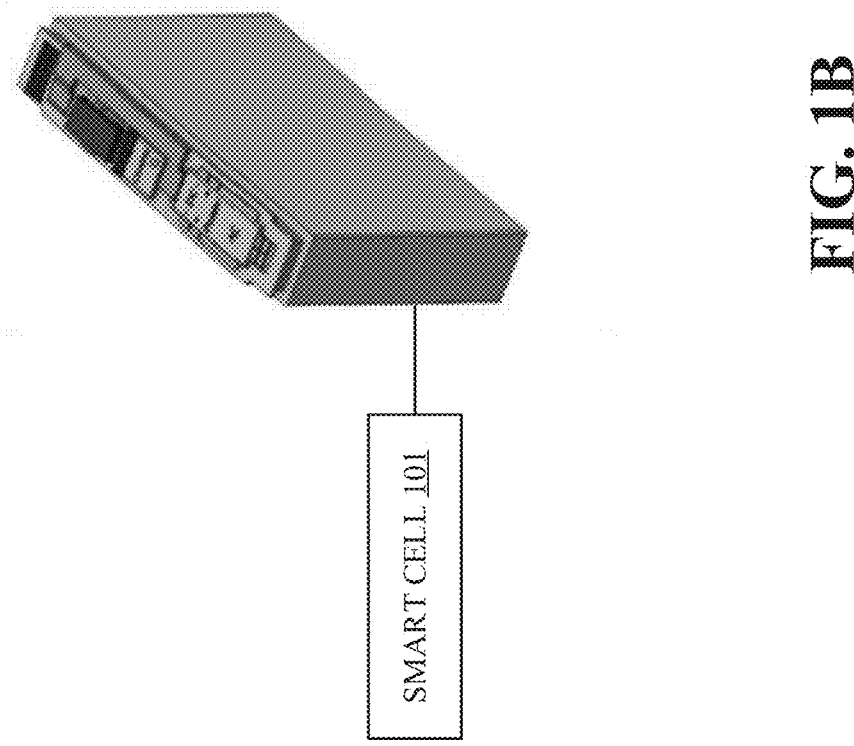
FIG. 1B illustrates a smart battery cell in accordance with one or more embodiments described herein.
Figure 1C:
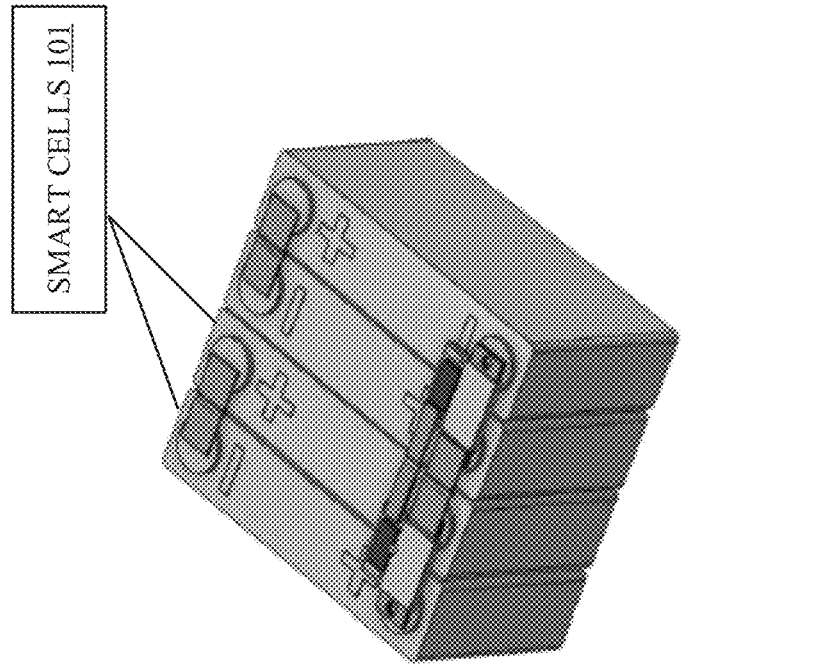
FIG. 1C illustrates smart battery cells in accordance with one or more embodiments described herein.
Figure 1D:
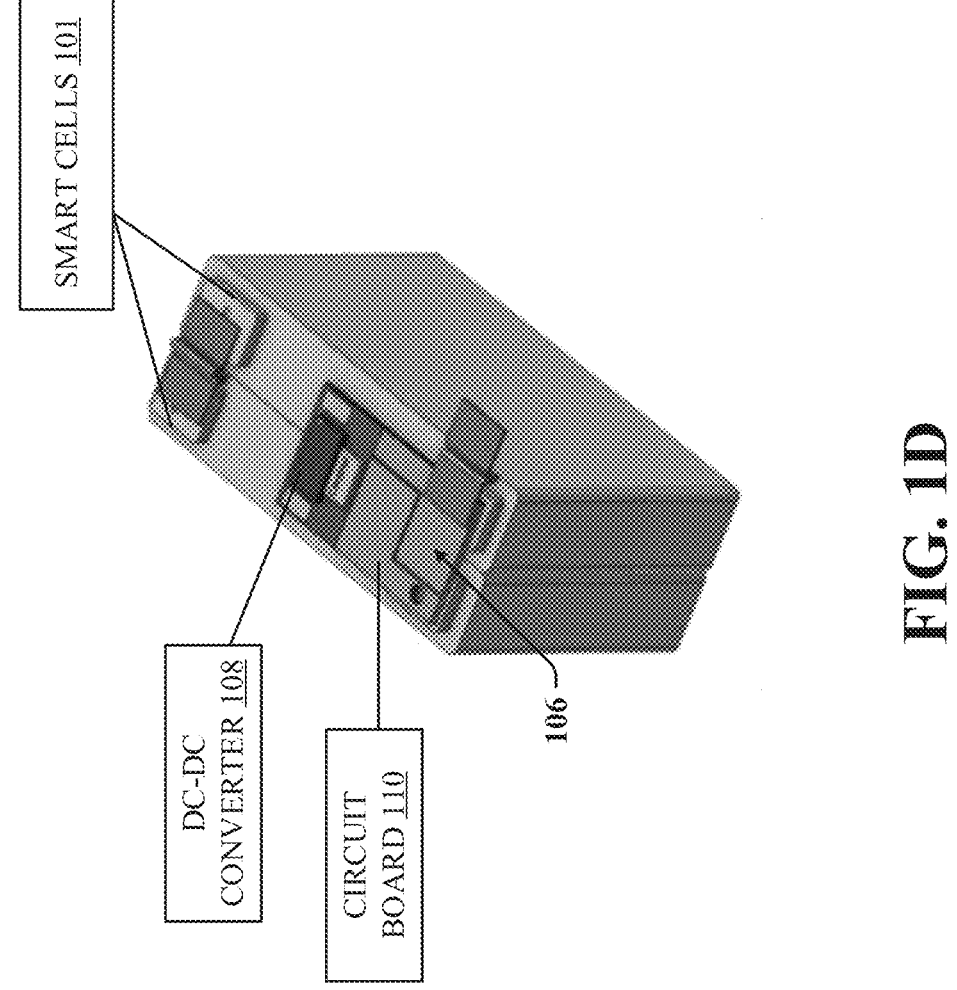
FIG. 1D further illustrates smart battery cells in accordance with one or more embodiments described herein.

FIG. 1B illustrates smart cell 101 in accordance with one or more embodiments described herein. FIGS. 1C and 1D illustrate smart battery cells (e.g., smart cells 101) in accordance with one or more embodiments described herein. For example, FIG. 1C illustrates a cluster of four smart cells (e.g., smart cells 101) composed of two smart cell nodes in a two-cell version, and FIG. 1D illustrates two smart cells (e.g., smart cells 101), DC-DC converter 108, and circuit board 110.

Smart cell 101 can be a power source, and as cells become larger, the number of cells required for a task can reduce and intelligence can be added to each cell by addition of a dedicated circuit board (e.g., circuit board 110). Circuit board 110 can be welded onto cell poles and smart cell 101 can start powering circuit board 110 through its own power. Circuit board 110 can, for example, contain four output points of which, two output points can be AC power points and the other two points can be isolated DC points. It is to be appreciated that any suitable number of ports can be employed in accordance with embodiments described and claimed herein. Cell connections to the outside world can be accomplished through the ports. Individual smart cells 101 can be clustered via an H-bridge, and busbar connections can be made between respective AC points of the individual smart cell clusters. Since a cell can internally control if and how it should be connected to the AC-terminals, the cell can disconnect itself from main battery 118 without affecting complete battery pack performance significantly. This mode can be referred to as a bypass mode which can be a default mode for a smart cell system.

A SmartCell board (e.g., circuit board 110) can be designed to be one per cell or even one per two (or more) cells. Having one SmartCell board per two cells can be more complicated but advantageous. An H-bridge (not pictured) can be provided at 106 to create AC capabilities from the battery cells. DC-DC converter 108 can further provide DC voltage to the system 100.

In an embodiment, a SmartCell modulator or SmartCell system (e.g., system 100) can consist of multiple smart cell nodes (or smart cell clusters) with AC power points connected such that the SmartCell system can create a desired voltage output. For example, each smart cell node can comprise four smart cells, each supplying 3.7V, wherein the four smart cells are clustered to generate a voltage output of approximately 16V. Clustering cells can be beneficial for cost and performance reasons. Clustering cells can also allow bigger steps in voltage to be obtained on a sine wave. For example, an H-bridge can cluster a plurality of smart cells (e.g., smart cell(s) 101) to form a smart cell cluster. A plurality of the smart cell clusters can be connected in series via busbars, and the plurality of smart cell clusters connected in series can form a string of clusters that can produce a sine wave current. This concept will be further illustrated through subsequent figures.

Figure 2:
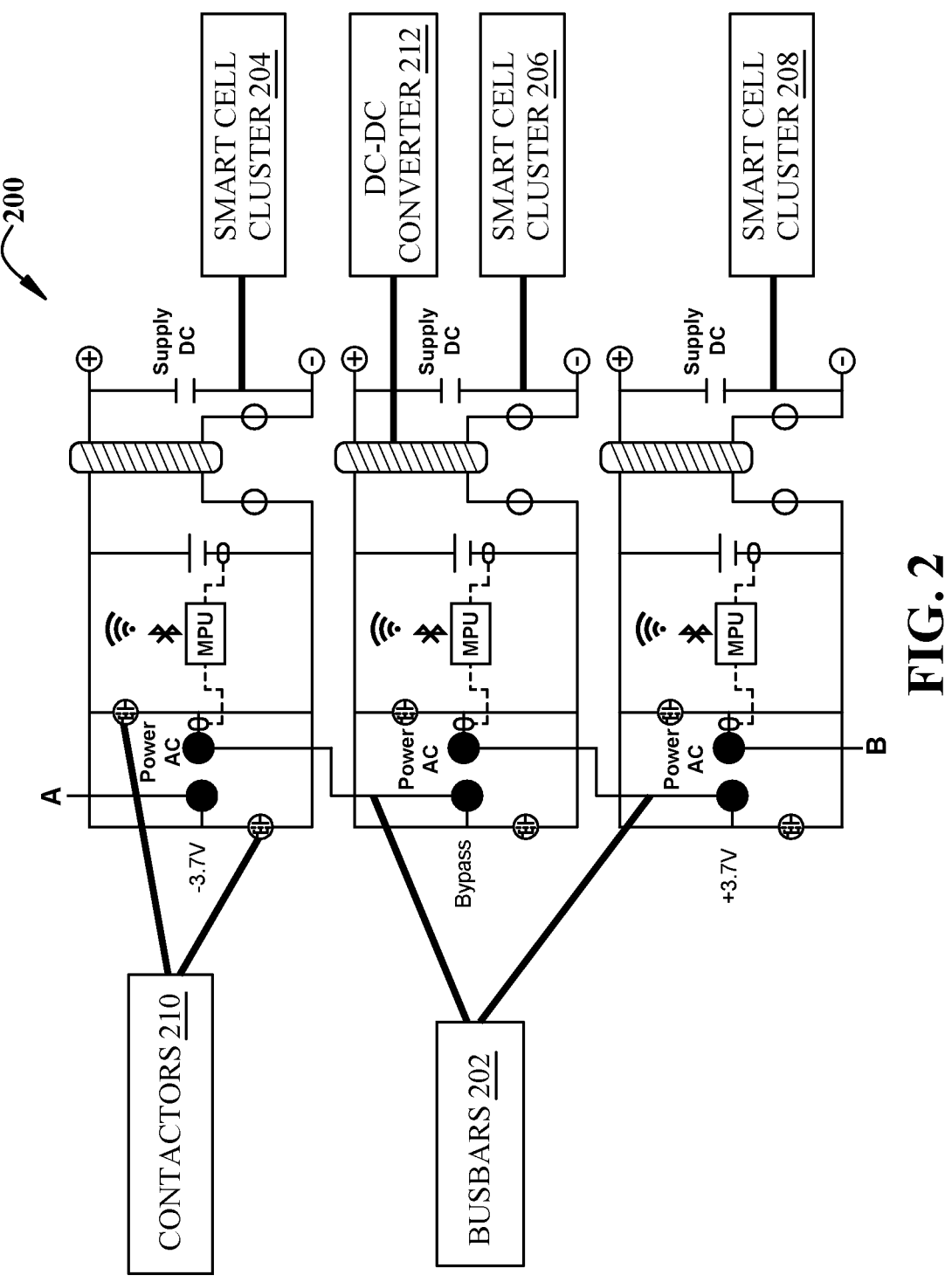
FIG. 2 illustrates a circuit utilizing H-bridge(s) in accordance with one or more embodiments described herein.

FIG. 2 illustrates a circuit 200 utilizing H-bridge(s) in accordance with one or more embodiments described herein. Circuit 200 can further comprise circuits that can represent three smart cell clusters equipped with H-bridges and connected in series. The individual smart cell clusters represented in circuit 200 can be comprise smart cell cluster 204, smart cell cluster 206, and smart cell cluster 208. FIG. 2 further illustrates busbar(s) 202, contactors(s) 210, and DC-DC converter 212. Repetitive description of like elements and/or processes employed in respective embodiments is omitted for sake of brevity.

In an embodiment, smart cell cluster 204, smart cell cluster 206, and smart cell cluster 208 can each comprise one or more smart battery cells (e.g., smart cell(s) 101) that can be clustered via respective H-bridge circuits. For exemplary purposes, the smart cell clusters represented in FIG. 2 can comprise singular cells that can output 3.7V. Smart cell cluster 204, smart cell cluster 206, and smart cell cluster 208 can be connected via busbars 202 at the AC power points of the respective smart cell clusters. Contactors on each H-bridge circuit can be connected and disconnected in specific combinations. For example, contactors 210 can be closed such that smart cell cluster 204 can output a negative voltage of 3.7V (−3.7V). Similarly, a different combination of contactors on smart cell cluster 206 can be closed to enable a bypass mode wherein smart cell cluster 206 can disconnect from a main battery without affecting performance of the main battery. Operating yet another combination of contactors on the H-bridge on smart cell cluster 208 can enable the smart cell cluster to output a positive voltage of 3.7V. The contactors described herein can be metal-oxide-semiconductor field-effect transistors (MOSFETs) or other types of contactors. Thus, smart cell clusters can operate in three primary modes, namely, a bypass mode, a positive voltage output mode, and a negative voltage output mode. This concept will be illustrated in greater detail in subsequent figures.

Figure 3A:
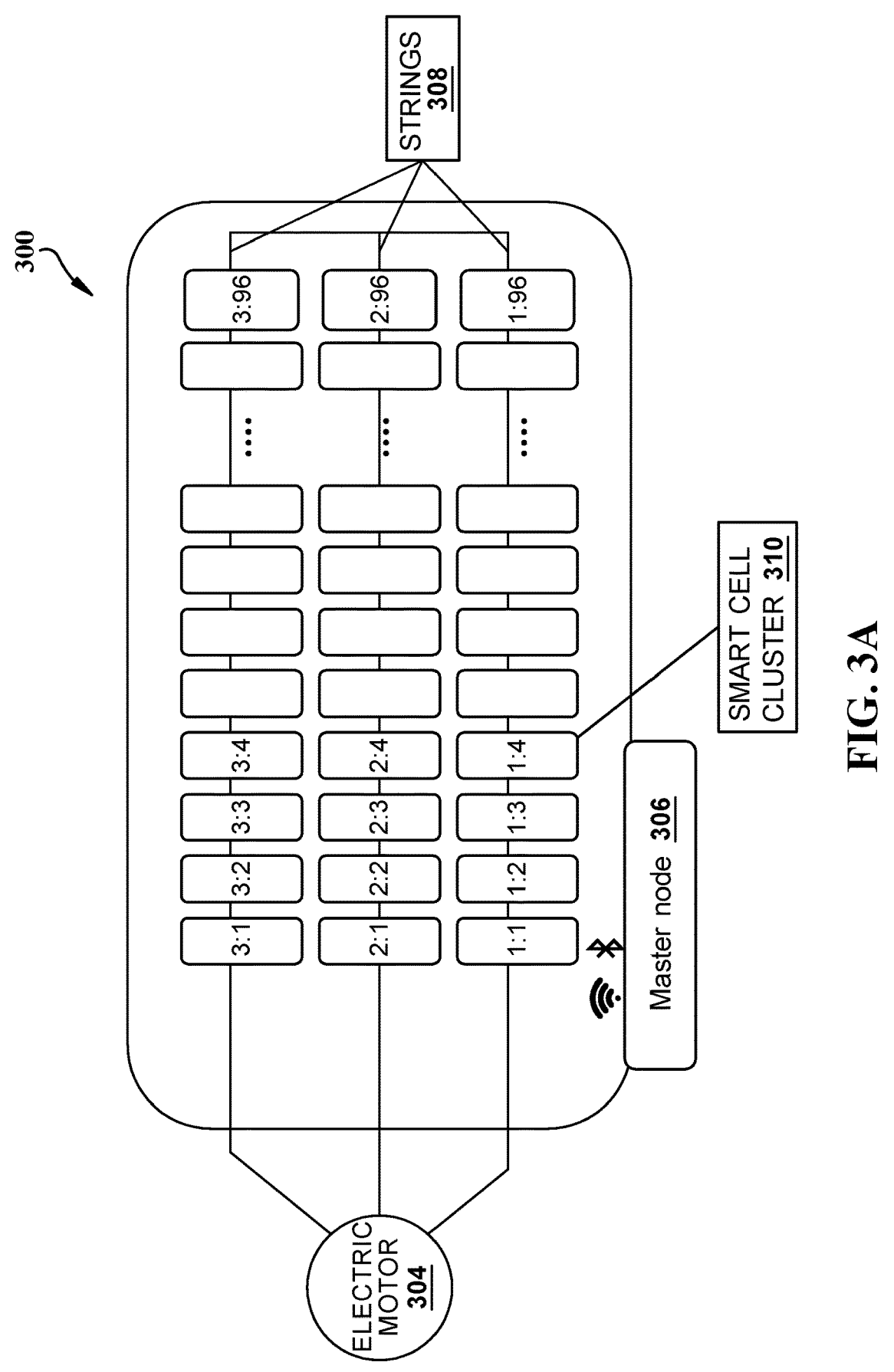
FIG. 3A illustrates a SmartCell system in accordance with one or more embodiments described herein.
Figure 3B:
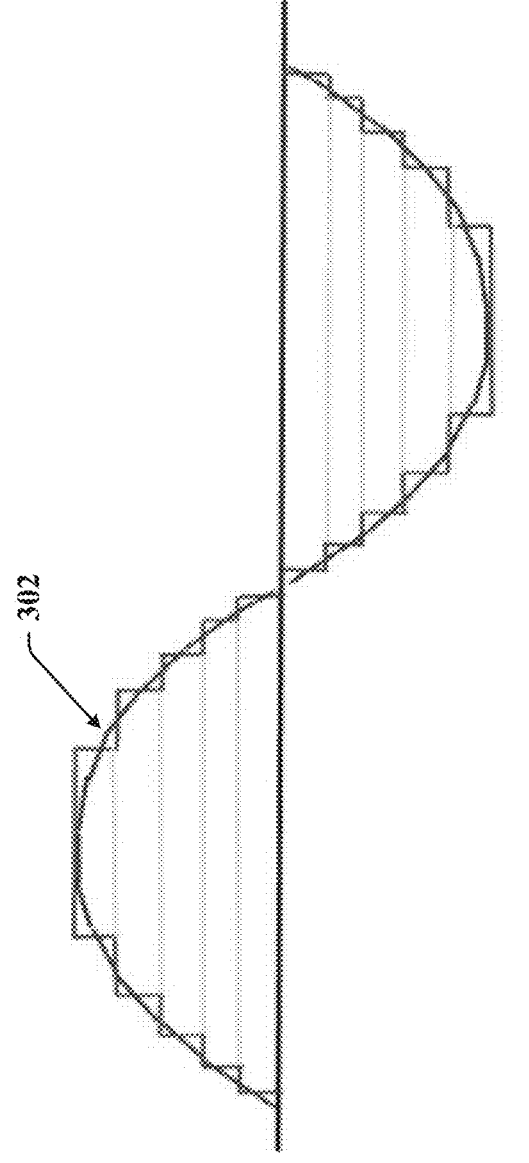
FIG. 3B illustrates a sine shaped wave form created by five smart cell nodes connected in series in accordance with one or more embodiments described herein.

FIG. 3A illustrates a SmartCell system 300 in accordance with one or more embodiments described herein. FIG. 3B illustrates a sine shaped wave form 302 created by five smart cell nodes connected in series in accordance with one or more embodiments described herein. Repetitive description of like elements and/or processes employed in respective embodiments is omitted for sake of brevity.

In an embodiment, SmartCell system 300 can comprise a primary node 306 that can dictate a behavior of SmartCell system 300, and the behavior of several secondary nodes that can be mounted directly on each smart cell cluster of SmartCell system 300. As described in one or more embodiments herein, one or more smart battery cells can be clustered to form a smart cell node (e.g., smart cell cluster 310). If smart cell nodes can be connected in series to form string 308 of smart cell nodes, a sine shaped wave form (e.g., sine shaped wave form 302) can be generated, wherein the sine shaped wave form can be a representation of electrical current, generated by string 308 of smart cell clusters, on an oscilloscope, and wherein the sine shaped wave form can drive electric motor 304. For example, sine shaped wave form 302 illustrated in FIG. 3B can be created by five smart cell nodes connected in series, wherein each smart cell node can generate one voltage step in the sine wave, as illustrated by the stepped sine wave form in FIG. 3B. Three strings (e.g., strings 308) of smart cell clusters (e.g., smart cell cluster 204, smart cell cluster 206, and smart cell cluster 208) in series connections can be connected to generate a 3-phase sine wave voltage output that can run an electric machine (e.g., electric motor 304). The voltage output can be controlled to achieve desired phase currents (torque) for controlling the electric machine.

If sufficient cell clusters can be connected in series to reach a desired voltage, SmartCell system 300 can be connected to, for example, a 50 Hertz (Hz) network to charge batteries or to supply the network with energy from cells. The circuit can allow for DC output (e.g., powering electronics and driving the vehicle motor) as well as AC output (e.g., 4-wheel drive). Since circuit boards mounted on individual smart battery cells (e.g., smart cell 101) or individual smart cell clusters can provide intelligence to the respective cells, secondary nodes on each cell cluster can utilize information broadcasted by primary node 306 to calculate a modulator angle and connect and disconnect themselves from the main battery based on the calculation. Each secondary node can be aware of its position in the SmartCell system 300, and all secondary nodes can receive the broadcasted information at the same time.

In another embodiment, the SmartCell system 300 (or SmartCell modulator) can be in a sleep state, wherein a timeout can occur, and secondary nodes can go to sleep for 5 seconds when the modulator state can be zero. Every 5 seconds the secondary nodes can wake up for a short time (around 300 ms) to check for communication on the network. Primary node 306 can be awake at all times. There can be a central node in an electric vehicle that SmartCell system 300 can be associated with, and the central node can wake up the necessary nodes. For example, the central node can wake up primary node 306 and one or more secondary nodes to change an operational state of the electric vehicle. Smart-Cell system 300 can also be in a bridge enable state that can be utilized to only enable the H-bridge when SmartCell system 300 is synchronized. During an emergency shut down of SmartCell system 300, the H-bridge can remain disabled. In an embodiment, primary node 306 can request a specific operation mode from the smart cell clusters and the smart cell clusters can assess system parameters such as current, temperature, etc. to decide if the H-bridge can be enabled.

SmartCell system 300 can also be capable of angle based PWM and DC control. For example, at low speeds and stand still, motor control can be viewed as DC currents in three phases (three strings of smart cell clusters connected in series, for example, strings 308) achieved by running PWM. Before executing a closed loop current control, a number of cell voltages can be output, and one of the cells can output a PWM duty cycle that can, together with other cells, produce a voltage that corresponds to a modulator angle at that instant. That is, PWM can be used to generate a desired voltage on each phase. In order to keep the desired current, secondary nodes can run DC current control at low speeds. The modulator can freeze and continue in a desired direction.

Further, SmartCell system 300 can be capable of over-current protection. All secondary nodes can sample cell current, H-bridge current, and temperature at a high rate. At every sampling occasion, the secondary nodes can compare current with an allowed max current for that instant. If the allowed current is exceeded, the individual smart cell clusters can go into bypass and set the over-current flag. The smart cell clusters can make such safety decisions without relying on radio communications. Each cell cluster can have its own configuration and sensor definition depending on individual differences in hardware, and the same software can be run in all modes. Since the cell clusters can have their own configurations, they can make independent decisions based on their location in SmartCell system 300.

Feedback from the secondary nodes can be used to present information from SmartCell system 300 via primary node 306. Upon implementation of field operated control (FOC), feedback from the secondary nodes can distribute measured current from all three phases about every 1 ms, if required from a control perspective. For example, information gathered from the secondary nodes presented by primary node 306 using serial communication can be represented as cell voltage values, iStringpeak values, modulator offset time values, modulator update offset time values, modulator state values, and/or other relevant values.

SmartCell system 300 can also be capable of cell voltage verification. Primary node 306 can measure total voltage on each string 308. A cell voltage measurement can be verified by activating one node at a time and comparing voltage values from secondary nodes with the total value measured by the primary node. This can be performed during start up. During DC operation, the cell voltages measured can be summed up by the secondary nodes and compared with the primary node's measured value. During AC operation, this implementation can be harder since a stable condition can be required for roughly 100 milliseconds to collect data from the secondary nodes. Cell voltage verification can assist in identifying that the cell voltage is measured correctly due to cell voltage measurement requirements for the system. Since primary node 306 can measure the phase voltage, all smart cell clusters, except one, can be put in bypass mode, as discussed herein. Then, the voltage of the cell not in bypass mode can be measured and read by primary node 306, and the values from the primary node voltage measurements and the cluster voltage measurements can be compared to determine if the voltage falls within the desired threshold.

The SmartCell system 300 can comprise additional capabilities of cell current sensor adaption. The secondary nodes can be equipped with a cost-effective current measurement solution with limited accuracy. Primary node 306 can be equipped with high accuracy current sensors. At every update primary node 306 can transmit phase current with a time stamp. The secondary nodes can, when they can have the opportunity, compare and adapt their current sensor.

Such an exemplary system with two cells in each cell cluster on each string can generate a sine wave wherein the size of a singular step of the sine wave can be equal to twice the cell voltage (as a result of two smart cells clustered in one cell cluster), and the resolution can depend on the modulator amplitude. The number of voltage steps in each sine wave can be equal to the number of cell clusters on the string producing the respective sine wave. In situations requiring better resolution for current control, one secondary node can run in PWM mode. When more speed or current is required, more cell clusters can be added, wherein the added clusters can generate a smoother sine wave.

Figure 4A:
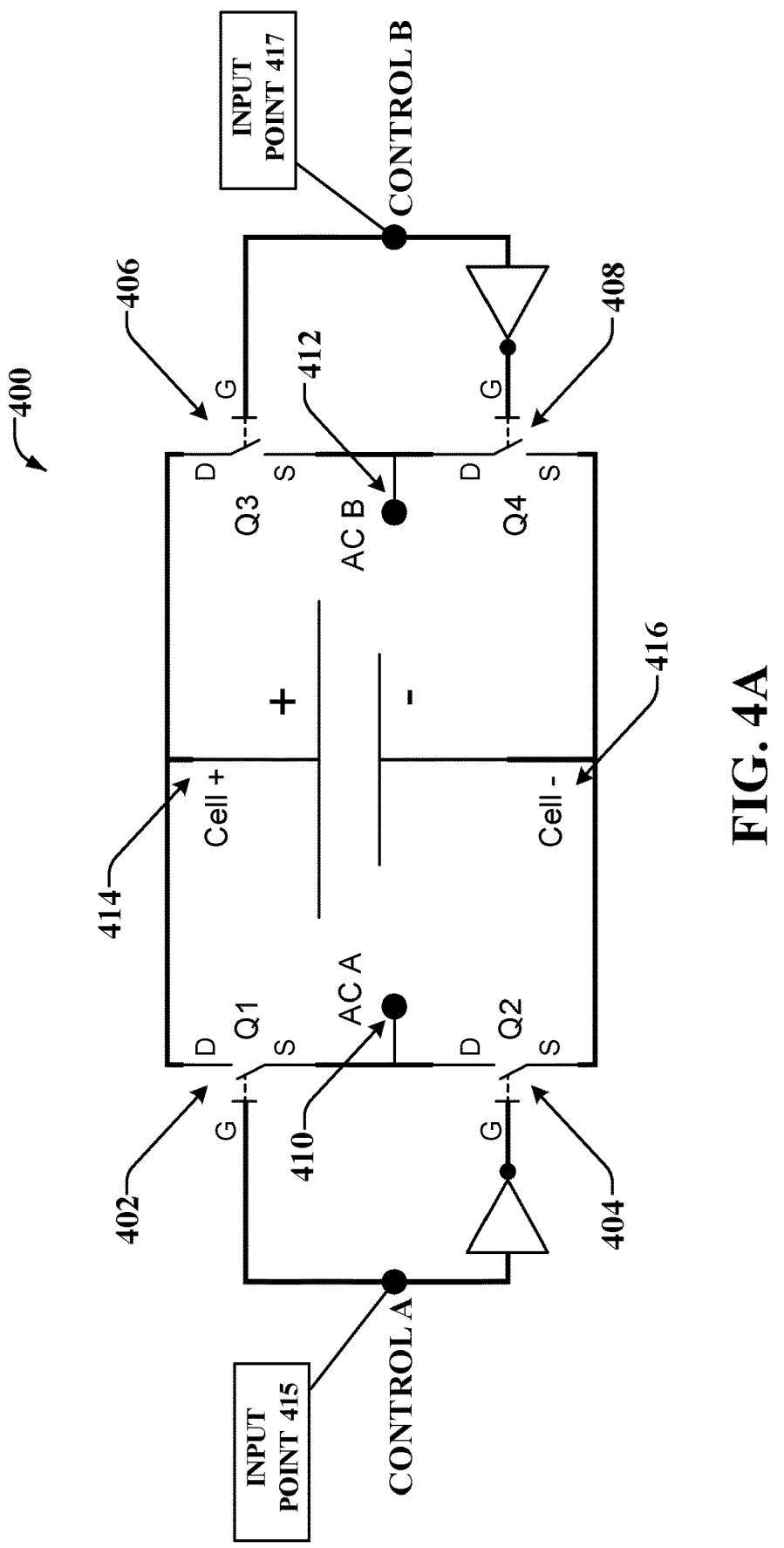
FIG. 4A illustrates an H-bridge circuit in accordance with one or more embodiments described herein.
Figure 4B:
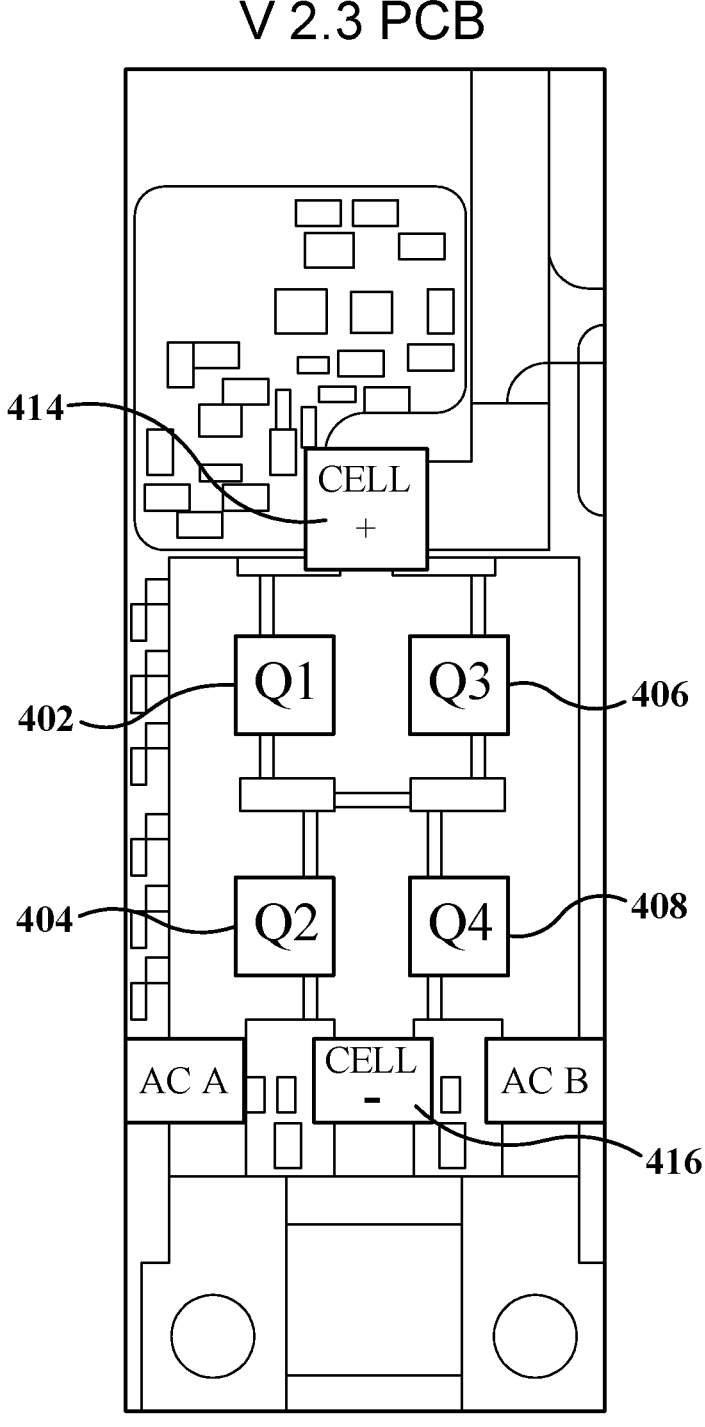
FIG. 4B illustrates an H-bridge circuit on a cell in accordance with one or more embodiments described herein.

FIG. 4A illustrates an H-bridge circuit 400 in accordance with one or more embodiments described herein. The H-bridge circuit 400 can comprise contactors Q1, Q2, Q3, and Q4 at 402, 404, 406, and 408, respectively. FIG. 4B illustrates H-bridge circuit 400 electrically coupled to a circuit board (e.g., circuit board 110) on a cell. Repetitive description of like elements and/or processes employed in respective embodiments is omitted for sake of brevity.

In an embodiment, contactors (Q1, Q2, Q3, and Q4) can be operated to generate outputs at point AC A at 410, and at point AC B at 412, wherein AC A and AC B can connect H-bridge circuit 400 to the rest of the circuit of a smart cell cluster. Upon closing contactors Q1 and Q3 (at 402 and 406, respectively), a bypass mode can be activated for the respective smart cell cluster such that the smart cell cluster can disconnect from the main battery without affecting current flow from the main battery. Upon closing contactors Q1 and Q4 (at 402 and 408, respectively), AC A can be connected to the positive terminal (illustrated as Cell+ in FIG. 4A) at 414 of the smart cell cluster and AC B can be connected to the negative terminal 416 of the smart cell cluster to product a positive voltage output, wherein the positive voltage output can create one step in a sine wave.

Similarly, upon closing contactors Q2 and Q3 (at 404 and 406, respectively), AC A can be connected to the negative terminal (illustrated as Cell− in FIG. 4A) at 416 of the smart cell cluster and AC B can be connected to the positive terminal 414 of the smart cell cluster to product a negative voltage output, wherein the negative voltage output can create another step in a sine wave. Thus, H-bridge circuit 400 can be put in three different states to create a desired voltage output that has a desired sine wave form to operate an electric motor. Contactors Q1, Q2, Q3, and Q4 can be operated by controller signals received by the H-bridge circuit through input point 415 (Control A) and input point 417 (Control B).

Figure 4C:
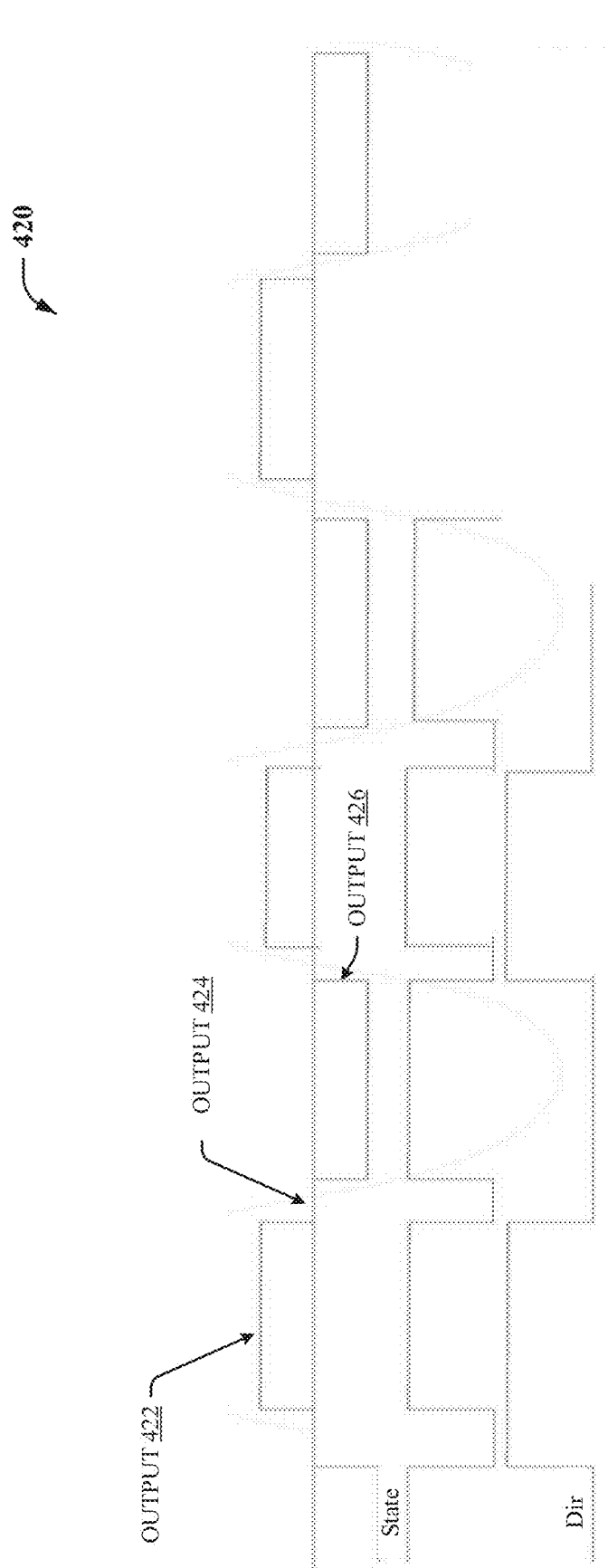
FIG. 4C illustrates an output generated by operating switches on an H-bridge circuit in accordance with one or more embodiments described herein.

FIG. 4C illustrates an output generated by operating switches on an H-bridge circuit in accordance with one or more embodiments described herein. Repetitive description of like elements and/or processes employed in respective embodiments is omitted for sake of brevity. FIG. 4C illustrates H-bridge output 420 generated by H-bridge circuit 400. Output 422 of FIG. 4C can represent a portion of the sine wave form that can be generated upon closing contactors Q1 and Q4, output 424 can represent a portion of the sine wave form of H-bridge output 420 that can be generated upon closing contactors Q1 and Q3 when the cell cluster can be in bypass mode, and output 426 can represent a portion of the sine wave form that can be generated upon closing contactors Q2 and Q3. Thus, a sine wave form can be generated by operating the various combinations of contactors on H-bridge circuit 400. In FIG. 4C, the plots for "state" and "dir" as indicated in FIG. 4C can represent control flags in a software.

Figure 4D:
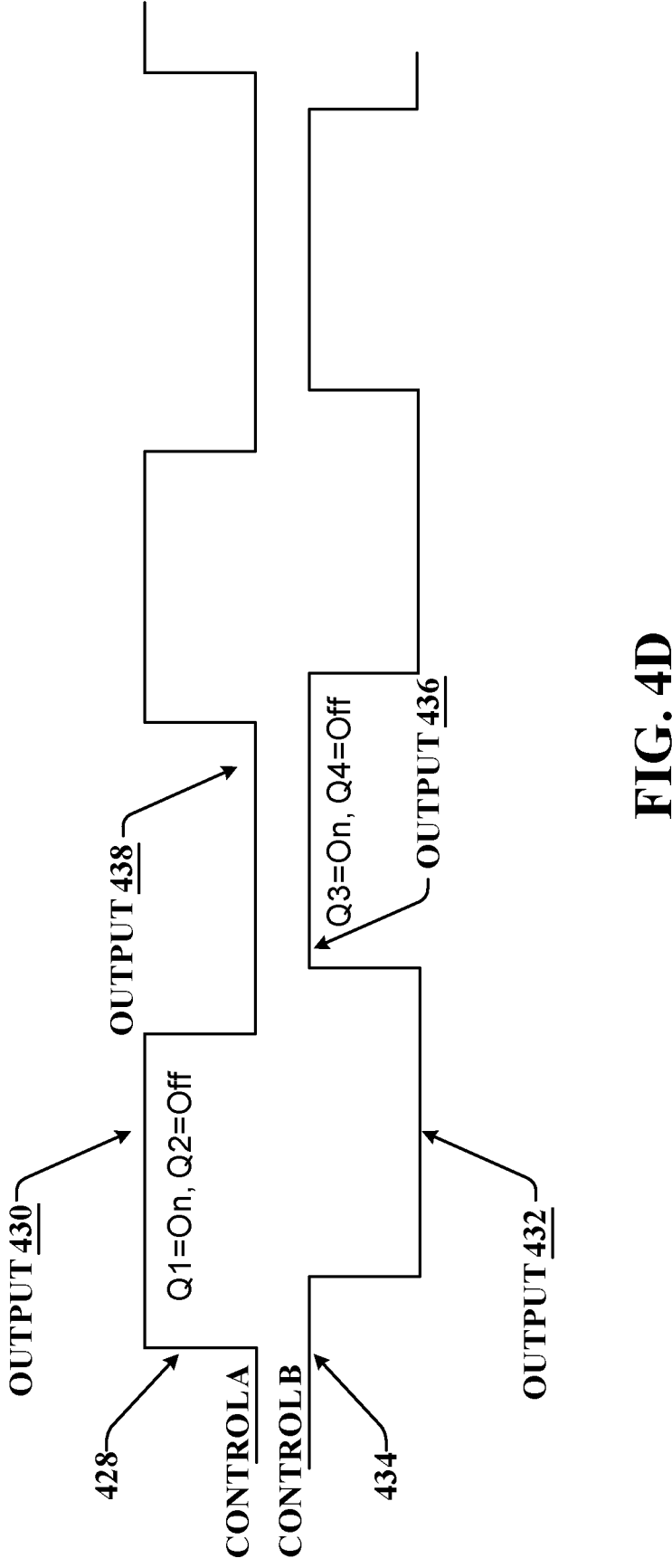
FIG. 4D illustrates outputs generated by operating switches on an H-bridge circuit in accordance with one or more embodiments described herein.

FIG. 4D illustrates outputs generated by operating switches on an H-bridge circuit in accordance with one or more embodiments described herein. Repetitive description of like elements and/or processes employed in respective embodiments is omitted for sake of brevity. FIG. 4D illustrates signal 428 and signal 434 generated by a controller and received by H-bridge circuit 400 at input points 415 and 417, respectively, of FIG. 4A. Signal 428 can control contactors Q1 and Q2 (at 402 and 404, respectively, of FIG. 4A) and signal 434 can control contactors Q3 and Q4 (at 406 and 408, respectively, of FIG. 4A) to produce the sine wave output.

A controller for the smart cell cluster can generate the two signals, 428 and 434. Signal 428 can ensure that contactors Q1 and Q2 are not closed at the same time since that can cause H-bridge circuit 400 to short circuit, and similarly, signal 434 can ensure that contactors Q3 and Q4 are not closed at the same time to prevent short circuiting H-bridge circuit 400. A resultant output of the two control signals combined can produce H-bridge output 420 of FIG. 4C. For example, output 430 of the controller signal can cause contactor Q1 to close and contactor Q2 to open, which in conjunction with output 432 of signal 434 can produce output 422 (positive voltage output) and output 424 (bypass mode) of FIG. 4C. For example, output 436 of the controller signal can cause contactor Q3 to close and contactor Q4 to open, which in conjunction with output 438 of the signal 428 can produce output 426 (negative voltage output) and a subsequent bypass mode of FIG. 4C.

Figure 5A:
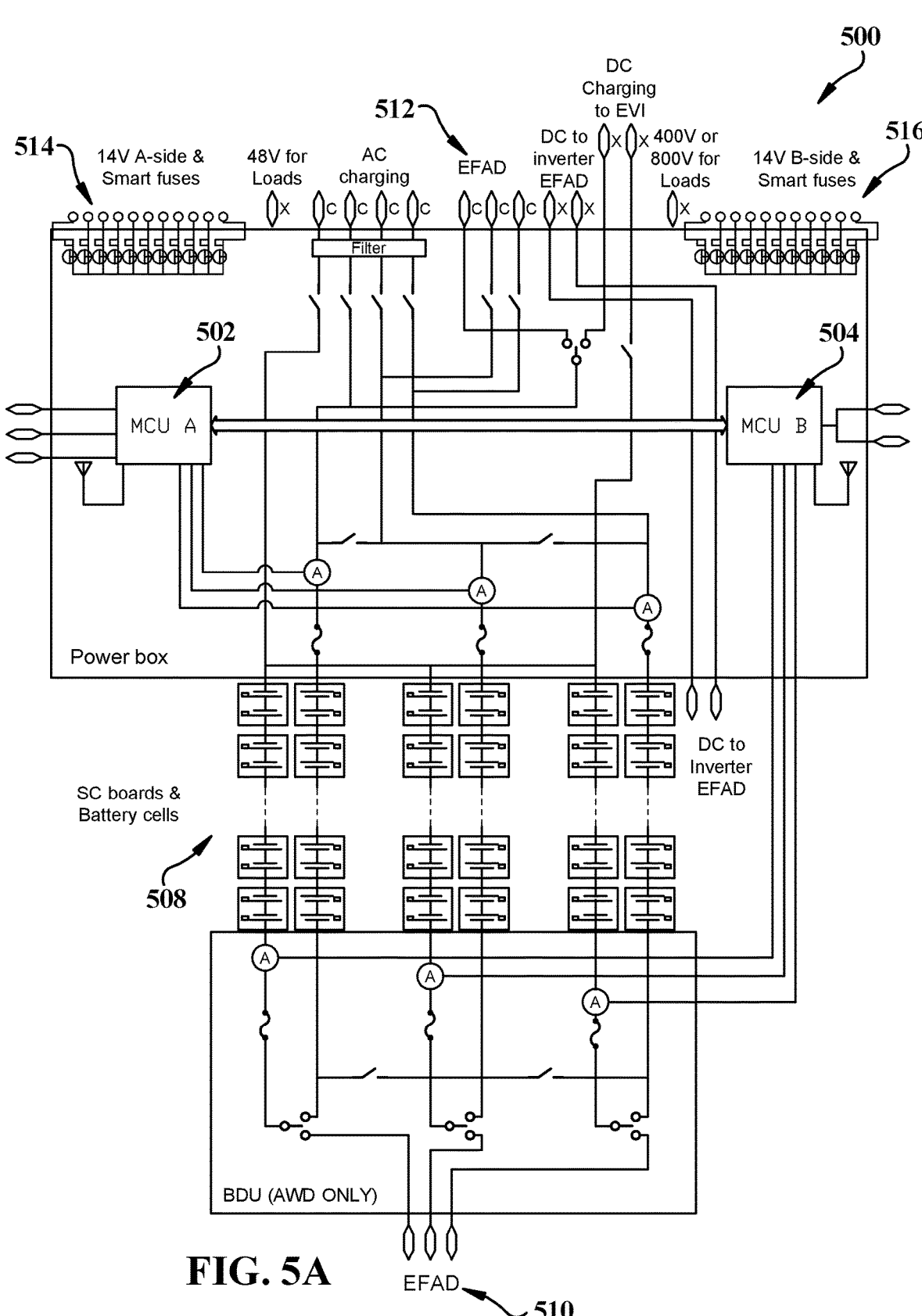
FIG. 5A illustrates an example configuration for connecting cells to run an electrical motor in accordance with one or more embodiments described herein.
Figure 5B:
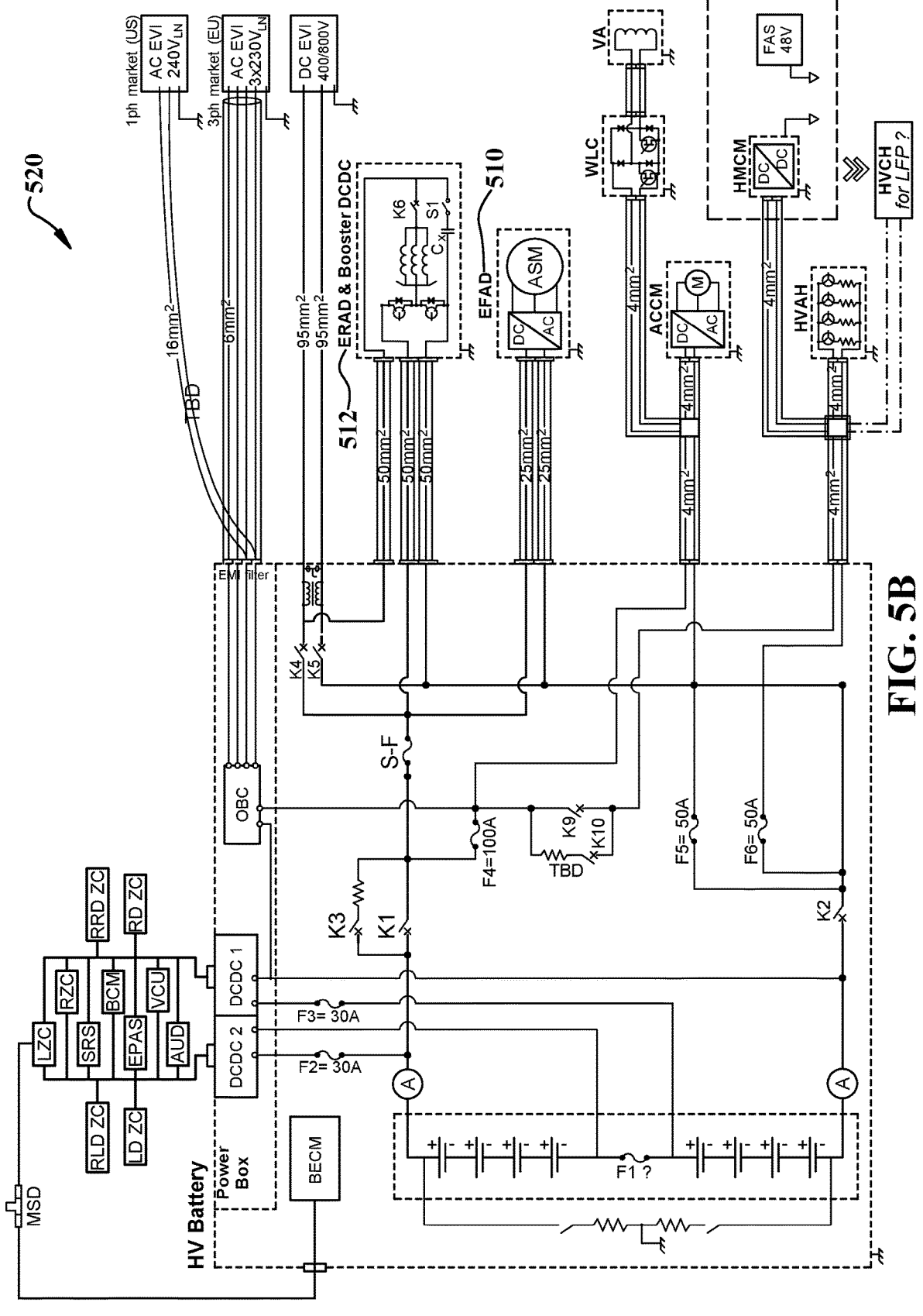
FIG. 5B illustrates a schematic representation of an embodiment in accordance with one or more embodiments described herein.

FIG. 5A illustrates an example configuration for connecting cells to run an electrical motor in accordance with one or more embodiments described herein. FIG. 5A illustrates an exemplary configuration 500 for connecting cells to run an electrical motor. FIG. 5B illustrates a schematic representation of an exemplary system 520 of an embodiment in accordance with one or more embodiments described herein. FIGS. 5A and 5B illustrate electrical connections between various components in an electric vehicle. Motor Control Unit A (MCU A) at 502, MCU B at 504, SmartCell boards (SC boards) and battery cells at 508, electric front axle drive (EFAD) at 510 (also illustrated in FIG. 5B), and electric rear axle drive (ERAD) at 512 (also illustrated in FIG. 5B). FIG. 5A illustrates 11 DCDC outputs at 514 and 11 DCDC outputs at 516 in accordance with one or more embodiments herein. Repetitive description of like elements and/or processes employed in respective embodiments is omitted for sake of brevity.

As discussed in one or more embodiments, smart battery cells can be clustered and individual cell clusters can be connected in series to produce a desired voltage. Three strings of cell clusters can be connected to generate a 3-phase sine wave current that can operate an electric motor. In an embodiment, each of the three strings can be split into two sub-strings, as illustrated by SC boards and battery cells at 508 such that one sub-string can be employed to run the front wheel motor at 510 and another sub-string can be employed to run the rear wheel motor at 512. In this manner, redundancy can be implemented in the system. MCU A can run the car regardless of the status of MCU B, and vice versa. MCU A can control one part of the DCDC outputs (like standard GPA), and MCU A can control the modulator for the rear wheels. MCU B can control the other part of DCDC outputs, and MCU B can control the modulator for the front wheel.

Figure 6A:
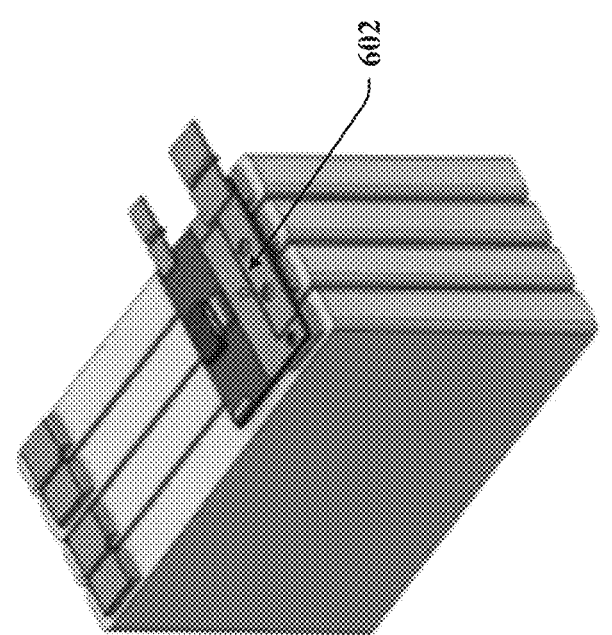
FIG. 6A illustrates a cluster of smart battery cells in accordance with one or more embodiments described herein.
Figure 6B:
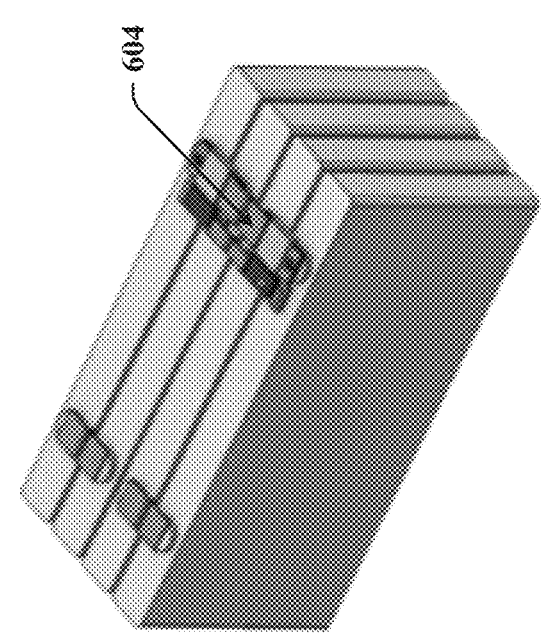
FIG. 6B illustrates another cluster of smart battery cells in accordance with one or more embodiments described herein.
Figure 6C:
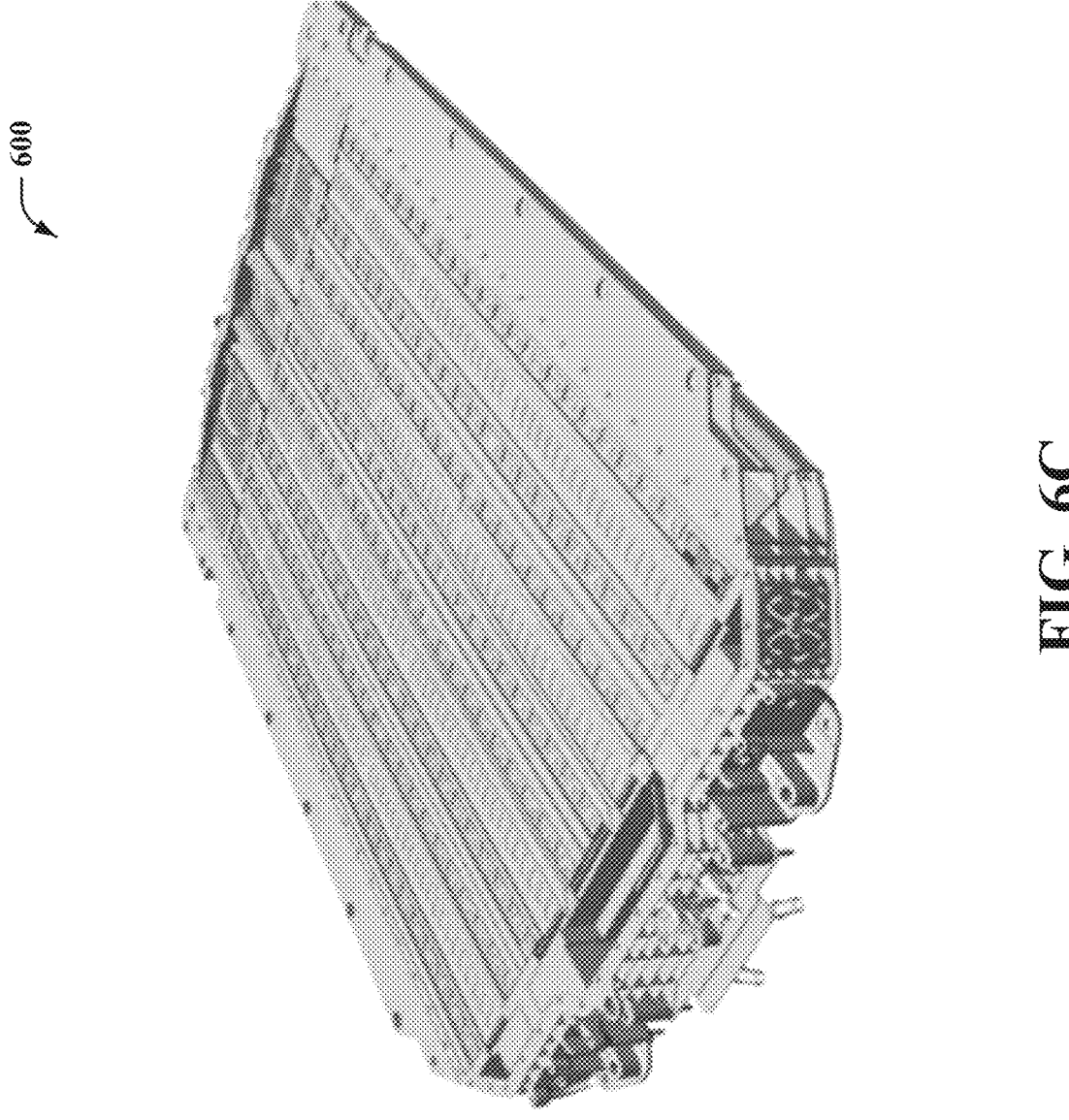
FIG. 6C illustrates a cell packing configuration in accordance with one or more embodiments described herein.

FIG. 6A illustrates a cluster of smart battery cells in accordance with one or more embodiments described herein. FIG. 6B illustrates another cluster of smart battery cells in accordance with one or more embodiments described herein. FIG. 6C illustrates cell packing configuration 600 in accordance with one or more embodiments described herein. Repetitive description of like elements and/or processes employed in respective embodiments is omitted for sake of brevity.

Mechanical integration can be a large part of clustering battery cells (e.g., two cells, four cells, etc.). It can allow for space for a gas evacuation channel to remain as designed and replace an existing busbar. Next generation cells can have a small cell-to-cell distance of approximately 30 millimeters (mm) which can put a limit to a size of the power module. Height can be restricted but the design can allow for cooling through the bottom plate to the ambient air. FIG. 6A illustrates, at 602, a cluster of four smart battery cells connected via smart cell busbars, and FIG. 6B illustrates, at 604, a cluster of four smart battery cells connected via traditional busbars.

Figure 7A:
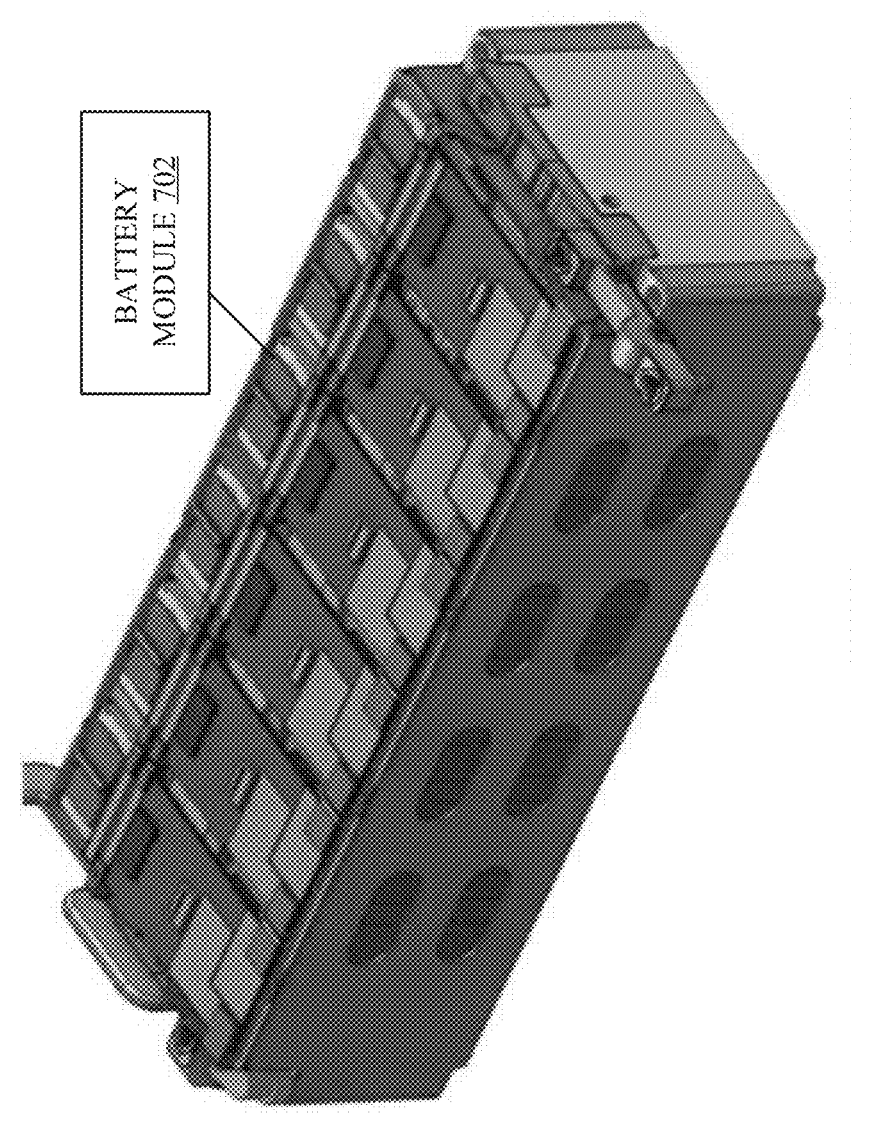
FIG. 7A illustrates a module for a vehicle core in accordance with one or more embodiments described herein.
Figure 7B:
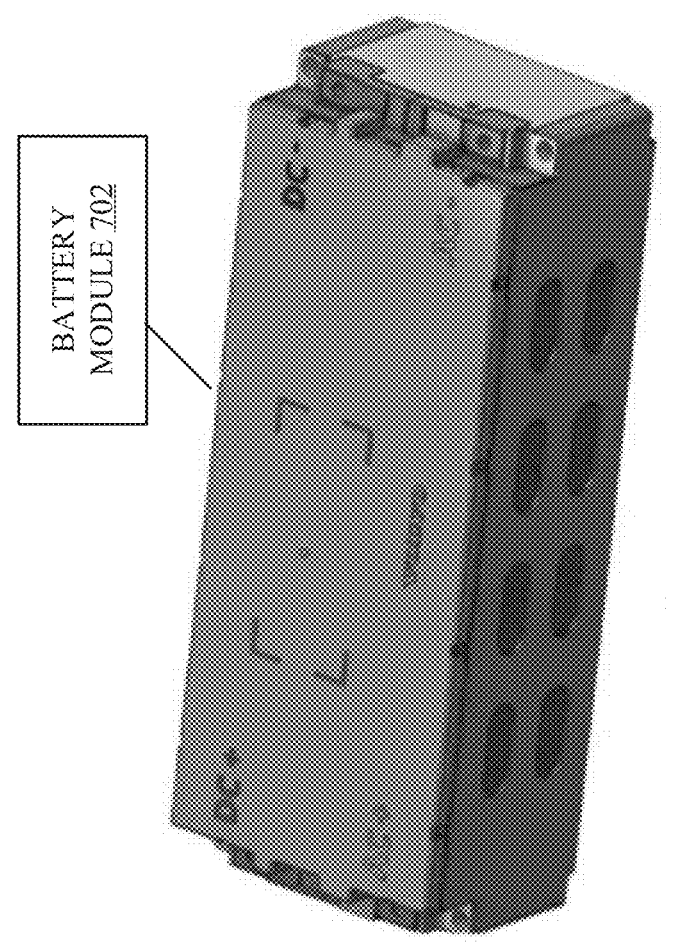
FIG. 7B further illustrates a module for a vehicle core in accordance with one or more embodiments described herein.

FIG. 7A illustrates a module for a vehicle core in accordance with one or more embodiments described herein. FIG. 7B further illustrates a module for a vehicle core in accordance with one or more embodiments described herein. FIGS. 7A and 7B illustrate battery module 702. Repetitive description of like elements and/or processes employed in respective embodiments is omitted for sake of brevity.

Figure 8:
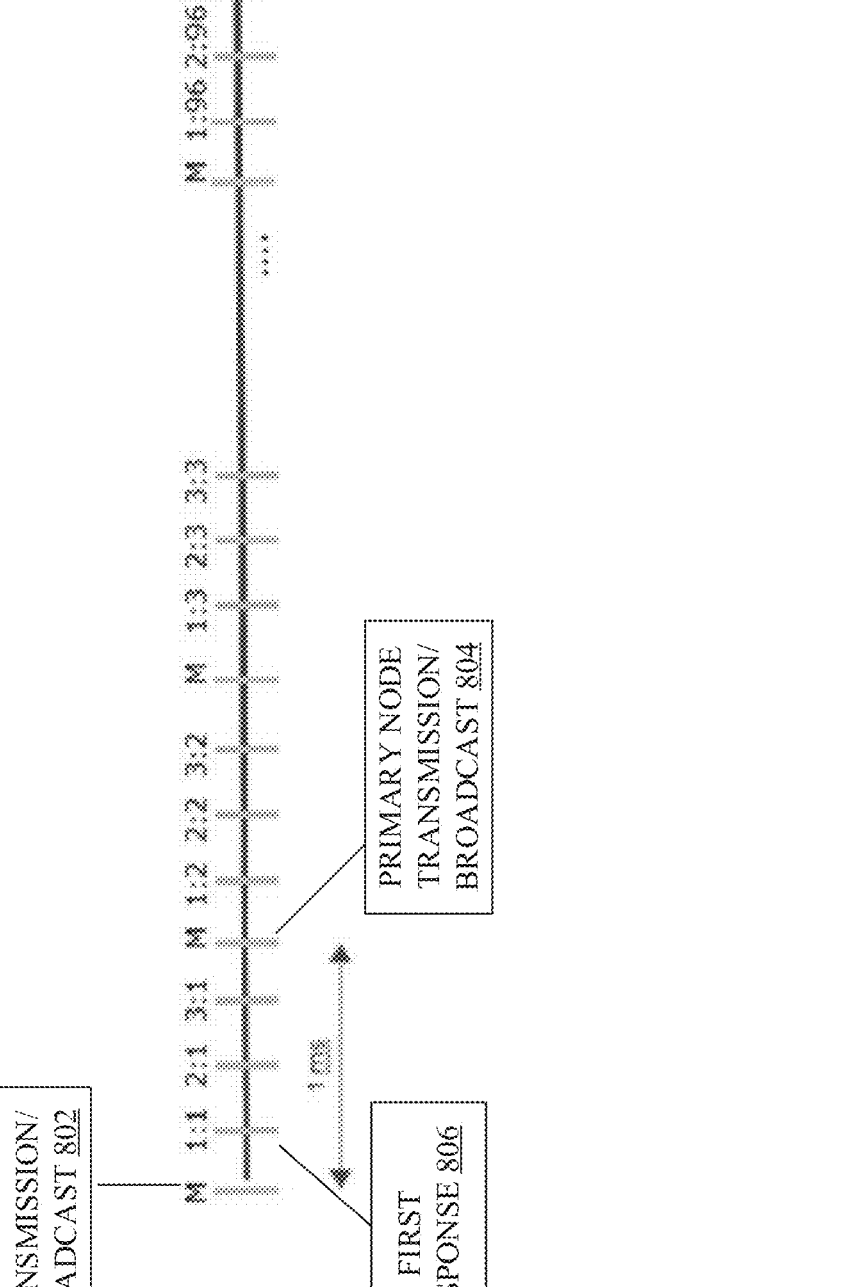
FIG. 8 illustrates a timeline of secondary responses between every primary transmission in accordance with one or more embodiments described herein.

FIG. 8 illustrates a timeline of secondary responses between every primary transmission in accordance with one or more embodiments described herein. Repetitive description of like elements and/or processes employed in respective embodiments is omitted for sake of brevity.

The system built by a primary node and secondary nodes can be referred to as a SmartCell modulator. The primary node (e.g., primary node 306) can generate a virtual sine wave. This can be done by broadcasting propulsion request information with a predetermined pace, for example, about every millisecond (1 ms) by the primary node. For example, the primary node can broadcast data at about 1 kilohertz (kHz). Broadcasting can be done over radio or other galvanic isolated communication method. Since broadcasted transmission delay can be well defined and an absolute time can be transmitted in the broadcasted message, the complete system can have the same absolute time with an accuracy better than 1 microsecond (1 μs). The secondary nodes can have time slots scheduled to distribute information to the system. The secondary nodes can broadcast a message in the same manner as the primary node and the system of cell clusters can receive one response from one cell cluster about every 1 ms.

Thus, all nodes (e.g., primary nodes and secondary nodes) in the system can acquire all the information flowing in the network and all nodes can have up to date information about the 3-phase sine wave current. The scheduled secondary node responses can be made so that one secondary node (one from each string) can have time to respond between every primary node transmission. For example, primary node transmission/broadcast 802 and primary node transmission/broadcast 804 can be about 1 ms apart during which time, a secondary node of a smart battery cell cluster can generate a first response 806. Thus, for example, current from each string with the same time stamp can be available on the network and it can be possible to analyze the AC current about every 1 ms based on the internal current sensors in the secondary nodes. Thus, for example, for a SmartCell system comprising a total of hundred smart cell clusters on each string, it can take about 100 ms for the current to loop through the whole system, in which time, the SmartCell system can be aware of all important information such as cell voltages, cell temperatures, etc.

Figure 9B:
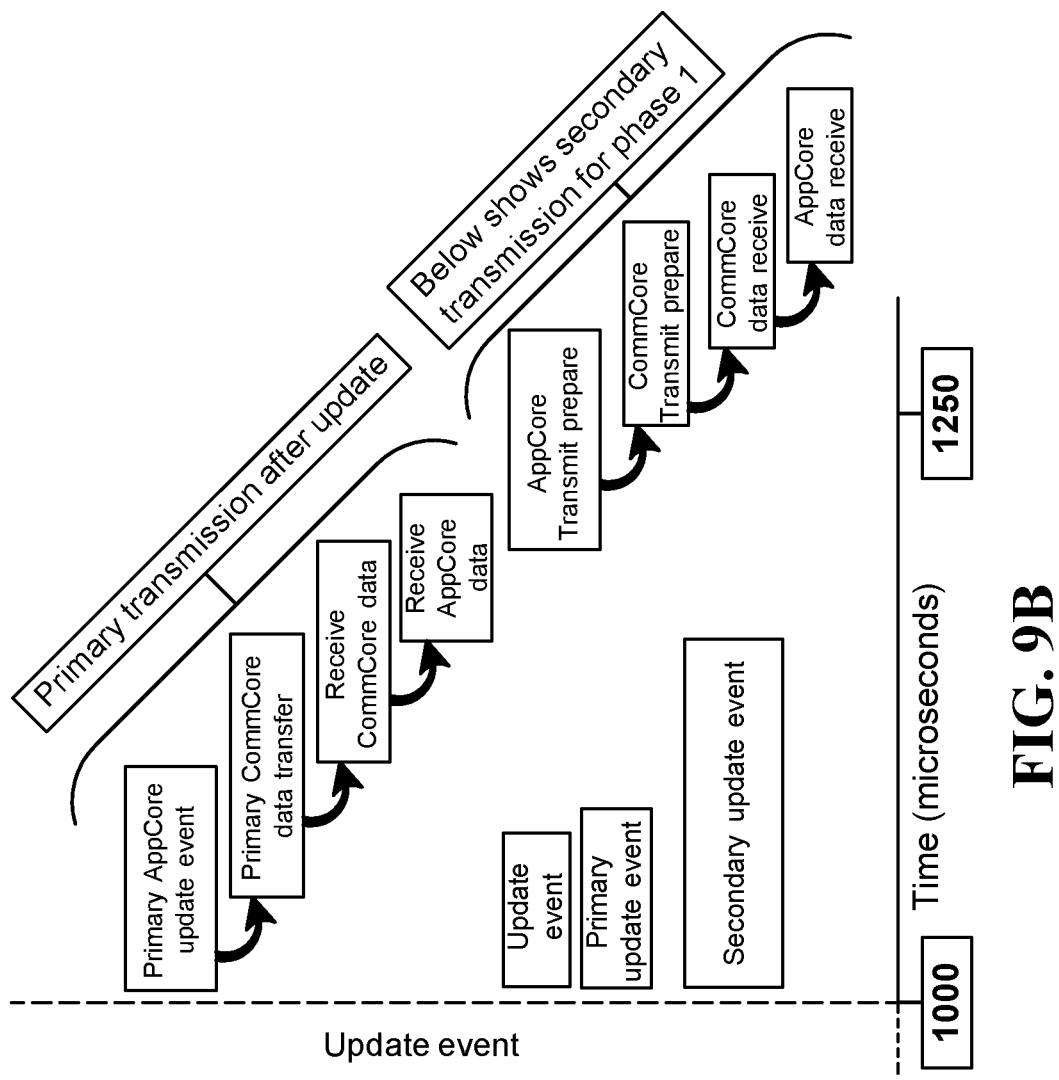
FIG. 9B illustrates an update event sequence continued from FIG. 9A in accordance with one or more embodiments described herein.

FIG. 9A illustrates an update event sequence in accordance with one or more embodiments described herein. FIG. 9B illustrates an update event sequence continued from FIG. 9A in accordance with one or more embodiments described herein. Repetitive description of like elements and/or processes employed in respective embodiments is omitted for sake of brevity. An update event (e.g., update event at 902) can be defined as the base event for all time synchronized changes in a SmartCell modulator (e.g., SmartCell system 300). A primary transmission (e.g., primary transmission 802) from the primary node (e.g., primary node 306) can always occur immediately following update event 902, after which a secondary transmission (e.g., first response 806) can occur, followed by subsequent primary and secondary transmissions. For example, as illustrated at 902, all nodes (primary node and secondary nodes) can measure current at the same time during an update event. For example, as illustrated at 922, a primary update event (update event specific to the primary node) can occur during which the SmartCell system can measure a resolver angle and receive a current modulator angle. For example, as illustrated at 924, a secondary update event (update event specific to the secondary nodes) can occur during which current can be measured, a timer can be set up for new interrupt events, and a cycle time can be updated.

Further, at 924, an update watchdog event can be executed in accordance with the code description at 924, wherein the secondary nodes can expect messages from the primary node after every update, when the SmartCell modulator can be running. If the secondary nodes don't receive messages for a certain number of updates (e.g., 5 updates, 10 updates, etc.) they can go into an emergency shutdown (bypass state), after which the secondary nodes can require a new initiation process to start again. In FIG. 9A, the primary transmission sequence can be illustrated at acts 904-910, and the secondary transmission sequence can be illustrated at acts 912-920.

At act 904, a primary update event can be executed wherein an Application Core (AppCore) can receive a broadcasting request comprising a phase voltage request, a phase angle request, cycle time, resolver angle information and/or other parameters. AppCore can prepare a message comprising the phase voltage request, phase angle request, cycle time, resolver angle information and/or other parameters, save the message in core transfer memory, and notify a Communication Core (CommCore) that the message can be sent. Act 904 can be followed by act 906 where a primary CommCore data transfer can collect the message from core transfer memory and transmit the message. At 908, all secondary nodes can receive CommCore Data transmitted at 906 as the message, save the message to core transfer memory, and notify AppCore that the message has been received. At 910, all secondary nodes can receive AppCore Data. Herein the message transmitted at 908 can be present, desired cycle time can be updated, and motor control routines can be run based on a received request, and phase can be determined based on resolver angle and modulator angle.

At 912, the secondary node that can generate a secondary response in response to the primary transmission, can prepare a message and AppCore can transmit the message, save the message in core transfer memory, and notify CommCore that the message should be sent. Subsequently, at 914, the secondary node can execute a CommCore transmit wherein the secondary node can receive the message transmitted at 912, from the core transfer memory, and transmit the message to other secondary nodes. Subsequently at 916, all secondary nodes, except the secondary node that transmits the message at 912, can receive the message, save the message to core transfer memory, and notify AppCore that the message has arrived. Subsequently, at 920, all secondary nodes, except the secondary node that transmits the message at 912, can receive the AppCore data. Herein, the message transmitted at 916 can be present and an update event dependent code can be run. All changes in the system can be updated at update event 926.

Figure 10:
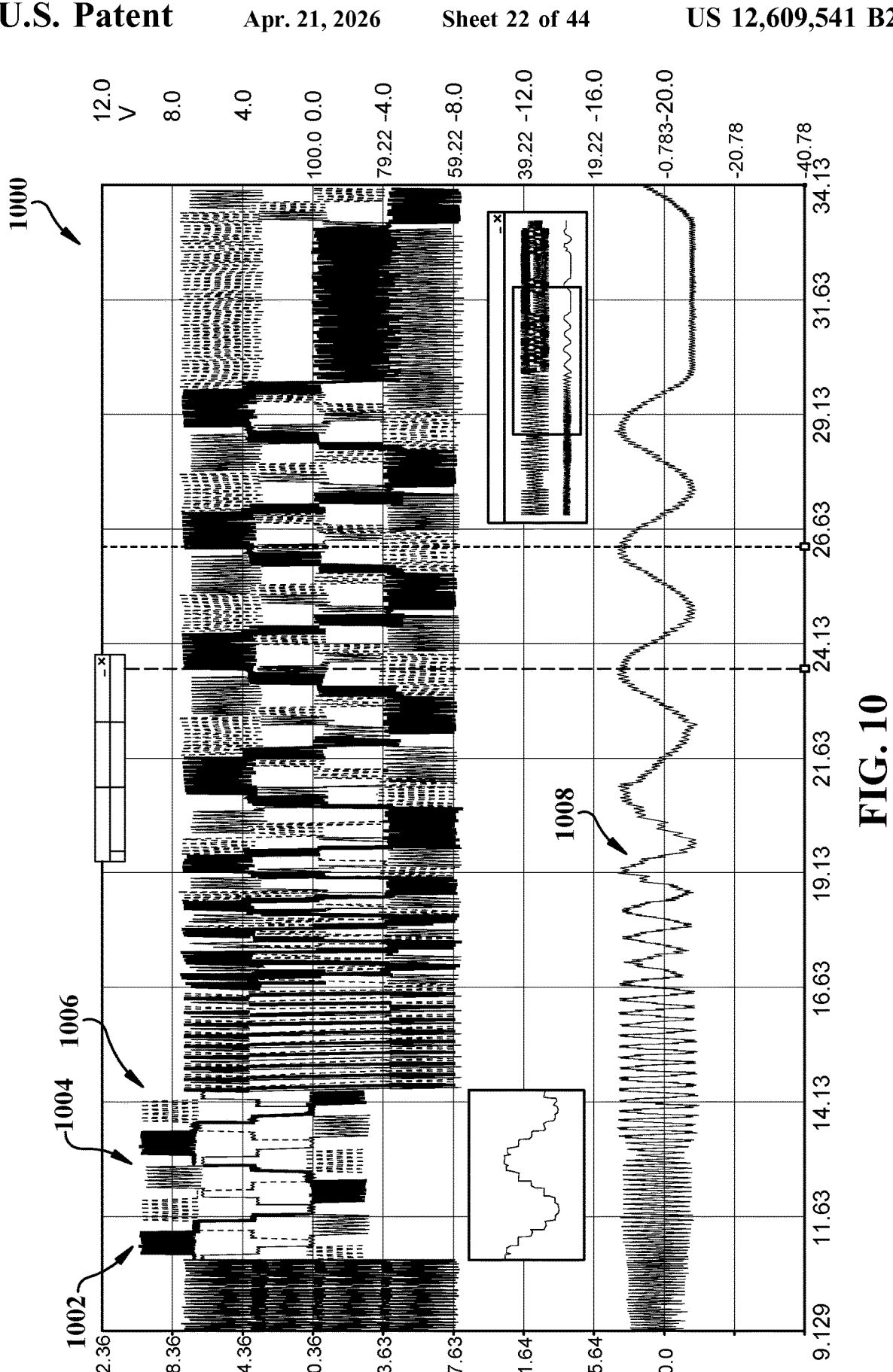
FIG. 10 illustrates an oscilloscope representation of a 3-phase sine wave in accordance with one or more embodiments described herein.

FIG. 10 illustrates an oscilloscope representation 1000 of a 3-phase sine wave in accordance with one or more embodiments described herein. Repetitive description of like elements and/or processes employed in respective embodiments is omitted for sake of brevity.

As discussed in one or more embodiments herein sine wave outputs 1002, 1004, and 1006 of FIG. 10 can illustrate phase voltages generated by three individual strings of smart cell clusters connected in series, wherein each string can generate an individual sine wave. Voltage outputs generated by secondary nodes on all three-strings of a SmartCell system can be visualized as illustrated by sine wave outputs 1002, 1004, and 1006. Plot 1008 illustrates a phase current in one of the three-phases of the SmartCell system, wherein SmartCell system can be used to operate an electric motor. The oscilloscope representation 1000 illustrates how a desired phase current can be generated by controlling individual smart cell clusters on individual phases (strings) of a SmartCell system.

Figure 11:
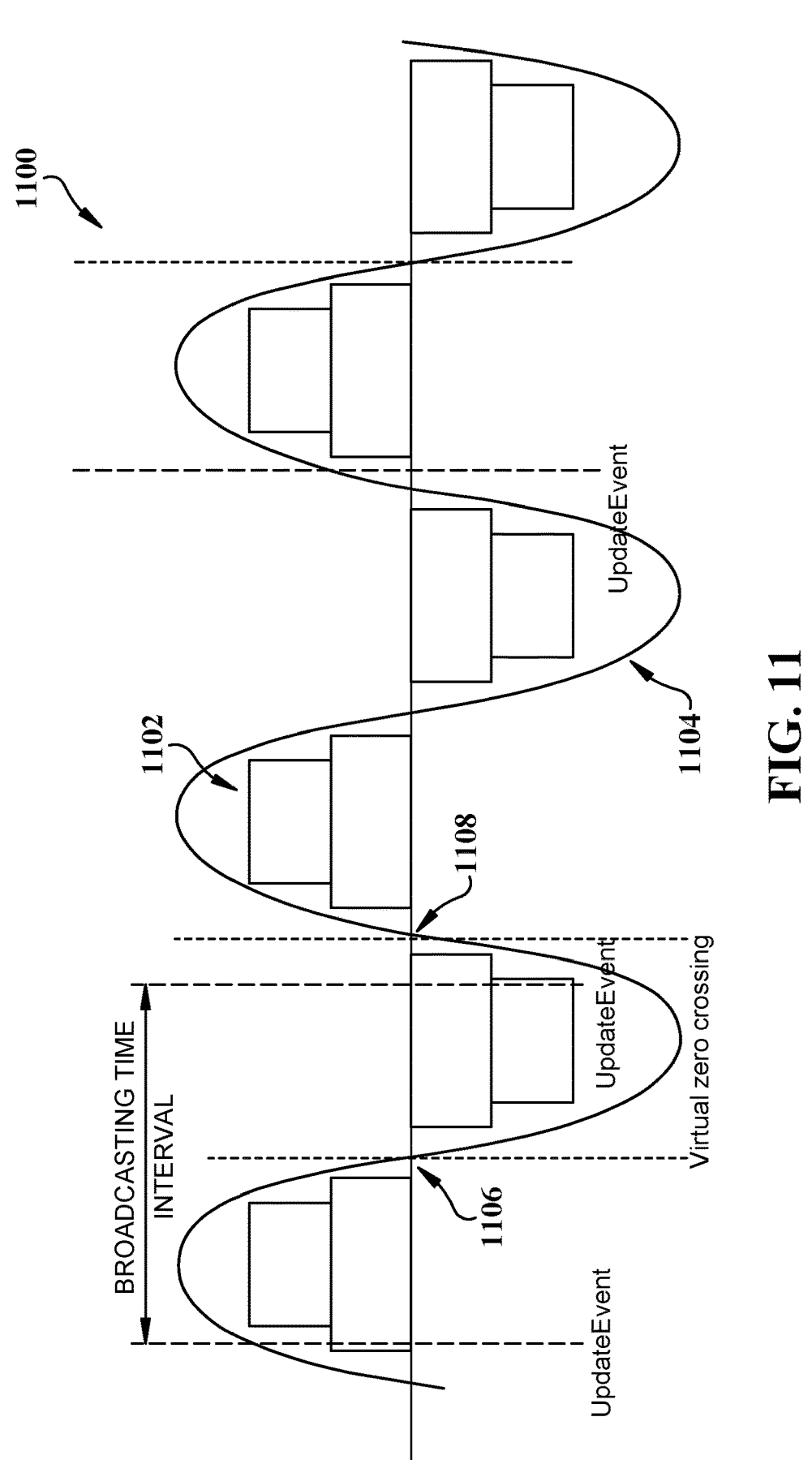
FIG. 11 illustrates an update event graph in accordance with one or more embodiments described herein.

FIG. 11 illustrates update event graph 1100 in accordance with one or more embodiments described herein. FIG. 11 illustrates sine wave output 1102 generated by a smart cell system comprising two smart cell clusters, wherein each smart cell cluster produces a step on the sine wave. FIG. 11 further illustrates virtual sine wave voltage 1104 that the smart cell system can generate. Points 1106 and 1108 can indicate zero voltage points or a virtual zero crossing, where the virtual sine wave voltage is 0V (zero volts). Repetitive description of like elements and/or processes employed in respective embodiments is omitted for sake of brevity.

As discussed in one or more embodiments herein, the primary node (e.g., primary node 306) in a SmartCell modulator (e.g., SmartCell system 300) can generate a virtual voltage sine wave to control the secondary nodes and produce a 3-phase sine wave current that can control an electric motor. The primary node can also generate update events, wherein an update event can be an absolute time base for the SmartCell system. All cells in the SmartCell modulator can have the same absolute time and they can know when the primary node sends its message after an update. Time values can be related to absolute update times in all cells.

For example, the primary node can receive a torque request from the vehicle. Using the update event as a base, in order to be able to control the magnetic field of an electrical machine, the primary node can calculate and broadcast the requested cycle time, phase information, and other parameters. These values can be used during the next update in the complete system. There can be plenty of time to broadcast data to secondary nodes, wherein an interval between update events can be about 1 ms. The update interval must be short enough to allow sufficient machine control. To successfully achieve broadcasted machine control, it can be beneficial to request phase current and phase angle together with phase information. Phase current can be measured and controlled by each secondary node much faster than the broadcasted update interval.

Table 1 lists parameters and their message sizes included in a primary general broadcast message. It is to be appreciated that the parameters that can be broadcasted during an update event can vary based on the situation and system requirements. Thus, the parameters and values listed in table 1 can represent an exemplary scenario and the values can vary based on the situation and control strategy adopted. During an update event, certain types of data can be broadcasted consistently, for example, the same type of data (e.g., propulsion data) can be broadcasted as a request to the secondary nodes of the smart cell clusters. Along with such data, extra data can be sent to the secondary nodes wherein the extra data can comprise a request for specific information from the secondary nodes, or the extra data can comprise a request to the secondary nodes to perform in a specific manner. The different types of data can be broadcasted as messages, in accordance with one or more embodiments described herein. In this manner, a protocol can be developed based on the different message request types.

TABLE 1

Primary general broadcast message (sent every ms).

| info | size [bits] | | |
|---|---|---|---|
| message size [bytes] | 8 | | |
| message type | 8 | | |
| timeStamp | 32 | 4294, 967 | s |
| modeReq | 8 | | |
| Request control bits | 16 | | |
| Phase current request | 12 | | |
| Phase angle request | 12 | | |
| cycleTime request | 16 | 65536 | |
| Max speed change rate | 12 | | |
| Modulator angle/time to next volt zero crossing | 32 | 4294, 967 | |
| Resolver angle | 12 | 4096 | |
| Phase 1 current | 16 | | |
| Phase 2 current | 16 | | |
| Phase 3 current | 16 | | |
| Transformer 14 V predicted power | 10 | | |
| Transformer 48 V predicted power | 10 | | |
| Transformer 400 V predicted power | 10 | | |
| checksum | 12 | | |
| encryption | 12 | | |
| Total message size | 270 0.27 kbit | 33.75 bytes | |

| Communication speed |
|---|
| 2000 kbit/s |

| Message time |
|---|
| 135 μs |

Figure 25:
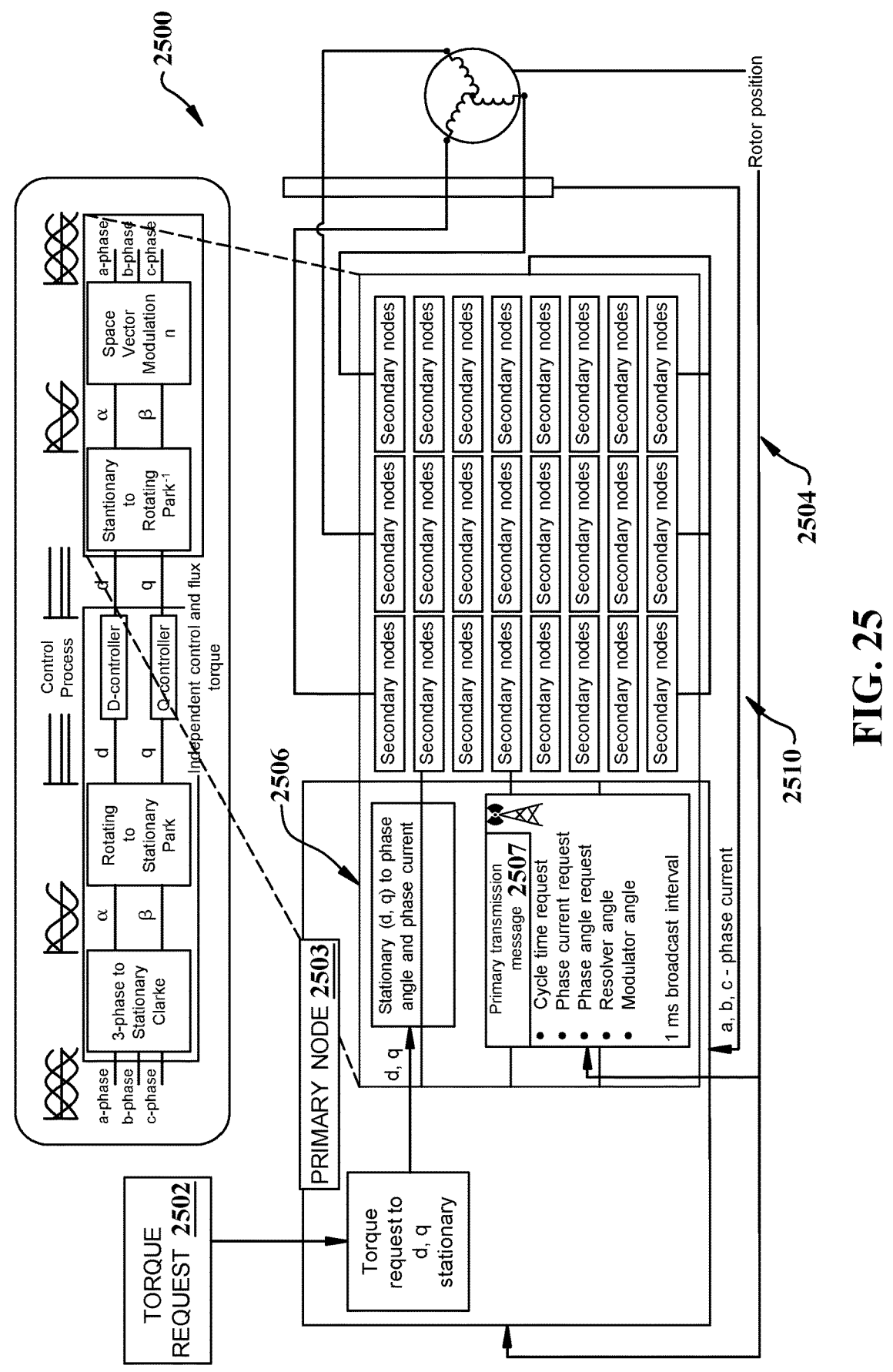
FIG. 25 illustrates a flow diagram of distributed feedback control in accordance with one or more embodiments described herein.

Table 2 lists parameters and their message sizes included in a secondary general broadcast message. The parameters listed in table 2 are exemplary and can vary based on the system requirements. It is to be appreciated that although a SmartCell system (e.g., SmartCell system 300) can require information from one or more secondary nodes (e.g., in the form of a secondary general broadcast message as illustrated in FIG. 2), the SmartCell system does not need the information as feedback to execute a control loop. That is because, as indicated in FIG. 25, in one or more embodiments, responsibility for feedback control can be distributed to the one or more secondary nodes such that the secondary nodes can execute a control loop.

TABLE 2

Primary general broadcast message (sent about every ms).

| size [bits] | size | | |
|---|---|---|---|
| message size [bytes] | 8 | | |
| message type | 8 | | |
| timeStamp | 32 | 4294, 967 | s |
| Device adress | 10 | 1024 | |
| DeviceInPhase | 3 | | |
| modeStS | 8 | | |
| Control bits Status | 16 | | |
| Phase current | 16 | | |
| Phase angle | 12 | | |
| Cell voltage × 4 | 48 | | |
| SOC × 4 | 48 | | |
| Cell temp × 4 | 48 | | |
| SOH × 4 | 48 | | |
| Transformer power | 10 | | |
| Transformer voltage | 10 | | |
| FaultCodes | 16 | | |
| checksum | 12 | | |
| encryption | 12 | | |
| Total message size | 365 | 45,625 0.365 kbit | |

| Communication speed |
|---|
| 2000 kbit/s |

| Message time |
|---|
| 182.5 μs |

Table 3 lists request control bits and Mode status (Mod-eSts) definitions in accordance with one or more embodiments herein. For example, a request for starting the modulator can require 6 bits of storage. For example, a mode status of 11 can indicate a request for speed control within the SmartCell system. The parameters listed in table 3 are exemplary and can vary based on the system requirements. Tables 1, 2 and 3 illustrate exemplary values for parameters that can be included in a message specification (e.g., a message broadcasted by a primary node).

TABLE 3

| bit | Request control bits | ModeSts definition |
|---|---|---|
| 0 | Rate Override | 0 - Sleep |
| 1 | Even Distribution | 1 - Standby |
| 2 | Modulator Freeze | 10 - Speed control |
| 3 | Secondary Feedback Enable | 11 - Torque Control |
| 4 | Auto Correction | 20 - DC charging series mode |
| 5 | Modulator Reverse Direction | 21 - DC charging parallel mode |
| 6 | Start Modulator | 22 - AC charging one phase |
| 7 | Stop Modulator | 23 - AC charging three phase |

Figure 12:
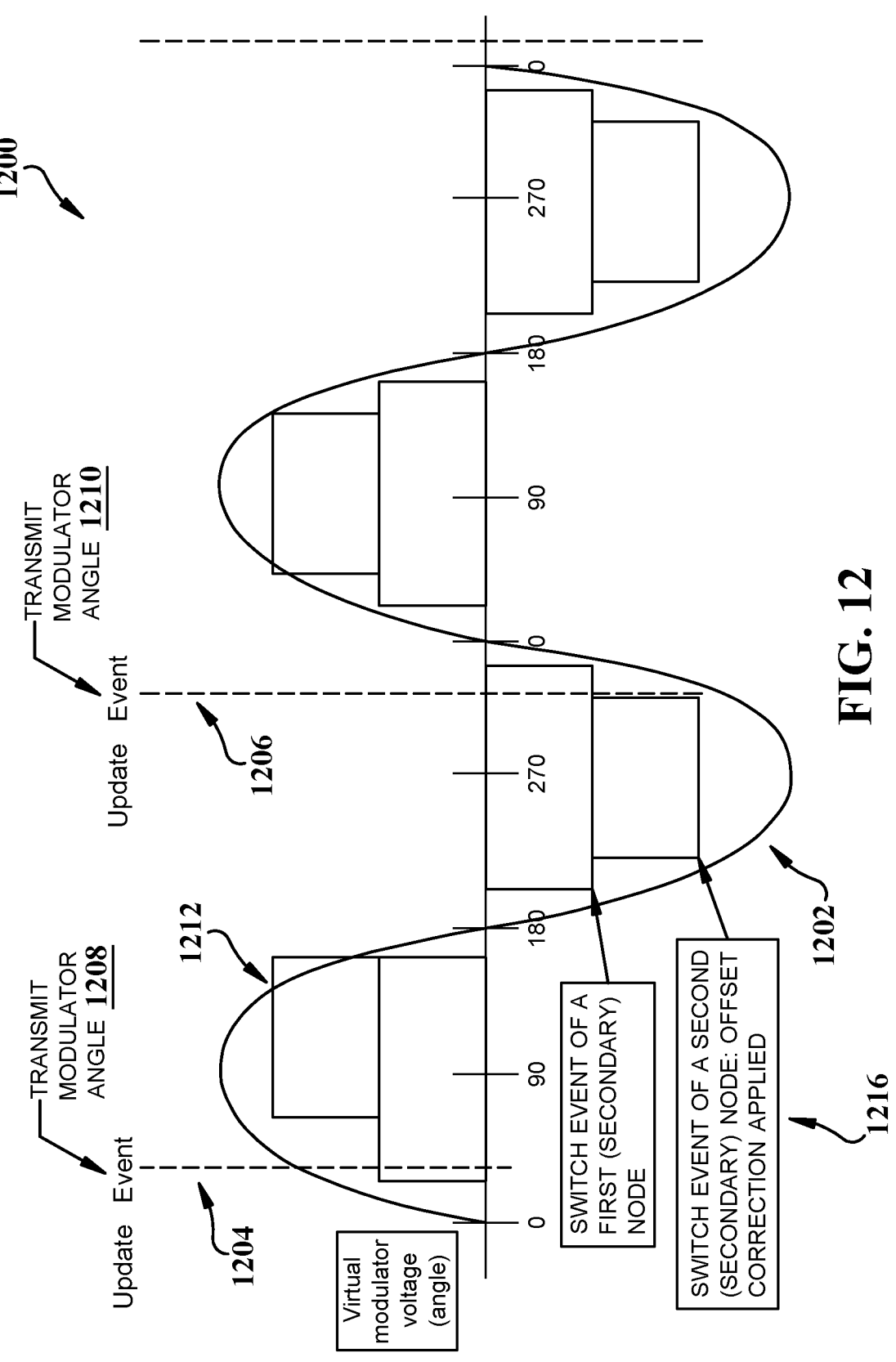
FIG. 12 illustrates an update event graph with an offset correction for a sine wave in accordance with one or more embodiments described herein.

FIG. 12 illustrates update event graph 1200 with an offset correction for a sine wave in accordance with one or more embodiments described herein. FIG. 12 illustrates a very low-resolution sine wave output 1212 generated by a system comprising two smart cell nodes (or smart cell clusters), wherein each smart cell node produces a step on the sine wave. FIG. 12 further illustrates a virtual sine wave voltage 1202 that the system can generate. With a large number of smart cell nodes, the generated voltage can be very close to a true sine shape. Repetitive description of like elements and/or processes employed in respective embodiments is omitted for sake of brevity.

In an embodiment, at every update event the primary node can transmit the current modulator angle. For example, at update event 1204, the primary node can transmit modulator angle 1208. For example, at 1206, the primary node can transmit modulator angle 1210. The secondary nodes can receive the current modulator angle, compare it with their own modulator angle, and calculate a correction. If the time synchronization between the nodes (primary node and secondary nodes) can be consistent, the method described herein can keep the SmartCell modulator synchronized. An offset can be applied once to the SmartCell modulator timing at the next on-switch event. This way the SmartCell modulator can be remain synchronized as long as absolute timing of the primary and secondary nodes can remain synchronized.

Herein, the modulator angle can be defined as an angular position of a virtual voltage from a first string of a SmartCell system, wherein the first string can comprise smart cell clusters coupled in series. The modulator angle can be used to calculate phase between a modulator voltage and current and calculate a phase between the modulator voltage and mechanical position. In another embodiment, the modulator angle can be transmitted as before during an update event, the secondary nodes can collect data based on dead reckoning in between the update events, and the secondary nodes can resynchronize during every new broadcast. Further, an offset correction can be performed for the sine wave form. For example, at 1216 an offset exhibited by a positive voltage output step from a smart cell cluster can be corrected during the negative voltage output cycle.

Figure 13:
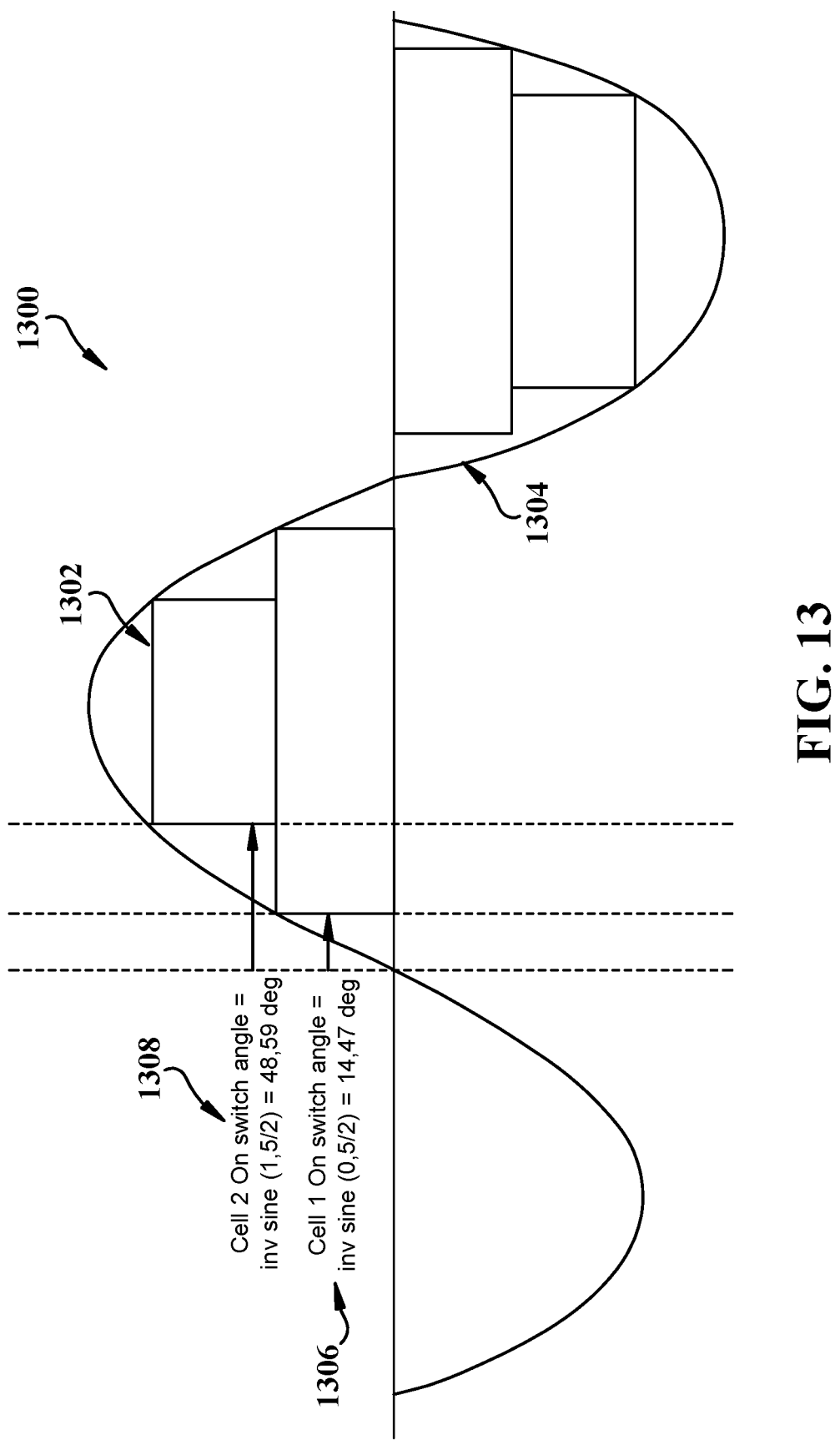
FIG. 13 illustrates sine wave angle calculation for a sine wave produce by a SmartCell modulator in accordance with one or more embodiments described herein.

FIG. 13 illustrates sine wave angle calculation for a sine wave produced by a SmartCell modulator in accordance with one or more embodiments described herein. FIG. 13 illustrates a sine wave 1300 produced by a SmartCell modulator. FIG. 13 illustrates a very low-resolution sine wave output 1302 generated by a system comprising two smart cell clusters, wherein each cluster produces a step on the sine wave. FIG. 13 further illustrates a virtual sine wave voltage 1304 that the system can generate. Repetitive description of like elements and/or processes employed in respective embodiments is omitted for sake of brevity.

In an embodiment, the requested phase current can be the base for the phase voltage, based on which the SmartCell system can decide the number of smart cell clusters to be connected or engaged. The symmetrical sine wave output 1302 (pyramid shape) can make it easy to calculate off switch angle. However, a voltage can be generated that can create a sine shaped phase current. The sine wave angle can be calculated per equations 1308 and 1306.

cell 1 On switch angle=inv sine(0.5/2)=14.47 deg, for a voltage step produced by a first cell (or cell cluster).                    Equation 1308:

cell 2 On switch angle=inv sine(1.5/2)=48.59 deg, for a voltage step produced by a second cell (or cell cluster).                    Equation 1306:

Since the sine wave angle can be broadcasted about every 1 ms, and since the smart cell clusters, based on dead reckoning, can continue to calculate the sine wave angle based on rotation of the electric motor, the secondary nodes for respective smart cell clusters can calculate the phase required for each secondary node to be in, depending on a desired output voltage. Thus, the secondary nodes can turn on their respective H-bridges at the correct angle.

Figure 14:
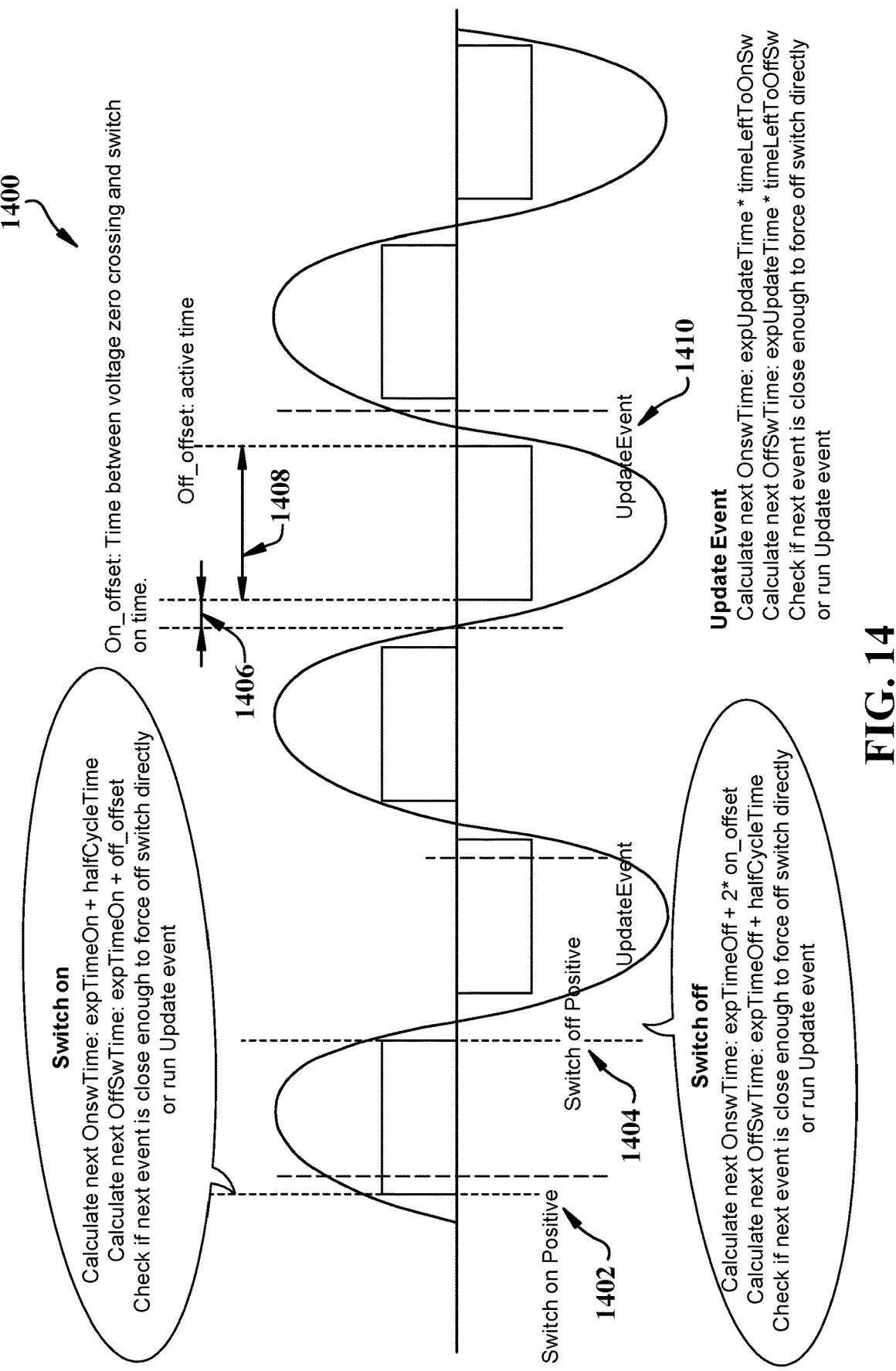
FIG. 14 illustrates another update event graph in accordance with one or more embodiments described herein.

FIG. 14 illustrates update event graph 1400 in accordance with one or more embodiments described herein. Repetitive description of like elements and/or processes employed in respective embodiments is omitted for sake of brevity.

Update event graph 1400 illustrates a method for calculating time to subsequent events, for example, a time between an update event and positive voltage switch-off, a time between a voltage zero crossing and negative voltage switch-on time, and active time for a voltage step. The secondary nodes can calculate time to the next event after an event has occurred. This can be a method to generate a better accuracy than about 1 ms between update events to create a more accurate sine wave shape.

At event switch-on event 1402 which can represent a positive voltage switch-on event, it can be possible to calculate times from switch-on event 1402 to the next switch-on event or from switch-on event 1402 to switch-off event 1404, which can represent a positive voltage switch-off event. It can also be possible to check if the next event is close by to force switch-off directly or run an update event. The calculations can be represented by the following equations:

Calculate next OnswTime=(expTimeOn)+(halfCy-cleTime)                    Equation A:

Calculate next OffSwTime=(expTimeOn)+(off_off-set),                    Equation B:

wherein "OnswTime" can represent time to next switch-on event, "expTimeOn" can represent a position along the sine wave from where the next switch-on event can be calculated by adding time for half a revolution of a rotor (e.g., equation A), at which point the respective secondary node can turn on in the opposite direction, and "off_offset" can represent active time, represented at 1408.

Similarly, at switch-off event 1404, it can be possible to calculate time to the next switch-on event or to the next switch-off event, and it can be possible to check if the next event is close by to force switch-on directly or run an update event. The calculations can be represented by the following equations:

Calculate next OnswTime=(expTimeOff)+[2×(on_offset)],                    Equation C:

wherein "on_offset" can represent time between voltage zero crossing and switch-on time, represented at 1406, and "expTimeOff" can represent a position along the sine wave from where the next switch-on event can be calculated by adding twice the time for voltage zero crossing and the switch-on time for the respective secondary node (e.g., equation C).

Figure 15:
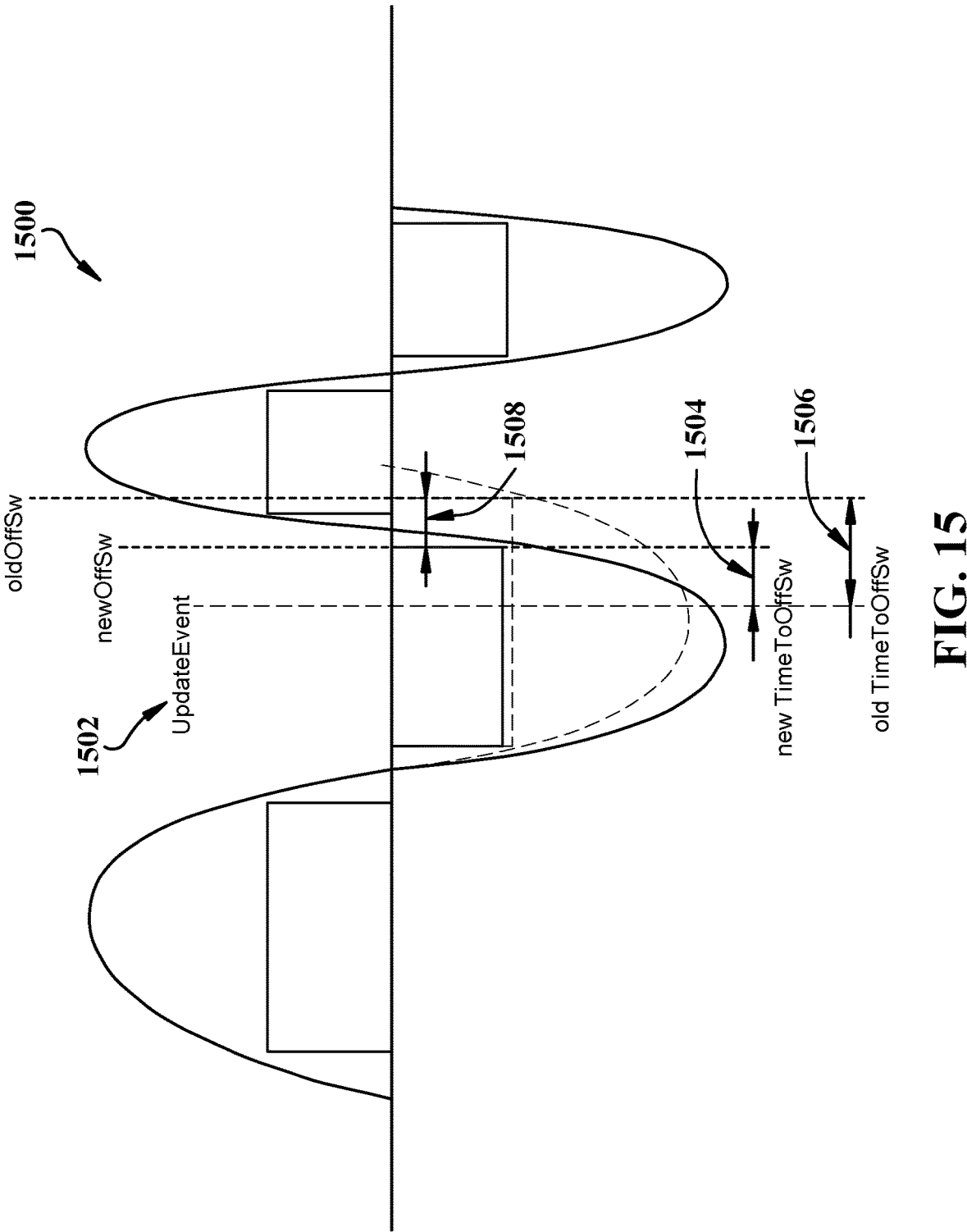
FIG. 15 illustrates another update event graph in accordance with one or more embodiments described herein.

Calculate next OffSwTime=(expTimeOff)+(halfCy-cleTime)                    Equation D:

At update event 1410, it can be possible to calculate time to the next switch-on event or to the next switch-off event, and it can be possible to check if the next event is close by to force switch-off directly or run an update event. The calculations can be represented by the following equations:

Calculate next OnswTime=(expUpdateTime)×(timeLeftToOnSw)                    Equation E:

Calculate next OffSwTime=(expUpdateTime)×(timeLeftToOffSw)                    Equation F:

FIG. 15 illustrates another update event graph in accordance with one or more embodiments described herein. Repetitive description of like elements and/or processes employed in respective embodiments is omitted for sake of brevity.

FIG. 15 illustrates an update event graph 1500. In an embodiment, calculating time to the next event can be performed in the event of changes to the speed (frequency) of the cycle times for a sine wave. For example, if the speed of the cycle times doubles, then all times to the next event can be halved. For example, for a change in speed of a cycle time as indicated by the difference 1508 between the dotted line and solid line of the voltage switch-off event of the sine wave, the equivalent time difference between the update event 1502 and the voltage switch-off event can be the difference between times 1506 and 1504, wherein 1506 can be a time between update event 1502 and an old voltage switch-off event (described as "oldTimeToOffSw") and 1504 can be a time between update event 1502 and a new voltage switch-off time (described as "newTimeToOffSw"). This can be further elaborated by the following equations.

$$\text{newOldRat} = (\text{newCycleTime}) \div (\text{oldCycleTime}) \qquad \text{Equation G:}$$

$$\text{newTimeToOffSw} = (\text{timeToOffSw}) \times (\text{newOldRat}) \qquad \text{Equation H:}$$

$$\text{newTimeToOnSw} = (\text{timeToOnSw}) \times (\text{newOldRat}), \qquad \text{Equation I:}$$

wherein "newOldRat" can be a ratio between an old frequency and a new frequency, "newCycleTime" and "oldCycleTime" can be the new and old frequencies, respectively, and "timeToOffSw" and "timeToOnSw" can be the old times to switch-off and switch-on events, respectively, from the update event.

Figure 16:
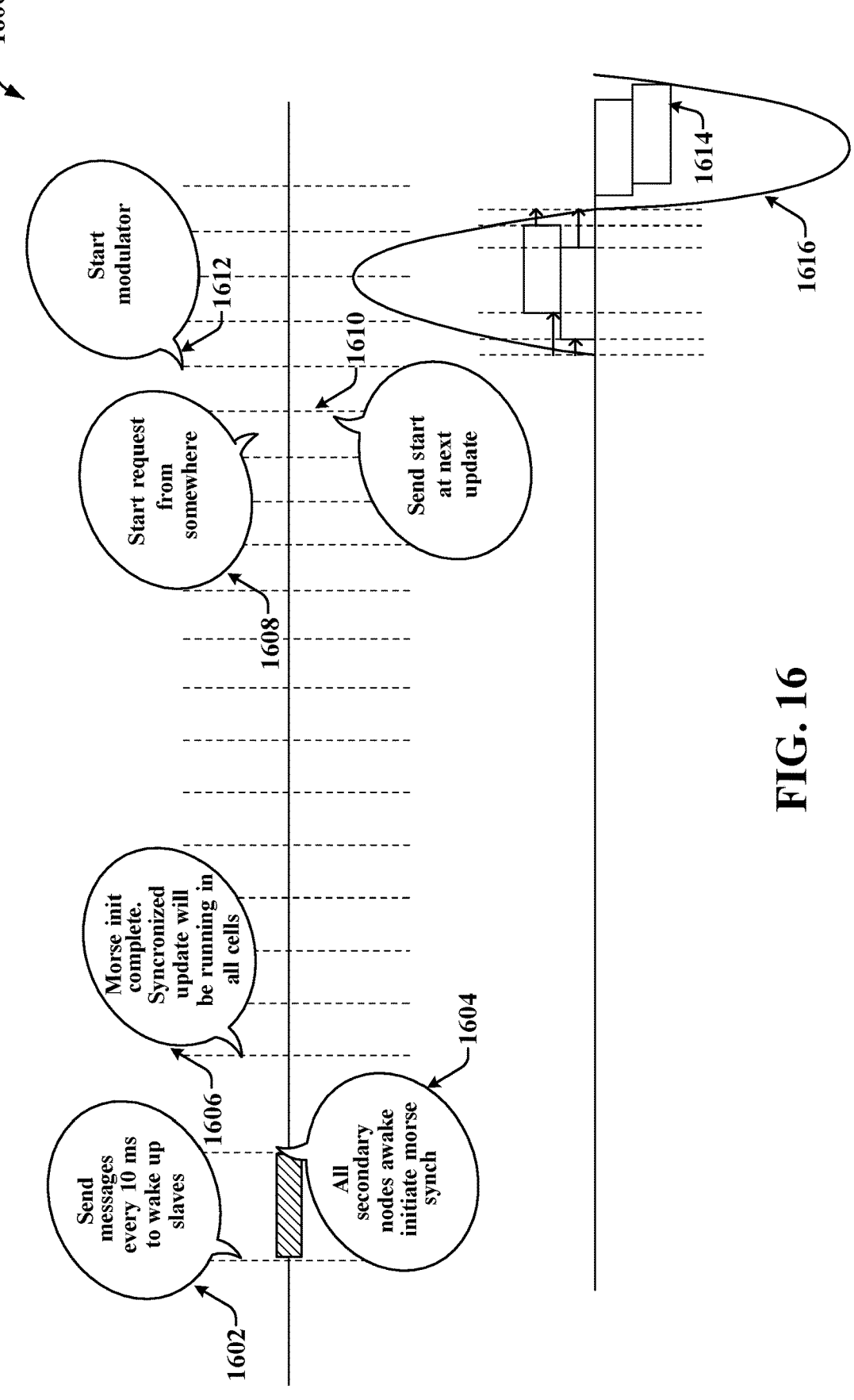
FIG. 16 illustrates an update event timeline in accordance with one or more embodiments described herein.

FIG. 16 illustrates an update event timeline in accordance with one or more embodiments described herein. Repetitive description of like elements and/or processes employed in respective embodiments is omitted for sake of brevity.

FIG. 16 illustrates start sequence 1600 for a SmartCell modulator. The dotted lines in FIG. 16 can represent update events. At 1602, a primary node can send messages about every 10 ms to wake up the secondary nodes. At 1604, all awake secondary nodes can initiate a morse synchronization. At 1606, the morse initiation can be completed, and a synchronized update can run in all smart battery cells. At 1608, a start request for the SmartCell modulator can be initiated. At 1610, the start request can be sent for the next update event. At 1612, the modulator can start, and the smart cell clusters of the SmartCell modulator can generate the desired voltage as depicted at 1614 to generate the sine wave output at 1616, that can run an electric motor.

Figure 17:
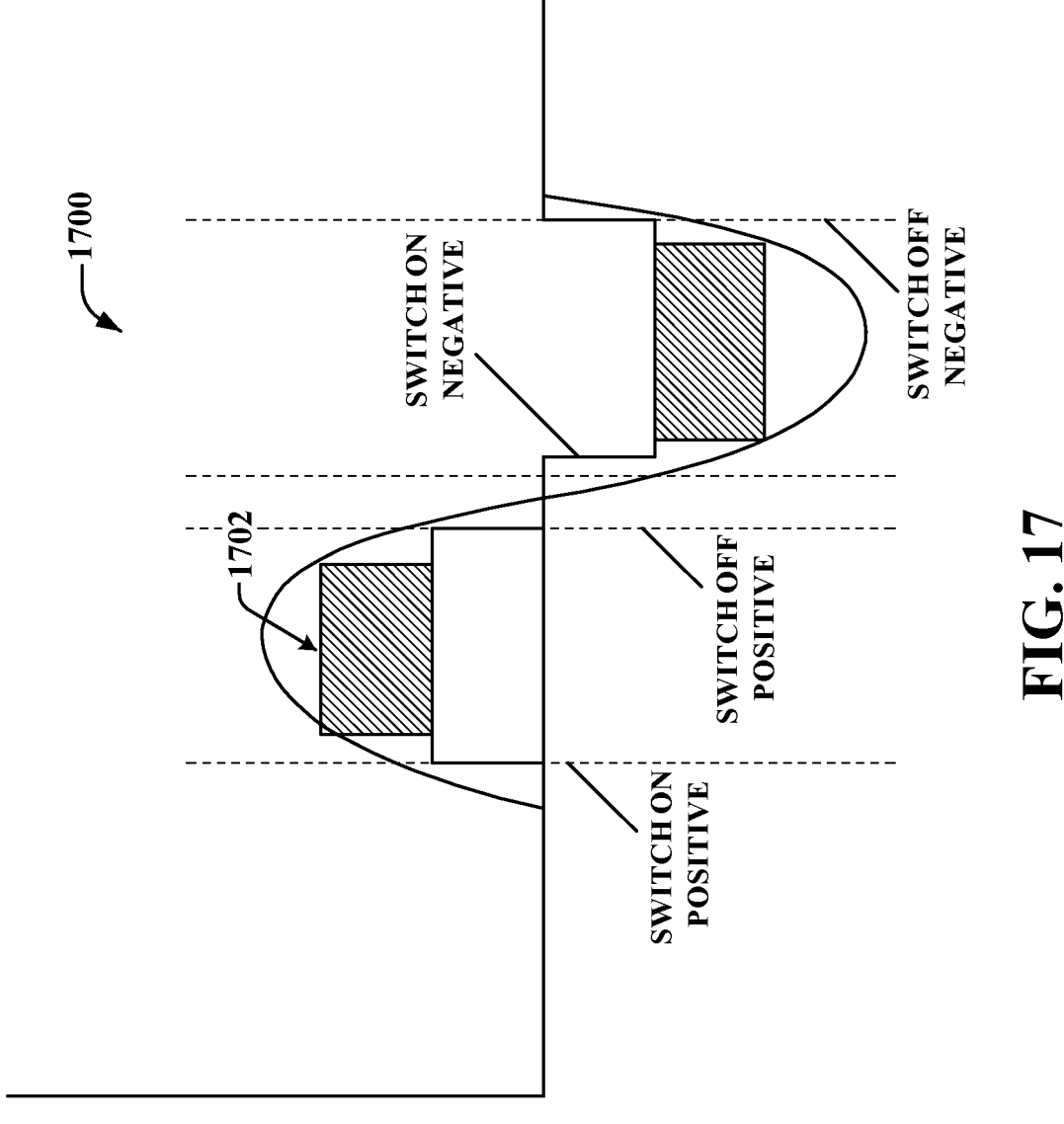
FIG. 17 illustrates a graph demonstrating Pulse Width Modulation (PWM) to generate a sine wave in accordance with one or more embodiments described herein.

FIG. 17 illustrates a graph demonstrating PWM to generate a sine wave in accordance with one or more embodiments described herein. Repetitive description of like elements and/or processes employed in respective embodiments is omitted for sake of brevity.

FIG. 17 illustrates a sine wave voltage output graph 1700 comprising two voltage steps generated by two smart cell clusters, as discussed in one or more embodiments herein. FIG. 17 further illustrates switch-on and switch-off events for the voltage outputs. In an embodiment, the voltage steps generated by the smart cell clusters can be bigger than necessary, and one of the smart cell clusters can run PWM signal to achieve a desired sine wave shape. A PWM signal can be used to ramp in or ramp out voltage. For example, current from an H-bridge in a phase can ramp in smoothly instead of turning on at once. Thus, PWM can be a way to limit current such that one smart cell cluster in each string in a SmartCell modulator can use PWM while the remaining cell clusters can run on or off as usual. For example, voltage step 1702 can indicate a fixed duty cycle (e.g., at about 10 kHz, 15 kHz, etc.) resulting from running PWM to limit current. The frequency for the duty cycle can be selected to generate a balance between noise and efficiency. Graph 1700 can be plotted against an incremental value of time (not shown).

The various PWM modes can be:

//pwmMode0: Disabled, all cells can run on/off.

//pwmMode1: Last cell can run PWM, the other cells can run on/off if enabled. Number of connected cells can depend on a requested string voltage fraction.

//pwmMode2: Disabled. all cells can run on/off.

Figure 18:
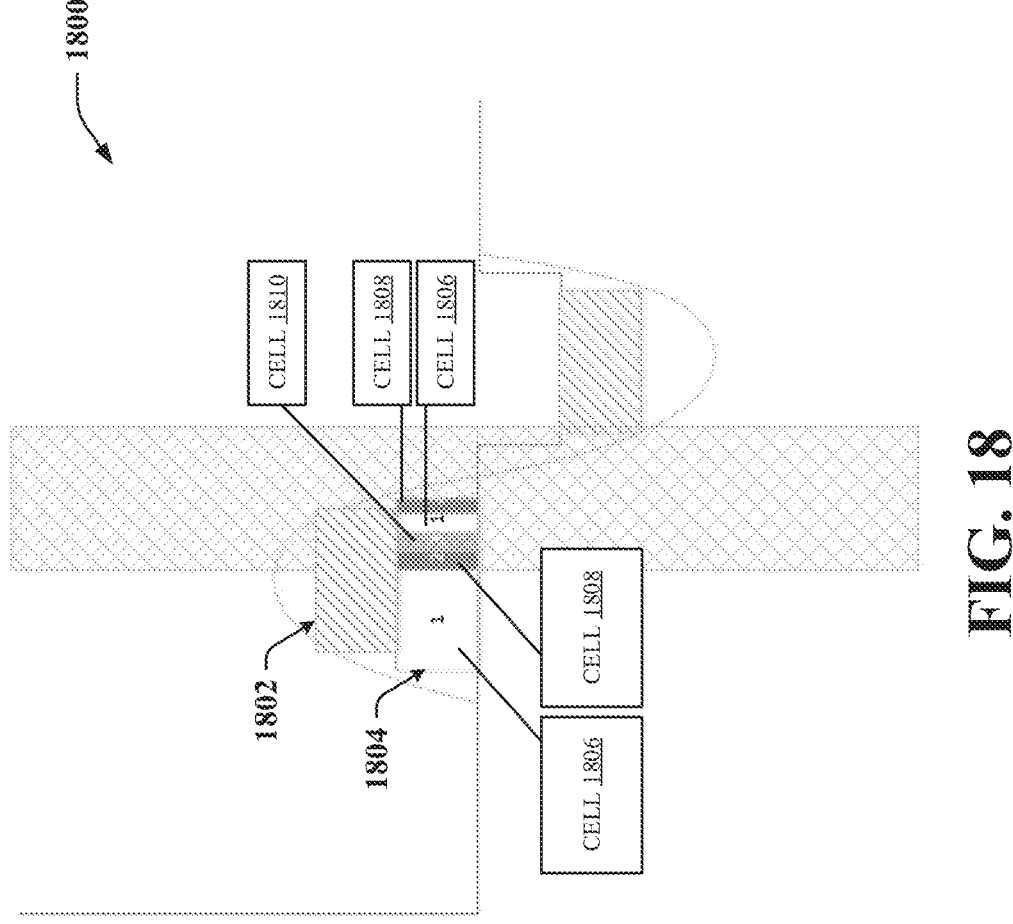
FIG. 18 illustrates a graph demonstrating load sharing in a smart cell system in accordance with one or more embodiments described herein.

FIG. 18 illustrates a graph demonstrating load sharing in a smart cell system in accordance with one or more embodiments described herein. Repetitive description of like elements and/or processes employed in respective embodiments is omitted for sake of brevity.

Referring now to FIG. 18, in some cases during discharge, inductive load in a SmartCell system can possibly create harmful situations for battery cell charging during a limited period of a sine cycle. Different smart cell clusters in a string of smart cell clusters can experience different load patterns when producing a sine wave voltage output, depending on the location of the cells in the string. For example, voltage step 1804 can be generated by a smart cell cluster that can experience discharge most of the time, however, inductance in the system can cause a reaction that can charge the smart cell cluster during a certain amount of time. For example, at some angles in the sine wave, there is a risk of charging the cells. For example, during situations of cold weather, cells can become sensitive to charging (e.g., a worst-case scenario can be 100% state of charge, i.e., high load on a cold battery). During such a situation, instead of engaging only one smart cell cluster to generate a voltage output, different smart cell clusters can be connected for a short time (i.e., during charging). That is, a controller can cause respective discharge of respective smart cell clusters during a period of reactive charging of the smart cell clusters such that individual smart cells of the smart cell clusters can be selectively engaged to product a voltage output. If this can be executed under a certain time threshold, cell plating phenomena can be avoided.

By changing active cells often, the cells can be protected from damage due to unwanted cell charging. Thus, it can become necessary to reduce the available amount of cells (e.g., torque limitation) to have cells ready to share the load. For example, FIG. 18 illustrates a sine wave form 1800 that can be generated by two smart cell clusters wherein each smart cell cluster can produce a voltage step (e.g., voltage steps 1802 and 1804) to generate sine wave form 1800. The same voltage step can be produced by engaging multiple smart cell clusters. For example, voltage step 1804 can be produced by engaging cell 1806 for a certain duration of time and during a period of cell charging, cells 1808 and 1810 can be engaged alongside cell 1806, thereby reducing the load on each cell.

Figure 19:
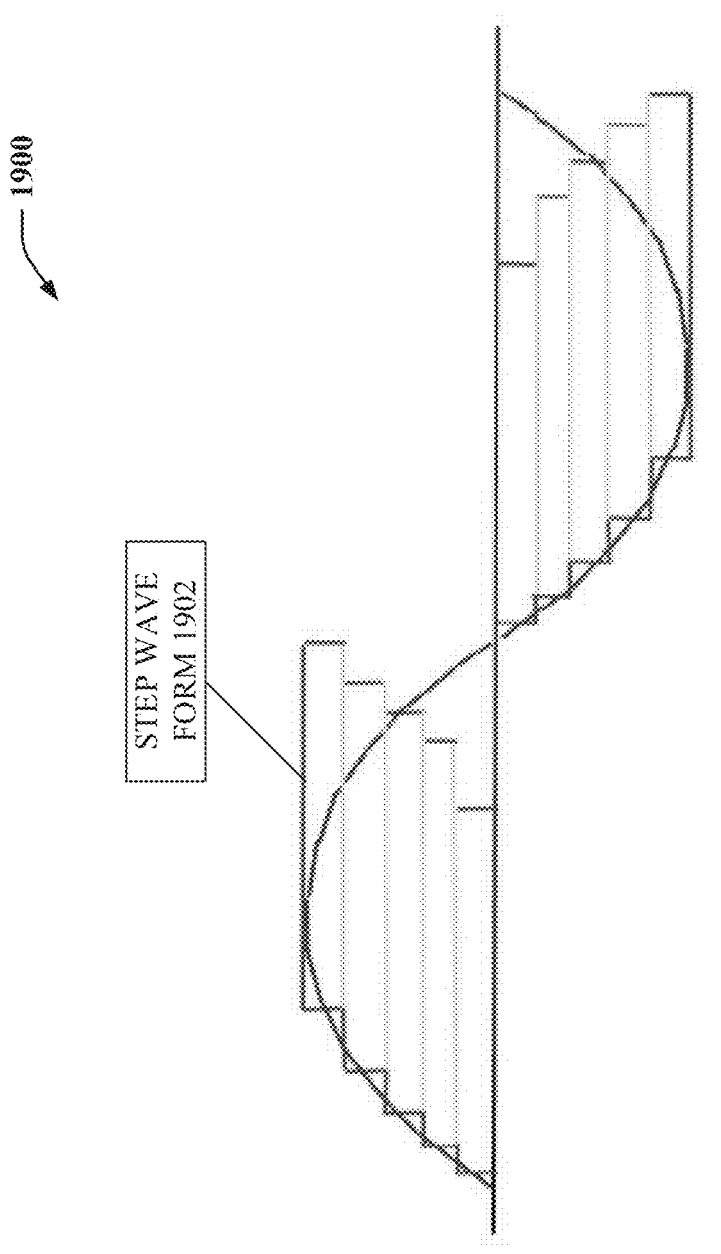
FIG. 19 illustrates a step approach to achieving a sine wave current for motor control in accordance with one or more embodiments described herein.

FIG. 19 illustrates a step approach to achieving a sine wave current for motor control in accordance with one or more embodiments described herein. Repetitive description of like elements and/or processes employed in respective embodiments is omitted for sake of brevity.

In an embodiment, there can be two ways to achieve a sine wave for motor control or charging: pyramid approach or step approach. The pyramid approach to generating the sine wave form is illustrated in FIG. 3B. Although the pyramid approach can be a straightforward multi-level approach to generating the sine wave, the pyramid approach can present two issues that can be addressed: at high frequencies, the time between off-switch and on-switch events can be very short, and the load on different cells can be very different. A cell sorting algorithm can be required to change cell priority quite often.

FIG. 19 illustrates the step approach to achieve sine wave 1900. It is to be appreciated that in both the pyramid and the step approaches, each step of voltage causes a step to appear on the sine wave, however, in the step approach, the total voltage of connected steps of voltages can produce step wave form 1902. Step wave form 1902 illustrated in FIG. 19 can depict total voltage of cells connected in series. The step wave form 1902 can indicate each cell step in voltage and length of connection. A negative voltage can be produced by switching the cell output H-bridge to negative.

The pyramid approach can be easy to understand and the discharge time on different cells can vary which can be used to distribute load accordingly. A disadvantage can be that in some cases the time between switching on and off can become very short which can put more load on a controller. That is, the pyramid approach can lead to significant differences in loads between smart cell clusters and short times between interrupts. The step approach can evenly distribute the load on each smart cell cluster and a duty cycle of connected cells using the step approach, can be between about 57 percent (%) to 63%, which can be suitable for an interrupt-based algorithm. Since the load on each cell with the step approach can be very evenly distributed, a cell sorting algorithm can be run at a much lower pace which can be good for less network and processing load.

Figure 20:
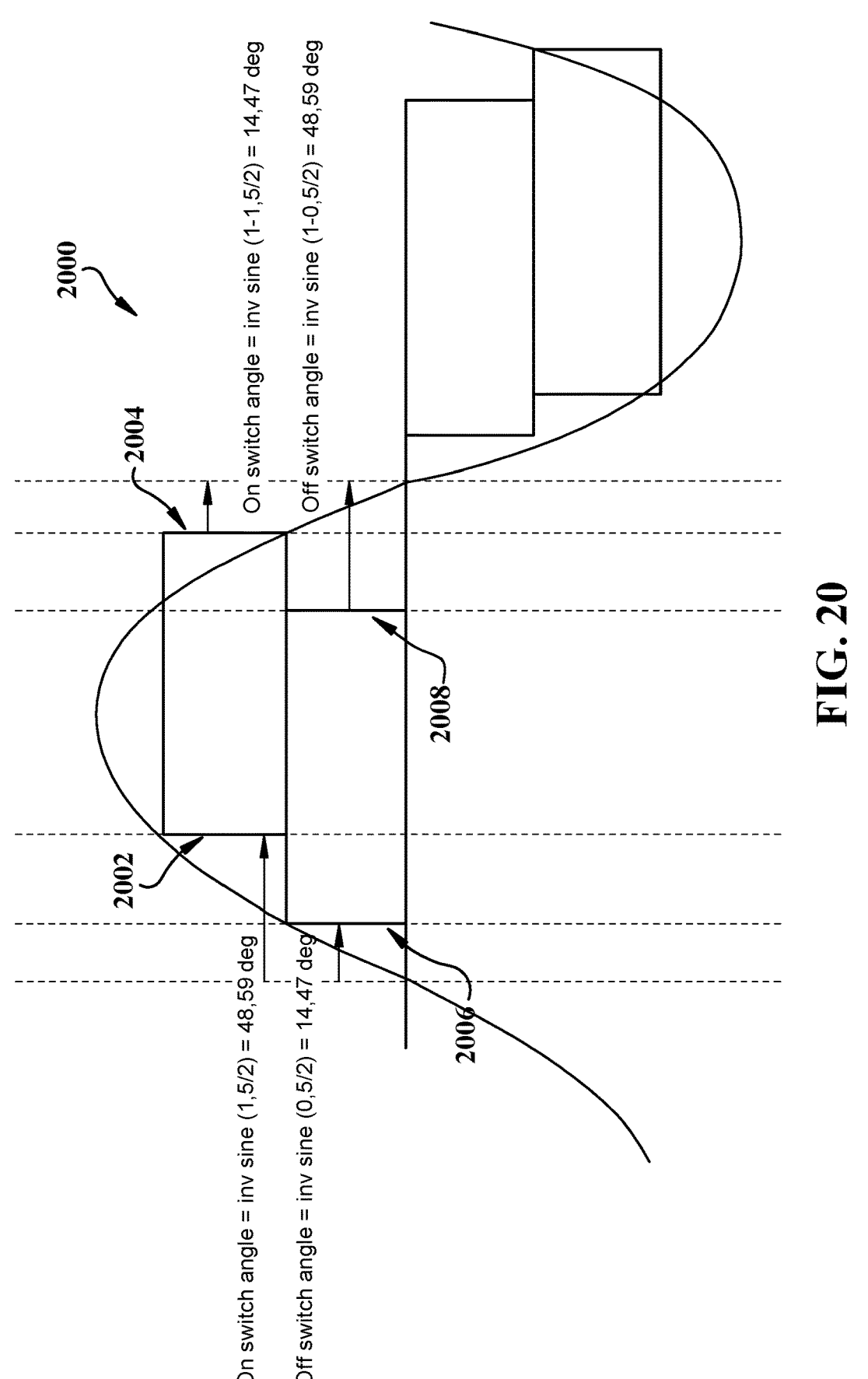
FIG. 20 illustrates a sine wave angle calculation for a step approach in accordance with one or more embodiments described herein.

FIG. 20 illustrates a sine wave angle calculation for a step approach in accordance with one or more embodiments described herein. Repetitive description of like elements and/or processes employed in respective embodiments is omitted for sake of brevity.

FIG. 20 illustrates a sine wave 2000 generated by the step approach, as discussed in one or more embodiments herein. The angles of sine wave 2000 required at on-switch and off-switch to generate the stepped wave form can be determined as follows:

At 2002, on switch angle=inv sine(1.5/2)=48.59 deg., for a voltage step produced by a first cell (or cell cluster).

At 2004, off switch angle=inv sine(1−1.5/2)=14.47 deg., for the voltage step produced by the first cell (or cell cluster).

At 2006, on switch angle=inv sine(0.5/2)=14.47 deg., for a voltage step produced by a second cell (or cell cluster).

At 2008, off switch angle=inv sine(1−0.5/2)=48.59 deg., for the voltage step produced by the second cell (or cell cluster). In the off switch angle calculations at 2004 and 2008, the subtraction (e.g., 1-0) in the parenthesis allows for mirroring the positive slope calculation to generate a negative slope.

Figure 21:
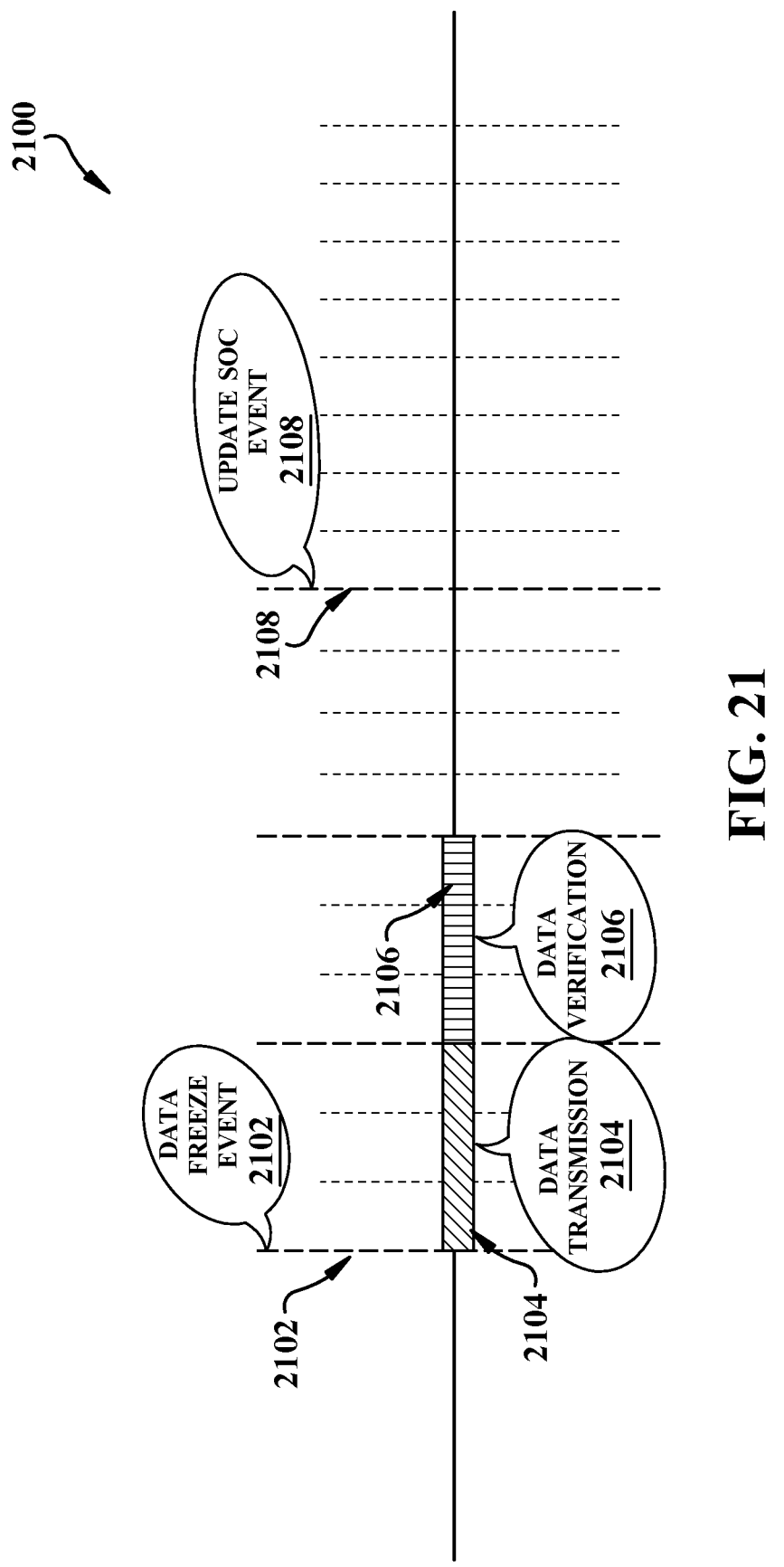
FIG. 21 illustrates a timeline for sorting of cells during sine wave creation in accordance with one or more embodiments described herein.

FIG. 21 illustrates a timeline for sorting of cells during sine wave creation in accordance with one or more embodiments described herein. Repetitive description of like elements and/or processes employed in respective embodiments is omitted for sake of brevity.

When a sine wave current is generated, all cells in a cluster can be used for high voltage requirements, however, many times only a few cells can be required to be switched in for generating the voltage if there is low torque in the machine. In such a scenario, it can be necessary to load cells differently and to use different cells at different occasions to balance out the load on each cell. FIG. 21 can illustrate a timeline 2100 to execute a sorting of cells as discussed herein. The timeline can be referred to as a PrioSorting timeline wherein the timeline can comprise a data freeze event 2102, such that from data freeze event 2102, the state of charge (SOC) value can remain unchanged until after the next SOC update event. Update events are illustrated by the vertical dashed lines. Next, data transmission 2104 can occur during which time all units can communicate their current SOC. This can be included in the standard secondary response broadcast. During data verification 2106, the secondary nodes can communicate a checksum from a system SOC result calculation (described as "SystemSOCResult-Calc" in the figure). In case of the same response from all secondary nodes, a new prior list can be allowed at update SOC event 2108.

The system SOC result calculation can be defined as basically calculating checksum on SOC values from all nodes and timestamp for next SOC update event. This way all nodes can make their own decision on whether it is time to update list. When some secondary nodes choose to update and some don't, fault handling can be implemented, controlled by the primary node, that can inform the secondary nodes that don't respond correctly, to shut down or respond. Secondary nodes that don't receive messages can automatically go into bypass mode. Secondary nodes that don't respond to the primary node can generate a zero or not a number (NaN) in SOC and the unresponsive secondary nodes can be excluded from the sort list. Diagnostic functionality can be implemented for the same.

Figure 22:
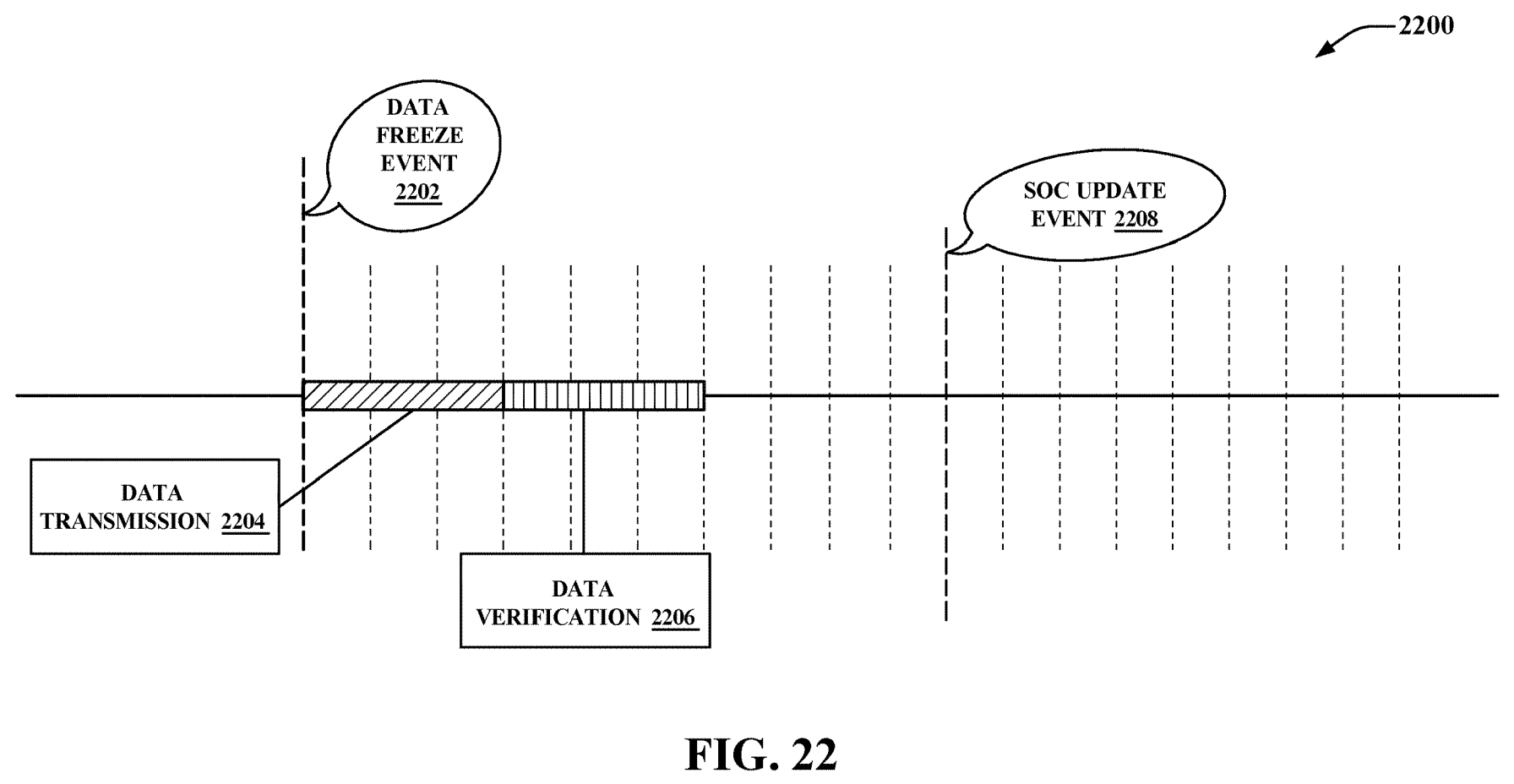

FIG. 22 illustrates an alternate timeline for sorting of cells during sine wave creation in accordance with one or more embodiments described herein. Repetitive description of like elements and/or processes employed in respective embodiments is omitted for sake of brevity.

FIG. 22 illustrates an alternate timeline 2200 for sorting of cells during sine wave creation. In this alternate approach, the timeline can comprise a data freeze event 2202, data transmission 2204, data verification 2206, and SOC update event 2208. In this approach, from data freeze event 2202, the SOC value can remain unchanged until after SOC update event 2208, and the primary node can broadcast an SOC vector with the values from all devices. Further, during data verification 2206, the secondary nodes can communicate checksum from system SOC result calculation. In case of the same response from all secondary nodes, a new prior list can be allowed at SOC update event 2208.

Figure 23:
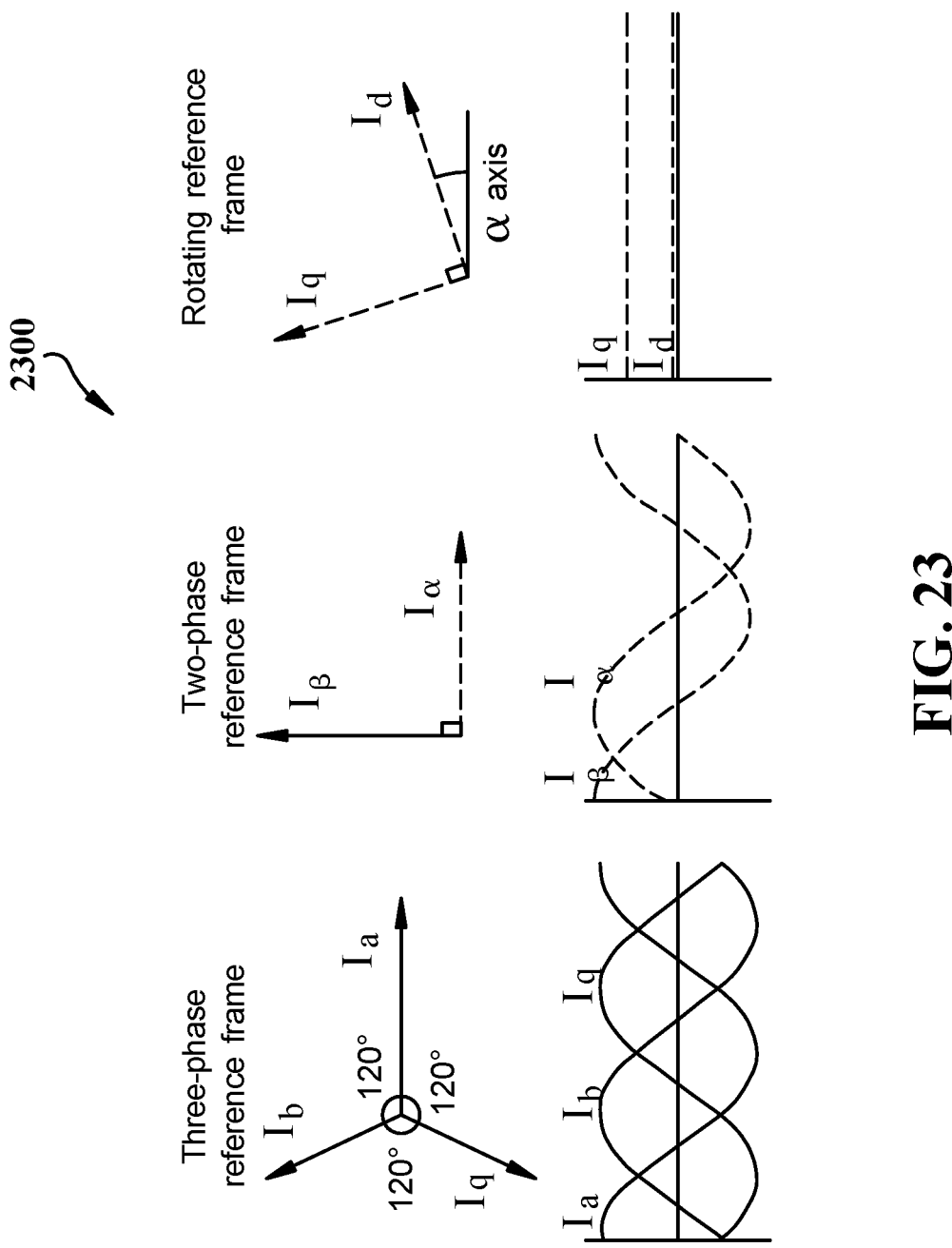
FIG. 23 illustrates an embodiment of 3-phase motor control in accordance with one or more embodiments described herein.
Figure 24:
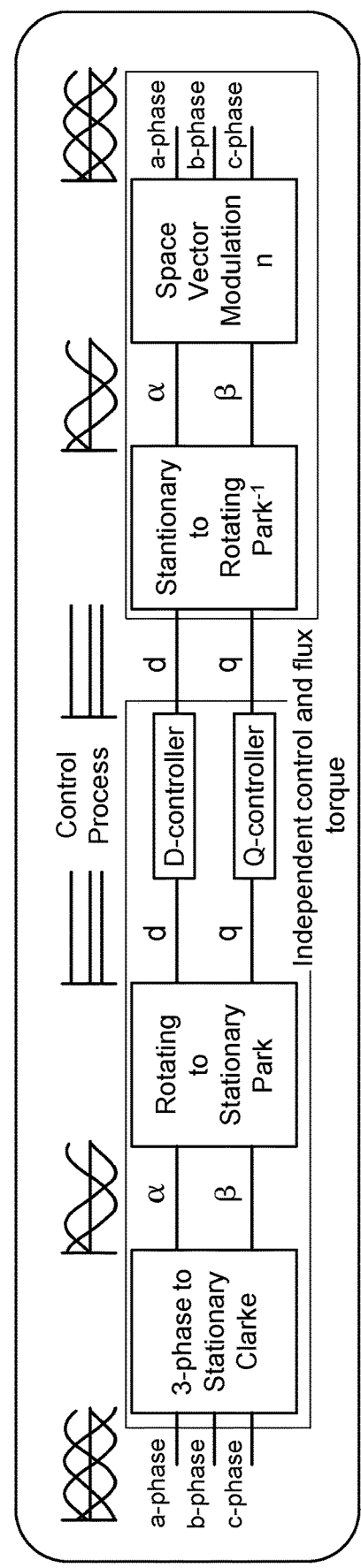
FIG. 24 illustrates a flow diagram of a Clarke Park transform control process in accordance with one or more embodiments described herein.

FIG. 23 illustrates an embodiment of 3-phase motor control in accordance with one or more embodiments described herein. FIG. 23 illustrates two-phase, three-phase, and rotating reference frames at 2300. FIG. 24 illustrates a flow diagram 2400 of a Clarke Park transform control process in accordance with one or more embodiments described herein. Repetitive description of like elements and/or processes employed in respective embodiments is omitted for sake of brevity.

As discussed in one or more embodiments herein, a primary node can generate a virtual sine wave, the modulator. This can be done by broadcasting propulsion request information at a predetermined pace, for example, about every 1 ms. Since broadcasted transmission delay can be well defined and absolute time can be transmitted in a broadcasted message, a complete system can have the same absolute time with an accuracy better than 1 μs. All secondary nodes can be aware of their position in the SmartCell system. They can receive broadcasted information at the same time, and they can connect and disconnect themselves depending on a modulator angle. The secondary nodes can be connected in three strings and together they can create three sine shaped voltages that can be controlled to achieve desired phase currents (torque). Sine wave step size can, in a 2-cell setup be twice the cell voltage, and the resolution can be dependent on the modulator voltage.

In cases where better resolution can be needed for current control, one secondary node can run in PWM mode. In a SmartCell control approach, since the update rate can be limited to about 1 ms from the requesting primary node to all executing secondary nodes, it can be difficult to achieve stable control. By distributing responsibility for feedback control to each secondary node, very high, industry standard control frequencies (e.g., about 10 kHz) can be managed.

Motor control can be the most challenging task for this implementation, but the same strategies can be used for charging/discharging a vehicle connected to the grid. In this case, it can be possible to measure amplitude and timing in the grid, align the SmartCell system, and connect to the grid. Then, the phase can be adjusted to achieve a desired charge/discharge current. With a galvanic isolated communication without the hassle of connecting wires to all switches, this can be used in any multi-level inverter application. A Clarke Park transform function can further assist with motor control.

A Clarke Park transform function can allow 3-phase currents in a three-phase reference frame (e.g., three-phase reference frame of FIG. 23) to be converted to stationary vectors in a two-phase reference frame (e.g., two-phase reference frame of FIG. 23), wherein an inverse Park transform can convert the stationary vectors to a rotating reference frame (e.g. rotating reference frame of FIG. 23). In motor control, torque request can be converted to the stationary current vectors Iq-Ref and Id-Ref, wherein Iq-Ref and Id-Ref can be a set point for the control loop. As part of an error calculation and control process, 3-phase currents can be sampled at about 10 kHz and converted to the stationary vectors Iq-Measure and Id-Measure. This conversion can be done using a Clarke Park transform and electric angle information from a resolver. Comparing Iq-Ref and Iq-Measure can determine the error that can be handled in the control process (PI-loop) that gives new stationary Id and Iq. For reconversion back to rotating vector space modulation (3-phase inverter) the stationary vectors can be converted to rotating vectors using inverse Park transform and resolver angle and executed in a 3-phase half bridge PWM generator.

In one or more embodiments discussed herein, a setpoint for desired current can be achieved by converting the torque request to the stationary vectors, however, since an inverse Park transform can be difficult to execute due to the distributed nature of the SmartCell system and since it can be difficult to connect a resolver signal to all the secondary nodes, motor control can be achieved in a different manner. Each secondary node can be one part of one of three phases (strings). All secondary nodes in one string can act as one powerful voltage source. They can do this since all nodes know their role and based on a broadcasted request they can know when and how to operate an H-bridge circuit on respective smart battery cells or smart battery cell clusters. The secondary nodes can, depending on the requested torque, be able to calculate expected current shape. This calculation can have modulator angle, physical motor parameters and request information as input. The measured current in the string can be used as feedback to follow expected current shape. This way the complete system can be built up by a 3-phase current control.

FIG. 25 illustrates a flow diagram of distributed feedback control in accordance with one or more embodiments described herein. Repetitive description of like elements and/or processes employed in respective embodiments is omitted for sake of brevity.

FIG. 25 illustrates SmartCell system 2500 with several secondary nodes and primary node 2503. SmartCell system 2500, primary node 2503 can wirelessly broadcast data comprising at least phase current information, phase angle information, present cycle time information, resolver angle information, modulator angle information and a torque request to the one or more secondary nodes. Primary node 2503 can broadcast the data during update events wherein consecutive update events can be scheduled about 1 ms apart. Individual secondary nodes can use the broadcasted data to respectively control individual smart battery cells of SmartCell system 2500 to produce a three-phase current. The individual smart battery cells can form three phases of smart battery cells such that each individual phase can represent a string of smart battery cells connected via series connection. Thus, three individual phases (or strings of the smart battery cells) can produce a three-phase current.

For example, primary node 2503 can receive torque request 2502, and using a Clarke Park transform, the primary node can convert the torque request to stationary vectors d and q. At 2506, primary node 2503 can convert stationary vectors d and q to phase angle and phase current, respectively, to realize AC power control from stationary. At 2510, primary node 2503 can receive measured phase current information (e.g., a, b, c phase current) for individual phases (or strings) of the smart battery cells. At 2504, primary node 2503 can receive rotor position information. Primary node 2503 can broadcast a message such as primary transmission message 2507 comprising data, wherein the data comprises at least a present cycle time request, phase current request, phase angle request, resolver angle, and modulator angle, to the secondary nodes. Primary transmission message 2507 can also comprise the measured phase current information can rotor position information.

Using data transmitted through the primary transmission message 2507, the secondary nodes can calculate individual current requirements for respective individual phases of smart battery cells to generate a three-phase current that can operate an electric motor. Using their own current sensors, the secondary nodes can measure current in the respective individual phases of smart battery cells. The secondary nodes can use the difference between the measured current and required current for the individual phases to calculate error and execute a high-speed closed-loop phase current control (at about 10 kHz) to achieve the desired three-phase current.

Thus, three-phase current measurement, although uncommon for motor control, can be used for generating a three-phase current by distributing responsibility for feedback control to the secondary nodes. Cycle time, current setpoint and resolver angle can be updated about every 1 ms. The secondary nodes can also measure current at zero crossing, to determine a phase difference between a current value and a voltage value, to achieve a desired three-phase current between the consecutive update events. The current value can be measured by the secondary nodes using dead reckoning.

Figure 26:
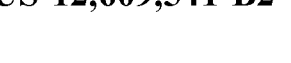
FIG. 26 illustrates a flow diagram demonstrating internal current control via secondary nodes in accordance with one or more embodiments described herein.

FIG. 26 illustrates a flow diagram demonstrating internal current control via secondary nodes in accordance with one or more embodiments described herein. FIG. 26 illustrates, at 2600, phase current 2602 and modulator voltage 2604. Repetitive description of like elements and/or processes employed in respective embodiments is omitted for sake of brevity.

In an embodiment, during normal operation, such as during generation of sine wave 2606, modulator voltage 2604 can be controlled by switching in different numbers of cells in a SmartCell modulator loop, or by running secondary nodes in bypass mode. For controlling modulator voltage 2604, cells are normally switched as on/off switches, and one cell or smart cell cluster in each string of a SmartCell system can fine tune current by running PWM mode. For example, in case of current fluctuations, such as at voltage step 2608 of sine wave 2606, PWM can be run by one smart cell cluster on each string to adjust the current production. Further, at low amplitudes and low frequencies the Smart-Cell system can depend more on PWM control from one cell cluster in each string. The PWM duty cycle can change or be different based on modulator angle such as generated as a result of voltage step 2610. At stand still, each string can output voltages that can correspond to the mechanical position of the electric motor. Since the load can be circulated between different cells, it can produce high torque for a long period of time.

Figure 27:
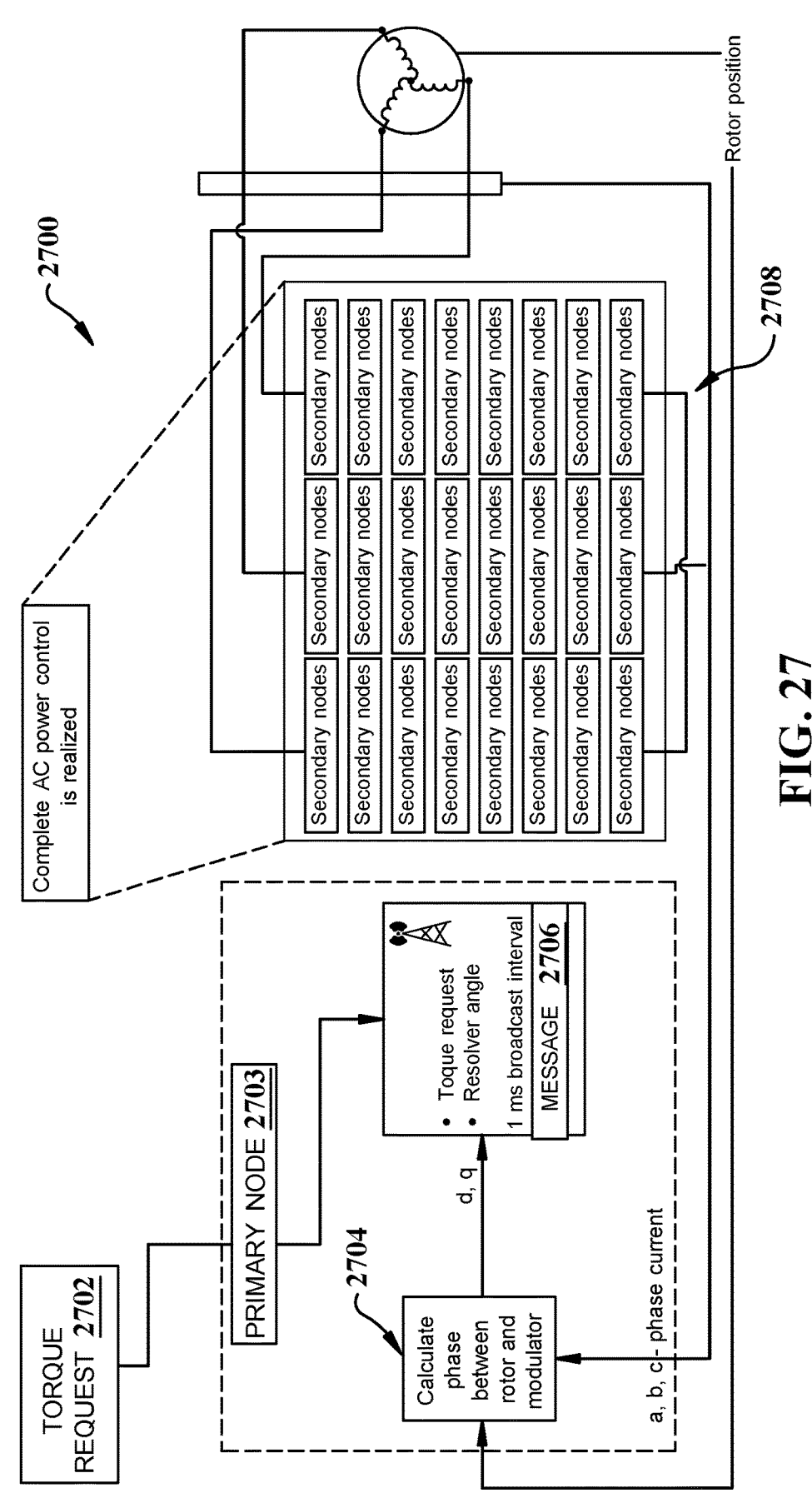
FIG. 27 illustrates a flow diagram for distributed torque control in accordance with one or more embodiments described herein.

FIG. 27 illustrates a flow diagram for distributed torque control in accordance with one or more embodiments described herein. Repetitive description of like elements and/or processes employed in respective embodiments is omitted for sake of brevity.

FIG. 27 illustrates SmartCell system 2700 with several secondary nodes and primary node 2703. Primary node 2703 can receive a torque request 2702, and primary node can broadcast message 2706 comprising the requested torque, resolver angle information, and phase current and phase angle information every 1 ms to the secondary nodes. As discussed in one or more embodiments herein, primary node 2703 can calculate phase between the rotor and modulator at 2704 upon receiving phase current information and rotor position information from the electric motor. The secondary nodes can use the torque request and resolver angle to perform completely distributed torque control. To increase control feedback speed the secondary nodes can use their own current sensor to achieve a desired phase current, and a secondary node can also measure the phase between current and voltage to adjust its own phase. The responsibility for motor control can be distributed to all secondary nodes that can run 3-phase control algorithms. As discussed in one or more embodiments herein, the primary node can broadcast torque request and phase information from a resolver about every 1 ms. The secondary nodes can convert a torque request to vectors d and q to generate phase angle and phase current information, respectively, and the secondary nodes can be responsible for their own cycle time. Complete AC power control can be realized by the pack of secondary nodes illustrated at 2708.

Figure 28:
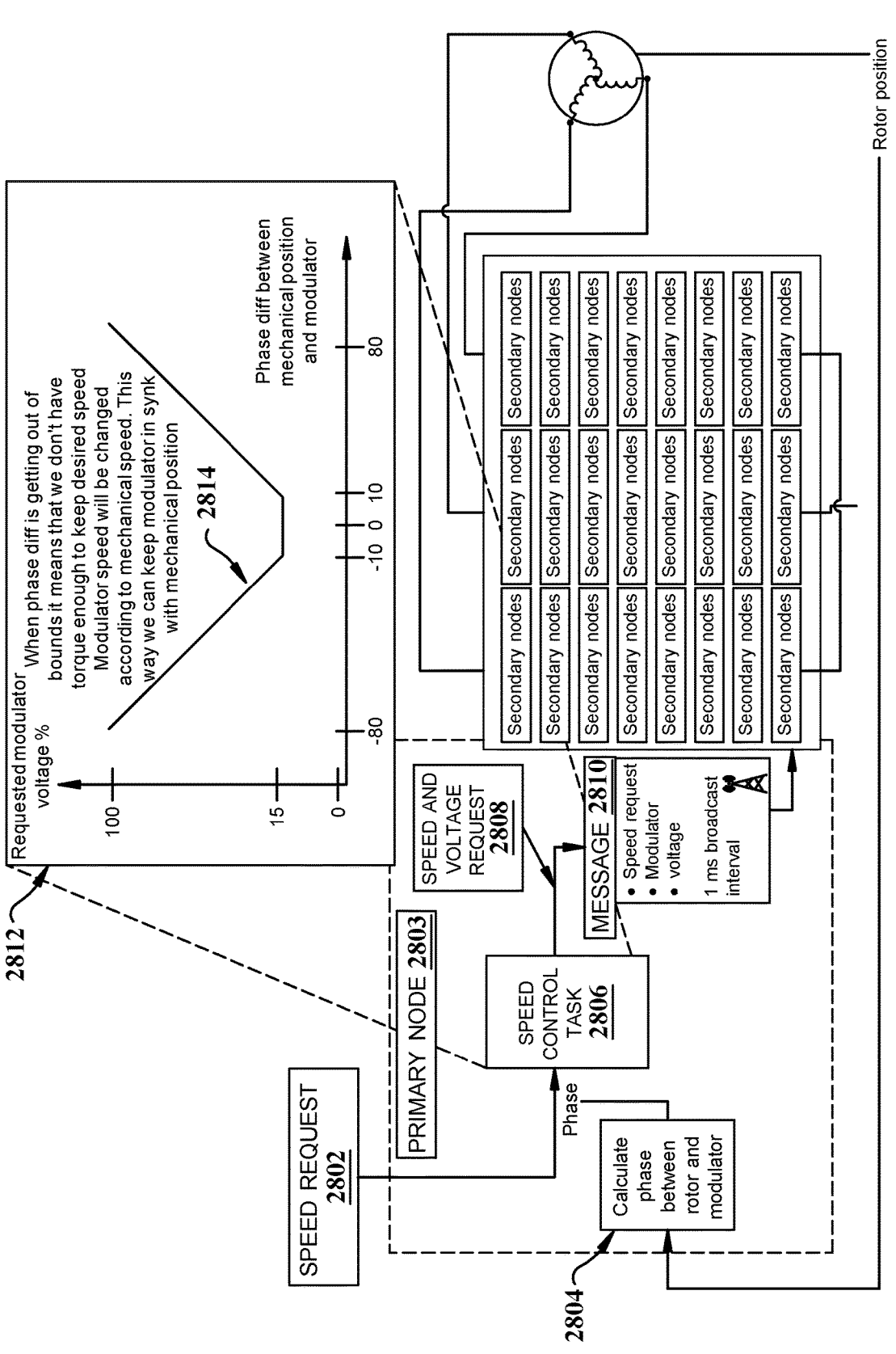
FIG. 28 illustrates a flow diagram for speed request in accordance with one or more embodiments described herein.

FIG. 28 illustrates a flow diagram for speed request in accordance with one or more embodiments described herein. Repetitive description of like elements and/or processes employed in respective embodiments is omitted for sake of brevity.

FIG. 28 illustrates SmartCell system 2800 with several secondary nodes and primary node 2803. Primary node 2803 can receive speed request 2802, calculate a phase difference, between a rotor position of an electric motor and a modulator voltage, based on resolver angle information, at 2804. Primary node 2803 can wirelessly broadcast information, comprising a speed request and modulator voltage information (e.g., speed and voltage request 2808), based on the calculated phase difference, to the secondary nodes as part of message 2810. Based on the broadcasted information, a speed control task 2806 can be executed, wherein the phase difference between the mechanical position of the electric motor and a modulator can be adjusted.

For example, upon a determination by the primary node that the phase difference falls outside of a desired threshold, wherein such a situation can imply that there is not enough torque to maintain a desired speed, the primary node can request the secondary nodes to adjust an existing phase current amplitude, to generate a desired torque. The modulator speed can be changed according to the mechanical speed, and the modulator can remain synchronized with the mechanical position of the electric motor. For example, upon a determination that the phase difference falls within the defined threshold, the primary node can request the one or more secondary nodes to generate a pre-defined phase current amplitude, to maintain the desired torque. This is illustrated by graph 2812 which shows a requested modulator % on the y-axis and the mechanical rotor position on the x-axis. Plot 2814 of graph 2812 can illustrate an exemplary phase difference between the mechanical position of the electric motor and a modulator. Next, the secondary nodes can run the requested speed and modulator voltage that can be updated every 1 ms.

In all control cases discussed heretofore, the secondary nodes' task can be to output a voltage to realize a current that can produce torque. This can be done differently at high voltage amplitudes compared to low voltage amplitudes. This can be done with or without fast feedback solutions. Different control approaches can be a result of maturity and hardware control. The speed request can be the most basic implementation and can require no current sensing for the control loop. Further, the secondary nodes can intelligently and selectively engage one or more smart battery cells to perform the various requests or to otherwise provide independent control for enabling primary/secondary worksplit where possible.

Figure 29:
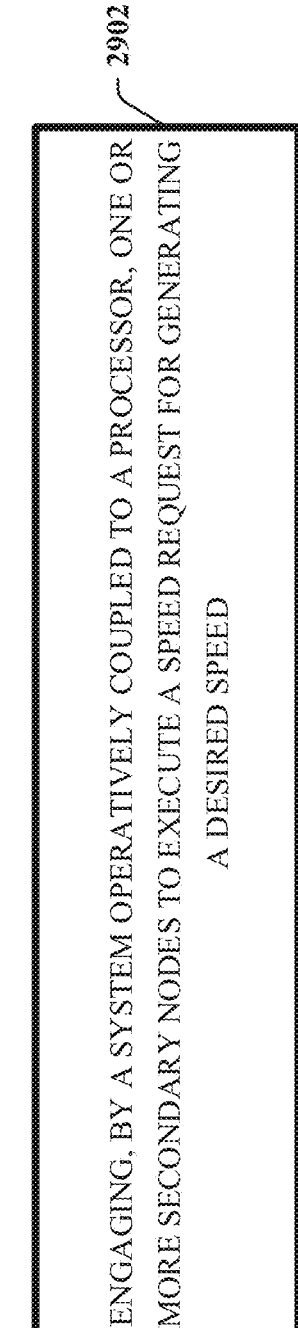
FIG. 29 illustrates a method in accordance with one or more embodiments described herein.

FIG. 29 illustrates a method in accordance with one or more embodiments described herein. Repetitive description of like elements and/or processes employed in respective embodiments is omitted for sake of brevity.

In one or more embodiments, environment 2900 can comprise, at 2902, engaging, by a system operatively coupled to a processor, one or more secondary nodes to execute a speed request for generating a desired speed.

Figure 30:
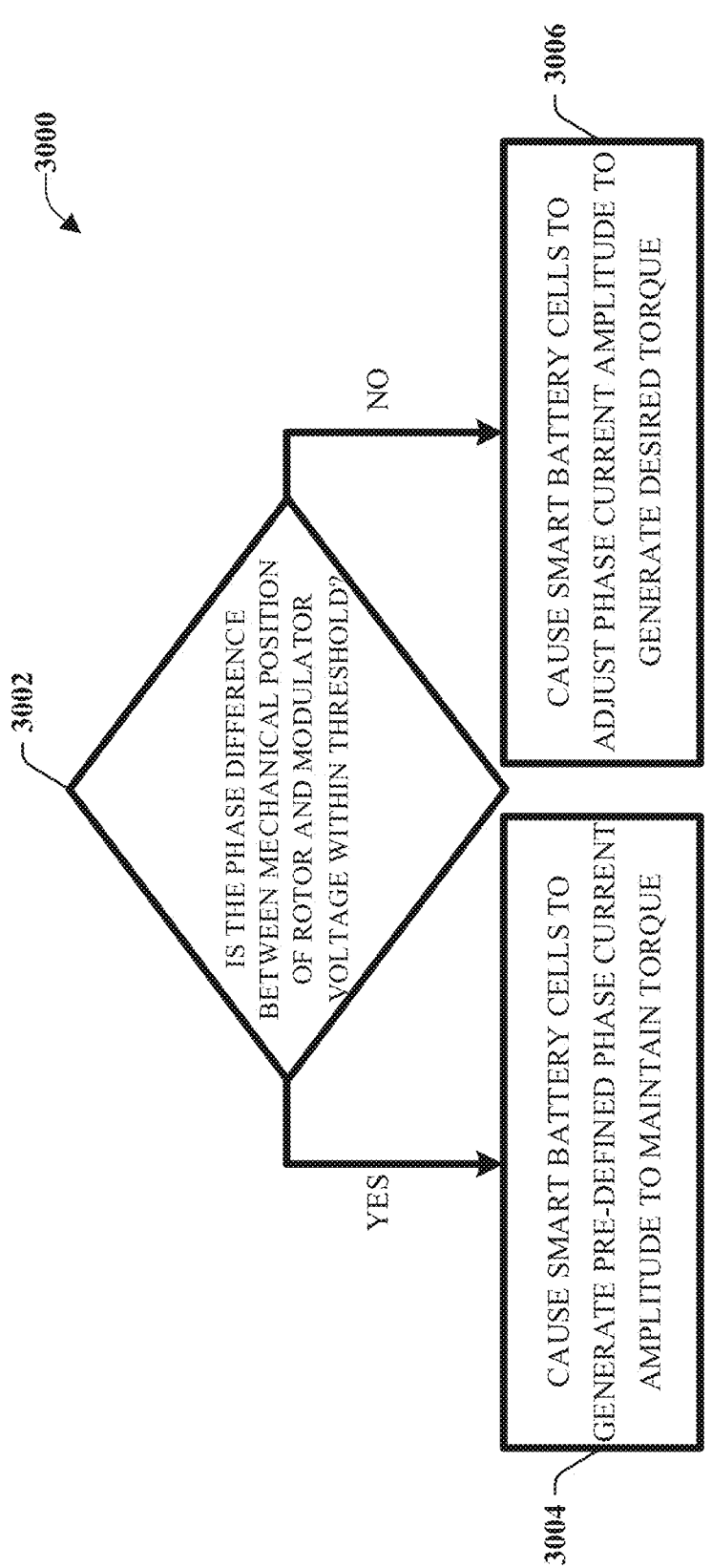
FIG. 30 illustrates a flow diagram in accordance with one or more embodiments described herein.

FIG. 30 illustrates a flow diagram in accordance with one or more embodiments described herein. Repetitive description of like elements and/or processes employed in respective embodiments is omitted for sake of brevity.

FIG. 30 illustrates a flow diagram 3000. In accordance with one or more embodiments described herein, one or more secondary nodes can control one or more respective smart cell clusters to execute speed requests from a primary node, wherein the speed requests can comprise a request to generate a necessary amount of current to enable an electric motor to generate a desired speed. The primary node can calculate a phase difference between a rotor position of the electric motor and an existing modulator voltage, based on resolver angle information, to determine whether the phase difference falls within a defined threshold. For example, at 3002, the primary node can determine if a phase difference between the mechanical position of the rotor and the modulator voltage is withing a threshold. In case, a significant phase difference is detected, the primary node can generate a speed request and modulator voltage request to secondary nodes, based on which, the secondary nodes can cause respective smart battery cells to adjust a phase current amplitude to generate a desired torque, at 3006. In case, a near-zero phase difference is detected, that is, in case the phase difference falls within a defined threshold, the primary node can generate a speed request and modulator voltage request to the secondary nodes, based on which, the secondary nodes can cause respective smart battery cells to generate a pre-defined phase current amplitude based on expected load, at 3004.

Abbreviations:

SmartCell modulator: The system built up by primary and secondary nodes, wherein the system can generate 3-phase power control.

Modulator: A virtual voltage that can be created as a result of a sum of voltages in each string, wherein the virtual voltage can be used to realize desired phase currents. The virtual voltage can have the shape of sine waves with cell voltage (*x) steps size.

Modulator angle: The angular position of the virtual voltage from the first string. This can be used to calculate phase between modulator voltage and current, as well as phase between modulator voltage and mechanical position.

Global update event: An event that can occur about every 1 ms and at the same time in the whole SmartCell system. At this time, speed and torque changes request can be performed simultaneously.

On_offset: A time between voltage zero crossing and switch-on time.

Off_offset: Active time.

In accordance with one or more non-limiting embodiments, a device that can facilitate an intelligent battery cell with integrated monitoring and switches is described herein. The device can comprise a battery device and/or a battery cell device that can be implemented in a variety of different electronic systems. In an embodiment, the device can be implemented as a single battery device and/or a single battery cell device. In another embodiment, the device can be implemented as a single battery device and/or a single battery cell device in a battery pack (also referred to as a battery array, battery bank, power bank, etc.). In another embodiment, the device can be implemented as a single battery device and/or a single battery cell device in a battery pack used in an electric driveline of an electric vehicle (EV).

The device can comprise a terminal having cell poles and/or a communication port. In an embodiment, the device can further comprise a smart cell module that can be coupled to terminal(s) and/or cell poles and further coupled to an active cell material and/or cell material poles of active cell material. In this embodiment, the device can further comprise a casing that can encapsulate one or more components of the device. For example, the casing can encapsulate active cell material, cell material poles, and/or a smart cell module. In some embodiments, the casing can also encapsulate (e.g., partially or fully) terminal and/or cell poles. In an example embodiment, the device can further comprise a gas evacuation that can be formed on a side of device and/or casing.

Terminal(s) can comprise a battery terminal. Cell poles can comprise battery cell poles (e.g., a positive battery terminal and a negative battery terminal). Terminal(s) and/or cell poles can comprise an electrically conducting material that can facilitate the transfer of electric current and/or voltage to and/or from the smart cell module and/or active cell material (e.g., via cell material poles).

A communication port can enable a wired connection of the device (e.g., a wired connection of the smart cell module) to another device (e.g., a computer, a controller (e.g., microcontroller), a transceiver, a processor, a memory, etc.). Although the example embodiment comprises communication port that can facilitate a wired connection to the device (e.g., to smart cell module), it should be appreciated that the subject disclosure is not so limiting. For example, in some embodiments, as described below, the device and/or one or more components thereof (e.g., smart cell module) can comprise a transmitter, a receiver, and/or a transceiver that can facilitate wireless communication over a network (e.g., the Internet, etc.) between device (e.g., smart cell module) and another device (e.g., a computing and/or communication device of an electric vehicle comprising the device, a computing resource in a cloud computing environment (e.g., a virtual machine, a virtual computer, a server, a memory, etc.), and/or another device).

The smart cell module can comprise an intelligent (e.g., "smart") separator (e.g., interface) between cell poles (e.g., external cell poles) of the terminal and cell material poles (e.g., internal cell poles) of active cell material. Smart cell module can comprise an internal circuit of the device. Smart cell module can comprise an integrated circuit (IC) that can be formed on a substrate (e.g., a silicon (Si) substrate, etc.) using one or more fabrication techniques and/or materials described below.

Fabrication of the device and/or smart cell module can comprise multi-step sequences of, for example, photolithographic and/or chemical processing steps that facilitate gradual creation of electronic-based systems, devices, components, and/or circuits in a semiconducting and/or a superconducting device (e.g., an IC). For instance, the smart cell module can be fabricated on a substrate (e.g., a silicon (Si) substrate, etc.) by employing techniques including, but not limited to: photolithography, microlithography, nanolithography, nanoimprint lithography, photomasking techniques, patterning techniques, photoresist techniques (e.g., positive-tone photoresist, negative-tone photoresist, hybrid-tone photoresist, etc.), etching techniques (e.g., reactive ion etching (RIE), dry etching, wet etching, ion beam etching, plasma etching, laser ablation, etc.), evaporation techniques, sputtering techniques, plasma ashing techniques, thermal treatments (e.g., rapid thermal anneal, furnace anneals, thermal oxidation, etc.), chemical vapor deposition (CVD), atomic layer deposition (ALD), physical vapor deposition (PVD), molecular beam epitaxy (MBE), electrochemical deposition (ECD), chemical-mechanical planarization (CMP), backgrinding techniques, and/or another technique for fabricating an integrated circuit.

The device and/or smart cell module can be fabricated using various materials. For example, the device and/or smart cell module can be fabricated using materials of one or more different material classes including, but not limited to: conductive materials, semiconducting materials, superconducting materials, dielectric materials, polymer materials, organic materials, inorganic materials, non-conductive materials, and/or another material that can be utilized with one or more of the techniques described above for fabricating an integrated circuit.

Although the example embodiment describes the smart cell module positioned vertically in the device between terminal and active cell material, it should be appreciated that the subject disclosure is not so limiting. For example, in another embodiment, smart cell module can be positioned (e.g., vertically, horizontally, etc.) in and/or on, for instance, casing, active cell material, a battery pack comprising device, and/or at another location in and/or on the device and/or such a battery pack comprising device.

The smart cell module can be implemented in the device to form an intelligent battery cell that can comprise one or more integrated monitoring components and/or switches that can facilitate different parameter monitoring and/or collection operations and/or different operating modes of the device in accordance with one or more embodiments of the subject disclosure described herein. For example, the smart cell module can comprise one or more sensors that can monitor and/or collect parameter data of the device and/or one or more components thereof. For instance, the smart cell module can comprise one or more sensors (e.g., one or more sensors) that can monitor and/or collect parameter data of the device and/or active cell material including, but not limited to: temperature; pressure (e.g., swelling); chemistry (e.g., chemistry on electrolyte to monitor aging); acceleration (e.g., to sense a crash of, for instance, an electric vehicle comprising device); current (e.g., current flowing into and/or out of device and/or active cell material); voltage (e.g., voltage potential across cell material poles of active cell material); and/or other parameter data of the device and/or active cell material. In these examples, the smart cell module can further comprise one or more switches (e.g., one or more switches) that can comprise, for instance, metal-oxide-semiconductor field-effect transistor (MOSFET) switches that can facilitate different operating modes of the device (e.g., off, positive, negative, bypass, etc.) in accordance with one or more embodiments of the subject disclosure described herein.

To facilitate such parameter monitoring and/or different operating modes of the device described above, the smart cell module can comprise a processor, a memory, one or more sensors, and/or one or more switches. For example, the smart cell module can comprise a processor (e.g., a central processing unit (CPU), a microprocessor, etc.), a memory, one or more sensors (e.g., temperature sensor, pressure sensor, etc.), and/or one or more switches (e.g., MOSFET switches) that can enable the parameter monitoring and/or different operating modes of the device described above.

In some embodiments, the device and/or the smart cell module can comprise a switch controller that can control (e.g., via a processor) operation of such one or more switches (e.g., MOSFET switches) to facilitate such different operating modes of the device described above. In some embodiments, a battery pack that can comprise multiple devices and/or smart cell modules can comprise such a switch controller described above. In these embodiments, such a switch controller in such a battery pack can control (e.g., via a processor and/or another processor) operation of such one or more switches (e.g., MOSFET switches) in each device to facilitate such different operating modes of each device described above.

The device can comprise a modular component that can function and/or be controlled independent of all other battery devices and/or battery cell devices (e.g., other devices) that can be in a battery pack. Therefore, it should be appreciated that one or more devices in such a battery pack can be removed and/or replaced without affecting the structure and/or functionality of the battery pack and/or any other devices in the battery pack.

Active cell material can comprise active battery cell material such as, for instance, a battery cell (also referred to as a "cell"). Active cell material can comprise a single battery cell or, in some embodiments, multiple individual battery cells that can be positioned inside casing according to a variety of patterns (e.g., vertically, horizontally, etc.). Active cell material can comprise any type of battery cell material such as, for instance, a lithium battery cell material, a lithium ion (Li-Ion) battery cell material, a lithium metal battery cell material, a lithium sulphur (Li—S) battery cell material, a molten salt (Na—NiCl$_2$) battery cell material, a nickel metal hydride (Ni-MH) battery cell material, a lead acid battery cell material, and/or another type of battery cell material.

Gas evacuation can comprise a device and/or structure that can facilitate the release of gas from a casing that can be generated by active cell material (e.g., during charging, discharging, etc.). For example, gas evacuation can comprise a vent, a port, a hole, a plate, a flap, a valve (e.g., a pressure relief valve, a one-way valve, a check valve, etc.), and/or another device and/or structure that can facilitate the release of gas from the casing.

The smart cell module can comprise any type of component, machine, device, facility, apparatus, and/or instrument that can comprise a processor and/or can be capable of effective and/or operative communication with a wired and/or wireless network. All such embodiments are envisioned. For example, the smart cell module can comprise a computing device, a general-purpose computer, a special-purpose computer, a quantum computing device (e.g., a quantum computer), an integrated circuit, a system on a chip (SOC), and/or another type of device.

The smart cell module can be coupled (e.g., communicatively, electrically, operatively, optically, etc.) to one or more external systems, sources, and/or devices (e.g., classical and/or quantum computing devices, communication devices, etc.). For example, smart cell module can be coupled via a communication port to one or more external systems, sources, and/or devices using a data cable (e.g., High-Definition Multimedia Interface (HDMI), recommended standard (RS) 232, Ethernet cable, etc.) and/or one or more wired networks described below.

In some embodiments, the smart cell module can be coupled (e.g., communicatively, electrically, operatively, optically, etc.) to one or more external systems, sources, and/or devices (e.g., classical and/or quantum computing devices, communication devices, etc.) via a network. The network can comprise one or more wired and/or wireless networks, including, but not limited to, a cellular network, a wide area network (WAN) (e.g., the Internet), and/or a local area network (LAN). For example, the smart cell module can communicate with one or more external systems, sources, and/or devices, for instance, computing devices using the network, which can comprise virtually any desired wired or wireless technology, including but not limited to: powerline ethernet, wireless fidelity (Wi-Fi), BLUETOOTH®, fiber optic communications, global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In such an example and as described above, the smart cell module can thus include hardware (e.g., a central processing unit (CPU), a transceiver, a decoder, an antenna, quantum hardware, a quantum processor, etc.), software (e.g., a set of threads, a set of processes, software in execution, quantum pulse schedule, quantum circuit, quantum gates, etc.) or a combination of hardware and software that facilitates communicating information between the smart cell module and external systems, sources, and/or devices (e.g., computing devices, communication devices, etc.).

The battery pack can be implemented in an electronic system such as, for instance, an electric driveline of an electric vehicle (EV).

The smart cell module can comprise multiple sections including, but not limited to, a switch section, a monitor and/or control section, an energy section, and/or another section. Switch section can comprise an H-bridge electronic circuit having multiple switches (e.g., 4 switches comprising 4 MOSFET switches). A monitor and/or control section can comprise a processor, memory, and/or one or more sensors. To facilitate various monitoring and/or control functions of the smart cell module and/or the device, the smart cell module, processor, memory, one or more sensors, and/or one or more switches can use (e.g., draw) electric energy (e.g., electric power, electric current, electric voltage) from active cell material. For example, the processor and/or memory can be coupled to active cell material via wire traces (e.g., integrated metal wires, striplines, microstrips, etc.), which can enable smart cell module, processor, memory, one or more sensors, and/or one or more switches to draw electric energy (e.g., electric power, electric current, electric voltage) from active cell material. Energy section can comprise active cell material and cell material poles which can enable the transfer of electric energy (e.g., electric current, electric voltage, etc.) into and out of active cell material, smart cell module, and/or the device.

As smart cell module and/or one or more components thereof (e.g., processor, memory, one or more sensors, one or more switches, etc.) can draw electric energy (e.g., electric power) from active cell material, it should be appreciated that device and/or smart cell module can thereby eliminate galvanic contact of one or more components of device with one or more devices that are external to device (e.g., another battery device and/or battery cell device in a battery pack comprising the device). By eliminating such galvanic contact, device and/or smart cell module can thereby provide enhanced safety when compared to existing battery device and/or battery cell device technologies (e.g., when compared to prior art battery device and/or battery cell device technologies). Additionally, or alternatively, by eliminating such galvanic contact, device and/or smart cell module can thereby eliminate hardware such as, for instance, cables, which are used in existing battery pack and/or battery management system (BMS) technologies (e.g., BMS wires coupled to one or more battery devices and/or battery cell devices in a battery pack).

Processor can comprise one or more types of processors and/or electronic circuitry (e.g., a classical processor, a quantum processor, etc.) that can implement one or more computer and/or machine readable, writable, and/or executable components and/or instructions that can be stored on memory. For example, the processor can perform various operations that can be specified by such computer and/or machine readable, writable, and/or executable components and/or instructions including, but not limited to, logic, control, input/output (I/O), arithmetic, and/or the like. The processor can comprise one or more central processing unit (CPU), multi-core processor, microprocessor, dual micro-processors, microcontroller, System on a Chip (SOC), array processor, vector processor, quantum processor, and/or another type of processor. Such examples of the processor can be employed to implement any embodiments of the subject disclosure.

In an example embodiment, the processor can comprise a central processing unit (CPU) such as, for example, a microprocessor. In some embodiments, processor can comprise and/or employ one or more machine learning (ML)

and/or artificial intelligence (AI) models to learn, for instance, one or more operating conditions and/or cause and effect conditions corresponding to the device and/or an external device coupled to the device. In these embodiments, based on learning such one or more operating conditions and/or cause and effect conditions, the processor can further employ the one or more ML and/or AI models to perform one or more tasks including, but not limited to, making a prediction, making an estimation (e.g., cell capacity (e.g., electric energy) of active cell material), classifying data, implementing one or more monitoring and/or control operations of the device and/or smart cell module, and/or another task.

The memory can store one or more computer and/or machine readable, writable, and/or executable components and/or instructions that, when executed by the processor (e.g., a classical processor, a quantum processor, etc.), can facilitate performance of operations defined by the executable component(s) and/or instruction(s). For example, the memory can store computer and/or machine readable, writable, and/or executable components and/or instructions that, when executed by the processor, can facilitate execution of the various functions described herein relating to the device and/or smart cell module as described herein with or without reference to the various figures of the subject disclosure. For instance, the memory can store computer and/or machine readable, writable, and/or executable components and/or instructions that, when executed by the processor, can facilitate one or more of such parameter monitoring tasks described above and/or to facilitate logging of monitoring data collected by one or more sensors. In another example, memory can store computer and/or machine readable, writable, and/or executable components and/or instructions that, when executed by the processor, can facilitate operation of one or more switches to configure the device to operate in one or more operation modes described herein.

In an embodiment, the memory can store computer and/or machine readable, writable, and/or executable components and/or instructions such as, for instance, a monitoring component that, when executed by the processor, can employ one or more sensors of the smart cell module in the device to collect parameter data corresponding to the device and/or one or more components thereof. In this embodiment, such a monitoring component can further store and/or log (e.g., via the processor) the parameter data in memory.

In another embodiment, the memory can store computer and/or machine readable, writable, and/or executable components and/or instructions such as, for instance, a machine learning component that, when executed by the processor, can facilitate operation of one or more switches (e.g., based on parameter data collected from the device) to configure the device to operate in one or more operation modes described herein. In this embodiment, such a machine learning component can learn to identify certain parameter data collected from the device that can be indicative of certain events and/or conditions associated with the device, a battery pack comprising device, and/or an electronic system (e.g., an electric driveline of an EV) comprising the device. For example, the machine learning component can learn (e.g., by being trained using one or more supervised leaning techniques, unsupervised learning techniques, etc.) to identify certain parameter data that can be indicative of, for instance: a high or low state of charge (SoC) in the device; a crash of a vehicle (e.g., an EV) comprising the device; a high or low temperature of one or more components of the device; a high or low pressure in the device, and/or another event and/or condition. In this example, based on identifying such parameter data that can be indicative of one or more such events and/or conditions defined above, the machine learning component can then configure the device (e.g., via the processor, one or more switches, etc.) in a certain operation mode as described above (e.g., in an off mode and/or a bypass mode based on detecting a crash of a vehicle comprising the device). In some embodiments, such a machine learning component described above can comprise a machine learning model based on artificial intelligence (AI) including, but not limited to, a shallow or deep neural network model, a support vector machine (SVM) model, a classifier, a decision tree classifier, a regression model, and/or any supervised or unsupervised machine learning model that can perform the operations of the machine learning component described above.

The memory can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Such examples of the memory can be employed to implement any embodiments of the subject disclosure.

One or more embodiments can be a system, a method, and/or a computer program product at any possible technical detail level of integration. The computer program product can include a computer readable storage medium (or media) having computer readable program instructions thereon for causing a processor to carry out one or more aspects of the present embodiments.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the entity's computer, partly on the entity's computer, as a stand-alone software package, partly on the entity's computer and partly on a remote computer or entirely on the remote computer or server. In the latter scenario, the remote computer can be connected to the entity's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It can be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In connection with FIG. 31, the systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which can be explicitly illustrated herein.

Figure 31:
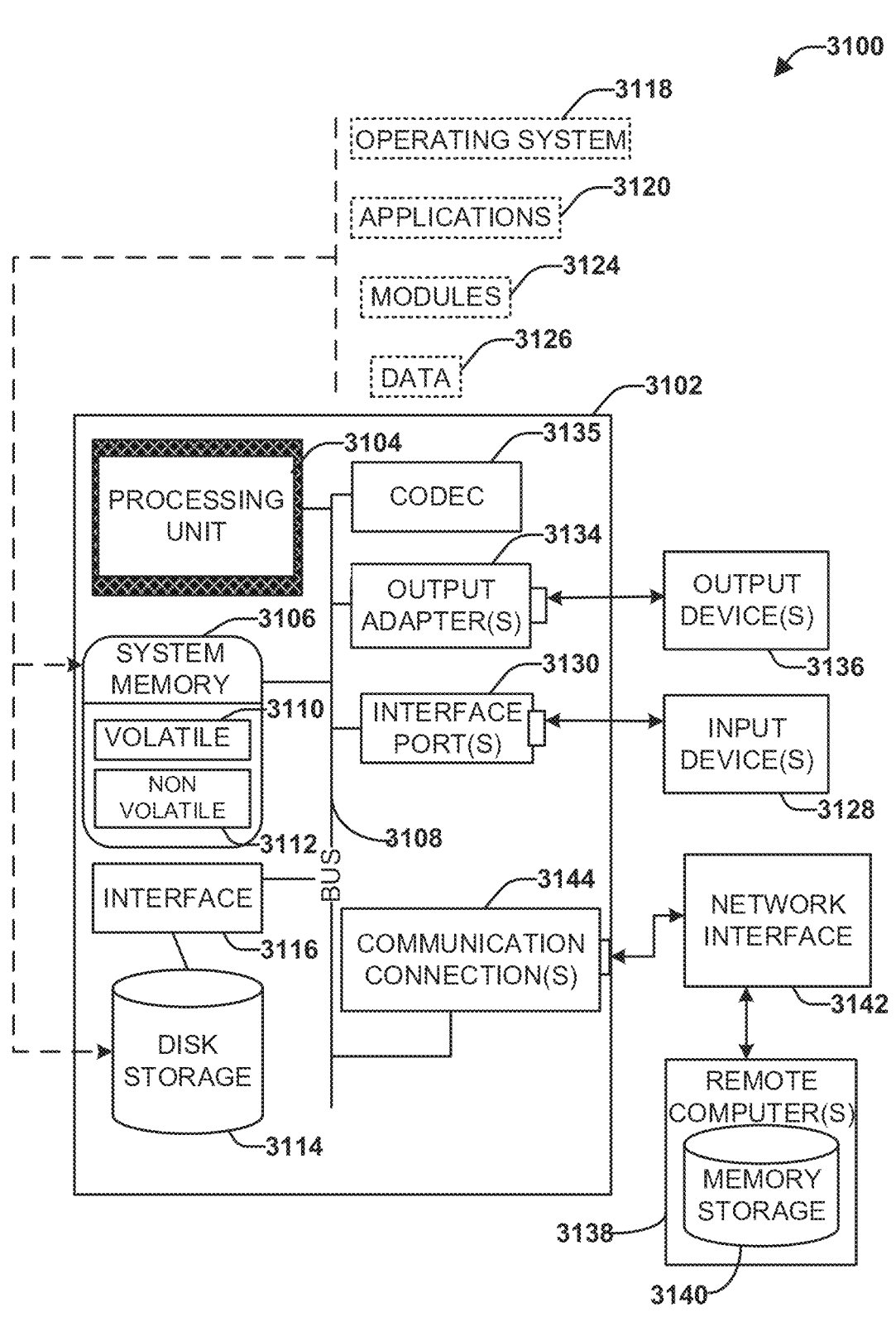
FIG. 31 illustrates a block diagram of an example, non-limiting operating environment in which one or more embodiments described herein can be facilitated.

With reference to FIG. 31, an example environment 3100 for implementing various aspects of the claimed subject matter includes a computer 3102. The computer 3102 includes a processing unit 3104, a system memory 3106, a codec 3135, and a system bus 3108. The system bus 3108 couples system components including, but not limited to, the system memory 3106 to the processing unit 3104. The processing unit 3104 can be any of various available processors. Dual microprocessors and other multiprocessor architectures also can be employed as the processing unit 3104.

The system bus 3108 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 13224), and Small Computer Systems Interface (SCSI).

The system memory 3106 includes volatile memory 3110 and non-volatile memory 3112, which can employ one or more of the disclosed memory architectures, in various embodiments. The basic input/output system (BIOS), containing the basic routines to transfer information between elements within the computer 3102, such as during start-up, is stored in non-volatile memory 3112. In addition, according to present innovations, codec 3135 can include at least one of an encoder or decoder, wherein the at least one of an encoder or decoder can consist of hardware, software, or a combination of hardware and software. Although, codec 3135 is depicted as a separate component, codec 3135 can be contained within non-volatile memory 3112. By way of illustration, and not limitation, non-volatile memory 3112 can include read only memory (ROM), programmable ROM (PROM), electrically programmable ROM (EPROM), electrically erasable programmable ROM (EEPROM), Flash memory, 3D Flash memory, or resistive memory such as resistive random access memory (RRAM). Non-volatile memory 3112 can employ one or more of the disclosed memory devices, in at least some embodiments. Moreover, non-volatile memory 3112 can be computer memory (e.g., physically integrated with computer 3102 or a mainboard thereof), or removable memory. Examples of suitable removable memory with which disclosed embodiments can be implemented can include a secure digital (SD) card, a compact Flash (CF) card, a universal serial bus (USB) memory stick, or the like. Volatile memory 3110 includes random access memory (RAM), which acts as external cache memory, and can also employ one or more disclosed memory devices in various embodiments. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM) and so forth.

Computer 3102 can also include removable/non-removable, volatile/non-volatile computer storage medium. FIG. 31 illustrates, for example, disk storage 3114. Disk storage 3114 includes, but is not limited to, devices like a magnetic disk drive, solid state disk (SSD), flash memory card, or memory stick. In addition, disk storage 3114 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 3114 to the system bus 3108, a removable or non-removable interface is typically used, such as interface 3116. It is appreciated that disk storage 3114 can store information related to an entity. Such information might be stored at or provided to a server or to an application running on an entity device. In one embodiment, the entity can be notified (e.g., by way of output device(s) 3136) of the types of information that are stored to disk storage 3114 or transmitted to the server or application. The entity can be provided the opportunity to opt-in or opt-out of having such information collected or shared with the server or application (e.g., by way of input from input device(s) 3128).

It is to be appreciated that FIG. 31 describes software that acts as an intermediary between entities and the basic computer resources described in the suitable operating environment 3100. Such software includes an operating system 3118. Operating system 3118, which can be stored on disk storage 3114, acts to control and allocate resources of the computer system 3102. Applications 3120 take advantage of the management of resources by operating system 3118 through program modules 3124, and program data 3126, such as the boot/shutdown transaction table and the like, stored either in system memory 3106 or on disk storage 3114. It is to be appreciated that the claimed subject matter can be implemented with various operating systems or combinations of operating systems.

An entity enters commands or information into the computer 3102 through input device(s) 3128. Input devices 3128 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 3104 through the system bus 3108 via interface port(s) 3130. Interface port(s) 3130 include, for example, a serial port, a parallel port, a game port, and a universal serial bus (USB). Output device(s) 3136 use some of the same type of ports as input device(s) 3128. Thus, for example, a USB port can be used to provide input to computer 3102 and to output information from computer 3102 to an output device 3136. Output adapter 3134 is provided to illustrate that there are some output devices 3136 like monitors, speakers, and printers, among other output devices 3136, which require special adapters. The output adapters 3134 include, by way of illustration and not limitation, video and sound cards that provide a means of connection between the output device 3136 and the system bus 3108. It should be noted that other devices or systems of devices provide both input and output capabilities such as remote computer(s) 3138.

Computer 3102 can operate in a networked environment using logical connections to one or more remote computers, such as remote computer(s) 3138. The remote computer(s) 3138 can be a personal computer, a server, a router, a network PC, a workstation, a microprocessor based appliance, a peer device, a smart phone, a tablet, or other network node, and typically includes many of the elements described relative to computer 3102. For purposes of brevity, only a memory storage device 3140 is illustrated with remote computer(s) 3138. Remote computer(s) 3138 is logically connected to computer 3102 through a network interface 3142 and then connected via communication connection(s) 3144. Network interface 3142 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 3144 refers to the hardware/software employed to connect the network interface 3142 to the bus 3108. While communication connection 3144 is shown for illustrative clarity inside computer 3102, it can also be external to computer 3102. The hardware/software necessary for connection to the network interface 3142 includes, for exemplary purposes only, internal and external technologies such as, modems including regular telephone grade modems, cable modems and DSL modems, ISDN adapters, and wired and wireless Ethernet cards, hubs, and routers.

The illustrated aspects of the disclosure may also be practiced in distributed computing environments where certain tasks are performed by remote processing devices that are linked through a communications network. In a distributed computing environment, program modules can be located in both local and remote memory storage devices.

Figure 32:
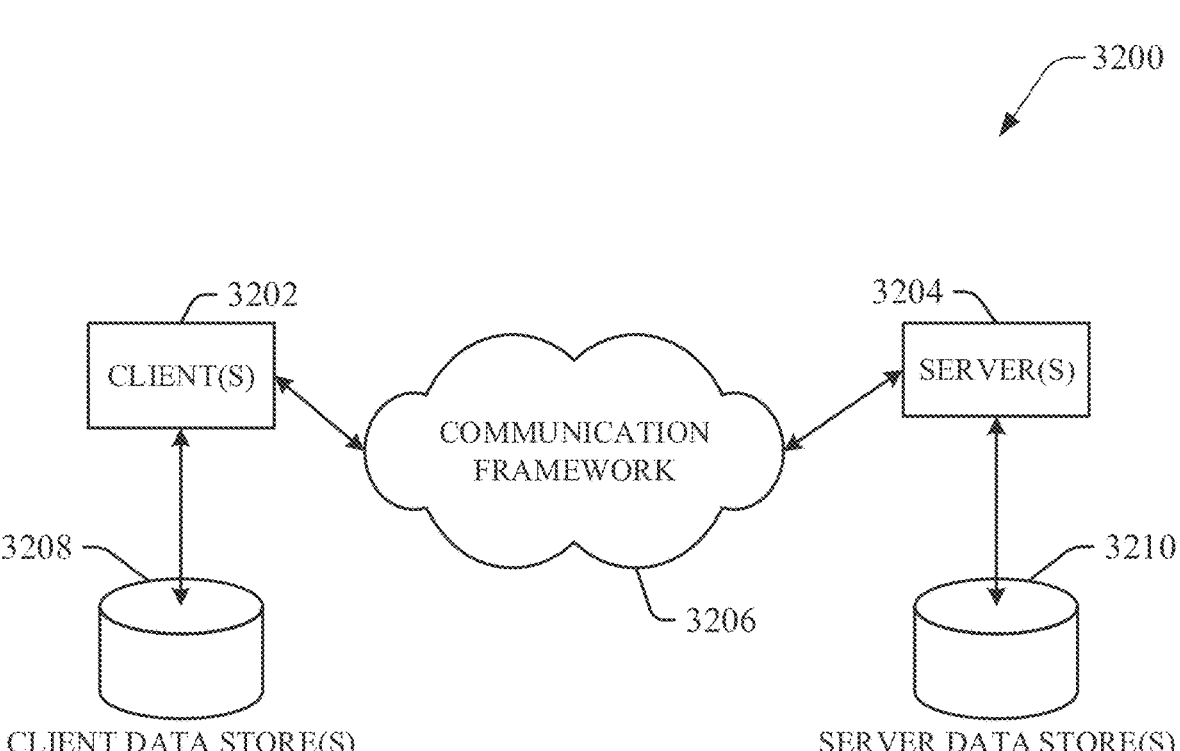
FIG. 32 illustrates a block diagram of another example, non-limiting operating environment in which one or more embodiments described herein can be facilitated.

Referring to FIG. 32, there is illustrated a schematic block diagram of a computing environment 3200 in accordance with this disclosure in which the subject systems (e.g., system 100, the like), methods and computer readable media can be deployed. The computing environment 3200 includes one or more client(s) 3202 (e.g., laptops, smart phones, PDAs, media players, computers, portable electronic devices, tablets, and the like). The client(s) 3202 can be hardware and/or software (e.g., threads, processes, computing devices). The computing environment 3200 also includes one or more server(s) 3204. The server(s) 3204 can also be hardware or hardware in combination with software (e.g., threads, processes, computing devices). The servers 3204 can house threads to perform transformations by employing aspects of this disclosure, for example. In various embodiments, one or more components, devices, systems, or subsystems of system 100 and/or system 200 can be deployed as hardware and/or software at a client 3202 and/or as hardware and/or software deployed at a server 3204. One possible communication between a client 3202 and a server 3204 can be in the form of a data packet transmitted between two or more computer processes wherein the data packet may include healthcare related data, training data, AI models, input data for the AI models and the like. The data packet can include a metadata, e.g., associated contextual information, for example. The computing environment 3200 includes a communication framework 3206 (e.g., a global communication network such as the Internet, or mobile network(s)) that can be employed to facilitate communications between the client(s) 3202 and the server(s) 3204.

Communications can be facilitated via a wired (including optical fiber) and/or wireless technology. The client(s) 3202 include or are operatively connected to one or more client data store(s) 3208 that can be employed to store information local to the client(s) 3202 (e.g., associated contextual information). Similarly, the server(s) 3204 are operatively include or are operatively connected to one or more server data store(s) 3210 that can be employed to store information local to the servers 3204 (e.g., application data).

In one embodiment, a client 3202 can transfer an encoded file, in accordance with the disclosed subject matter, to server 3204. Server 3204 can store the file, decode the file, or transmit the file to another client 3202. It is to be appreciated, that a client 3202 can also transfer uncompressed file to a server 3204 and server 3204 can compress the file in accordance with the disclosed subject matter. Likewise, server 3204 can encode video information and transmit the information via communication framework 3206 to one or more clients 3202.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "subsystem" "platform," "layer," "gateway," "interface," "service," "application," "device," and the like, can refer to and/or can include one or more computer-related entities or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration and are intended to be non-limiting. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of entity equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations can be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further aspects of various embodiments described herein are provided by the subject matter of the following clauses:

1. A smart cell modulator, comprising:
a set of smart battery cells; and
a controller that operates to selectively engage one or more secondary nodes to execute a speed request for generating a desired speed.

2. The smart cell modulator of any preceding claim, wherein a primary node wirelessly broadcasts data comprising the speed request and modulator voltage information to the one or more secondary nodes.

3. The smart cell modulator of any preceding claim, wherein the one or more secondary nodes intelligently control one or more respective smart battery cells, based on the data, to generate a requested speed and a requested modulator voltage towards generating a sine wave current.

4. The smart cell modulator of any preceding claim, wherein the primary node calculates a phase difference between a rotor position of an electric motor and an existing modulator voltage, based on resolver angle information, to determine the speed request and the modulator voltage information.

5. The smart cell modulator of any preceding claim, wherein upon a determination that the phase difference falls within a defined threshold, the primary node requests the one or more secondary nodes to generate a pre-defined phase current amplitude, to maintain a desired torque.

6. The smart cell modulator of any preceding claim, wherein upon a determination that the phase difference falls outside a defined threshold, the primary node requests the one or more secondary nodes to adjust an existing phase current amplitude, to generate a desired torque.

7. The smart cell modulator of any preceding claim, wherein adjustment of the existing phase current amplitude is performed without requiring current sensing by the one or more secondary nodes.

8. The smart cell modulator of any preceding claim, wherein adjustment of the existing phase current amplitude is used to synchronize a modulator speed with a mechanical speed of an electric motor to generate the desired torque.

9. The smart cell modulator of clause 1 above with any set of combinations of devices 2-8 above.

10. A computer-implemented method, comprising:

engaging, by a system operatively coupled to a processor, one or more secondary nodes to execute a speed request for generating a desired speed.

11. The computer-implemented method of any preceding claim, further comprising:

broadcasting, by the system, data comprising the speed request and modulator voltage information to the one or more secondary nodes.

12. The computer-implemented method of any preceding claim, further comprising:

controlling, by the system, one or more respective smart battery cells, based on the data, to generate a requested speed and a requested modulator voltage towards generating a sine wave current.

13. The computer-implemented method of any preceding claim, further comprising:

calculating, by the system, a phase difference between a rotor position of an electric motor and an existing modulator voltage, based on resolver angle information, to determine the speed request and the modulator voltage information.

14. The computer-implemented method of any preceding claim, further comprising:

requesting, by the system, the one or more secondary nodes to generate a pre-defined phase current amplitude, to maintain a desired torque, upon a determination that the phase difference falls within a defined threshold.

15. The computer-implemented method of any preceding claim, further comprising:

requesting, by the system, the one or more secondary nodes to adjust an existing phase current amplitude, to generate a desired torque, upon a determination that the phase difference falls outside a defined threshold.

16. The computer-implemented method of any preceding claim, wherein adjustment of the existing phase current amplitude is performed without requiring current sensing by the one or more secondary nodes.

17. The computer-implemented method of any preceding claim, wherein adjustment of the existing phase current amplitude is used to synchronize a modulator speed with a mechanical speed of an electric motor to generate the desired torque.

18. The computer-implemented method of clause 10 above with any set of combinations of methods 11-17 above.

19. A computer program product facilitating an intelligent battery cell, the computer program product comprising a non-transitory computer readable medium having program instructions embodied therewith, the program instructions executable by a processor to cause the processor to:

engage, by the processor, one or more secondary nodes to execute a speed request for generating a desired speed.

20. The computer program product of any preceding claim, wherein the program instructions are further executable by the processor to cause the processor to:

broadcast, by the processor, data comprising the speed request and modulator voltage information to the one or more secondary nodes.

21. The computer program product of any preceding claim, wherein the program instructions are further executable by the processor to cause the processor to:

control, by the processor, one or more respective smart battery cells, based on the data, to generate a requested speed and a requested modulator voltage towards generating a sine wave current.

22. The computer program product of any preceding claim, wherein the program instructions are further executable by the processor to cause the processor to:

calculate, by the processor, a phase difference between a rotor position of an electric motor and an existing modulator voltage, based on resolver angle information, to determine the speed request and the modulator voltage information.

23. The computer program product of clause 19 above with any set of combinations of computer program products 20-22 above.

What is claimed is:

1. A smart cell modulator, comprising:

a group of smart battery cells; and a controller that operates to selectively engage one or more secondary nodes to execute a speed request for generating a desired speed, wherein a primary node:

calculates a phase difference between a rotor position of an electric motor and an existing modulator voltage, based on resolver angle information, to determine the speed request and modulator voltage information, and wirelessly broadcasts data comprising the speed request and the modulator voltage information to the one or more secondary nodes.

2. The smart cell modulator of claim 1, wherein the one or more secondary nodes intelligently control one or more respective smart battery cells, based on the data, to generate a requested speed and a requested modulator voltage towards generating a sine wave current.

3. The smart cell modulator of claim 1, wherein upon a determination that the phase difference falls within a defined threshold, the primary node requests the one or more secondary nodes to generate a pre-defined phase current amplitude, to maintain a desired torque.

4. The smart cell modulator of claim 1, wherein upon a determination that the phase difference falls outside a defined threshold, the primary node requests the one or more secondary nodes to adjust an existing phase current amplitude, to generate a desired torque.

5. The smart cell modulator of claim 4, wherein adjustment of the existing phase current amplitude is performed without requiring current sensing by the one or more secondary nodes.

6. The smart cell modulator of claim 4, wherein adjustment of the existing phase current amplitude is used to synchronize a modulator speed with a mechanical speed of the electric motor to generate the desired torque.

7. A computer-implemented method, comprising:

engaging, by a system operatively coupled to a processor, one or more secondary nodes to execute a speed request for generating a desired speed, wherein the engaging comprises:

calculating a phase difference between a rotor position of an electric motor and an existing modulator voltage, based on resolver angle information, to determine the speed request and modulator voltage information, and broadcasting data comprising the speed request and the modulator voltage information to the one or more secondary nodes.

8. The computer-implemented method of claim 7, further comprising:

controlling, by the system, one or more respective smart battery cells, based on the data, to generate a requested speed and a requested modulator voltage towards generating a sine wave current.

9. The computer-implemented method of claim 7, further comprising:

requesting, by the system, the one or more secondary nodes to generate a pre-defined phase current amplitude, to maintain a desired torque, upon a determination that the phase difference falls within a defined threshold.

10. The computer-implemented method of claim 7, further comprising:

requesting, by the system, the one or more secondary nodes to adjust an existing phase current amplitude, to generate a desired torque, upon a determination that the phase difference falls outside a defined threshold.

11. The computer-implemented method of claim 10, wherein adjustment of the existing phase current amplitude is performed without requiring current sensing by the one or more secondary nodes.

12. The computer-implemented method of claim 10, wherein adjustment of the existing phase current amplitude is used to synchronize a modulator speed with a mechanical speed of the electric motor to generate the desired torque.

13. A computer program product facilitating smart battery cells, the computer program product comprising a non-transitory computer readable medium having program instructions embodied therewith, the program instructions executable by a processor to cause the processor to:

engage, by the processor, one or more secondary nodes to execute a speed request for generating a desired speed, wherein the engaging comprises:

calculating a phase difference between a rotor position of an electric motor and an existing modulator voltage, based on resolver angle information, to determine the speed request and modulator voltage information, and broadcasting data comprising the speed request and the modulator voltage information to the one or more secondary nodes.

14. The computer program product of claim 13, wherein the program instructions are further executable by the processor to cause the processor to:

control, by the processor, one or more respective smart battery cells, based on the data, to generate a requested speed and a requested modulator voltage towards generating a sine wave current.

15. The computer program product of claim 13, wherein upon a determination that the phase difference falls within a defined threshold, the primary node requests the one or more secondary nodes to generate a pre-defined phase current amplitude, to maintain a desired torque.

16. The computer program product of claim 13, wherein upon a determination that the phase difference falls outside a defined threshold, the primary node requests the one or more secondary nodes to adjust an existing phase current amplitude, to generate a desired torque.

17. The computer program product of claim 16, wherein adjustment of the existing phase current amplitude is performed without requiring current sensing by the one or more secondary nodes, and is used to synchronize a modulator speed with a mechanical speed of the electric motor to generate the desired torque.

18. The computer program product of claim 16, wherein the one or more secondary nodes are respectively associated a distinct cluster of smart battery cells of a group of smart battery cells.

19. The method of claim 7, wherein the one or more secondary nodes are respectively associated a distinct cluster of smart battery cells of the group of smart battery cells.

20. The method of claim 7, wherein the one or more secondary nodes are respectively associated a distinct cluster of smart battery cells of a group of smart battery cells.

* * * * *